US010791562B2

(12) United States Patent
Ryoo et al.

(10) Patent No.: US 10,791,562 B2
(45) Date of Patent: Sep. 29, 2020

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si, Gyeonggi-do (KR)

(72) Inventors: Sunheui Ryoo, Yongin-si (KR); Seunghoon Park, Suwon-si (KR); Rayeon Ahn, Seoul (KR); Byounghoon Jung, Suwon-si (KR); Jungsoo Jung, Suwon-si (KR); Jungmin Moon, Suwon-si (KR); Jiwon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/862,144

(22) Filed: Jan. 4, 2018

(65) Prior Publication Data
US 2018/0192426 A1      Jul. 5, 2018

(30) Foreign Application Priority Data

Jan. 5, 2017    (KR) .................. 10-2017-0002088
Mar. 23, 2017   (KR) .................. 10-2017-0037160
(Continued)

(51) Int. Cl.
*H04W 72/08*    (2009.01)
*H04W 74/08*    (2009.01)
(Continued)

(52) U.S. Cl.
CPC ......... *H04W 72/085* (2013.01); *H04W 24/10* (2013.01); *H04W 36/0055* (2013.01);
(Continued)

(58) Field of Classification Search
CPC .............................. H04W 72/085; H04L 5/00
See application file for complete search history.

(56) References Cited

U.S. PATENT DOCUMENTS

2011/0205993 A1    8/2011  Cho et al.
2013/0083713 A1    4/2013  Johansson et al.
(Continued)

FOREIGN PATENT DOCUMENTS

KR    10-2016-0110889 A    9/2016
WO    2016/044994 A1       3/2016

OTHER PUBLICATIONS

Samsung, Overview of the NR RRC state machine and modelling of the INACTIVE state, Nov. 5, 2016, R2-167493, 3GPP TSG-RAN WG2 Meeting #96, Reno, USA.

*Primary Examiner* — Samina F Choudhry
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as long-term evolution (LTE). A method of a terminal is provided. The method includes receiving measurement configuration information including numerology information and bandwidth information from a base station, measuring a channel state based on the measurement configuration information, and transmitting information on the measured channel state to the base station.

12 Claims, 47 Drawing Sheets

(30) Foreign Application Priority Data

May 4, 2017 (KR) .......................... 10-2017-0057052
Aug. 10, 2017 (KR) .......................... 10-2017-0101905

(51) Int. Cl.
*H04W 72/04* (2009.01)
*H04W 24/10* (2009.01)
*H04W 36/00* (2009.01)
*H04W 76/27* (2018.01)

(52) U.S. Cl.
CPC ... *H04W 72/0453* (2013.01); *H04W 74/0833* (2013.01); *H04W 36/0085* (2018.08); *H04W 76/27* (2018.02)

(56) References Cited

U.S. PATENT DOCUMENTS

| | | |
|---|---|---|
| 2013/0095818 A1 | 4/2013 | Levy et al. |
| 2014/0064160 A1 | 3/2014 | Verger et al. |
| 2014/0211673 A1 | 7/2014 | Lu et al. |
| 2015/0201375 A1 | 7/2015 | Vannithamby et al. |
| 2015/0373721 A1 | 12/2015 | Zhang et al. |
| 2017/0195998 A1 | 7/2017 | Zhang et al. |
| 2017/0366311 A1* | 12/2017 | Iyer ...................... H04B 7/0482 |
| 2018/0049047 A1* | 2/2018 | Lin ....................... H04W 24/02 |
| 2018/0049169 A1* | 2/2018 | Lin ....................... H04L 5/0051 |
| 2018/0049186 A1 | 2/2018 | Hong et al. |
| 2018/0092002 A1* | 3/2018 | Manolakos ........... H04L 5/0007 |
| 2018/0198548 A1* | 7/2018 | Nammi .................. H04J 11/004 |

\* cited by examiner

FIG. 25
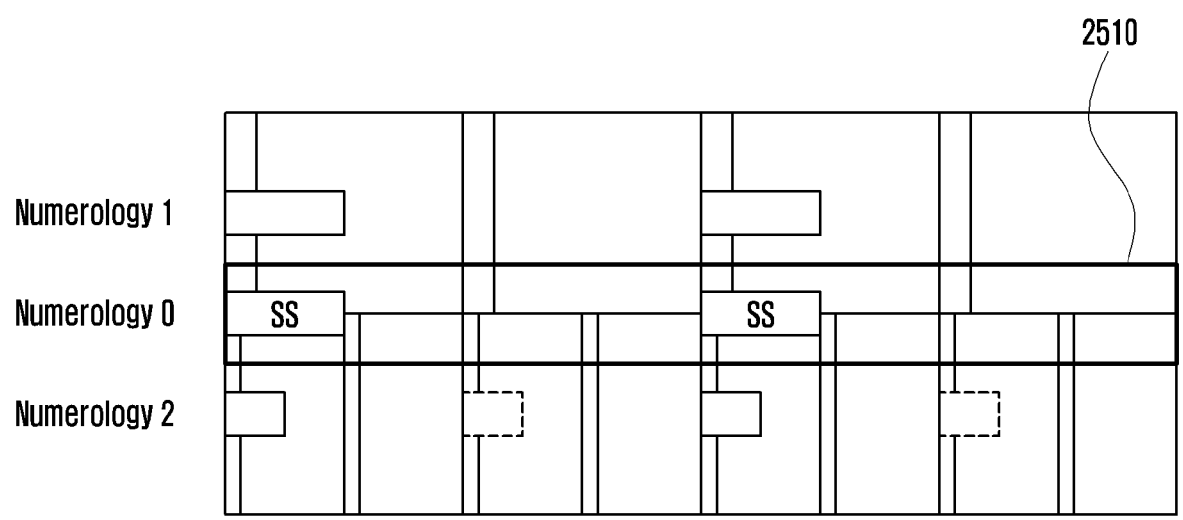
(a)
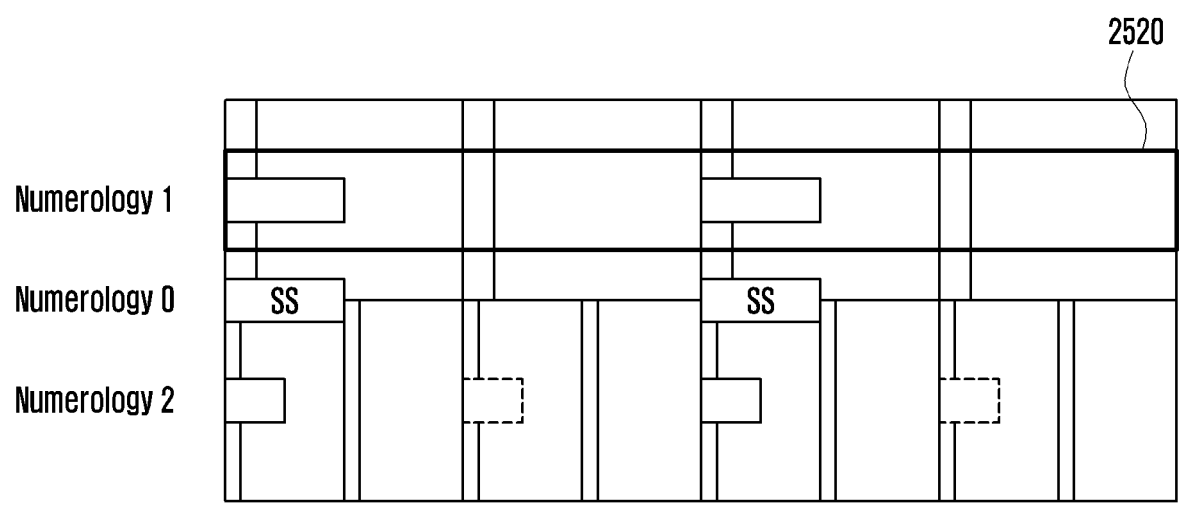
(a)

FIG. 26
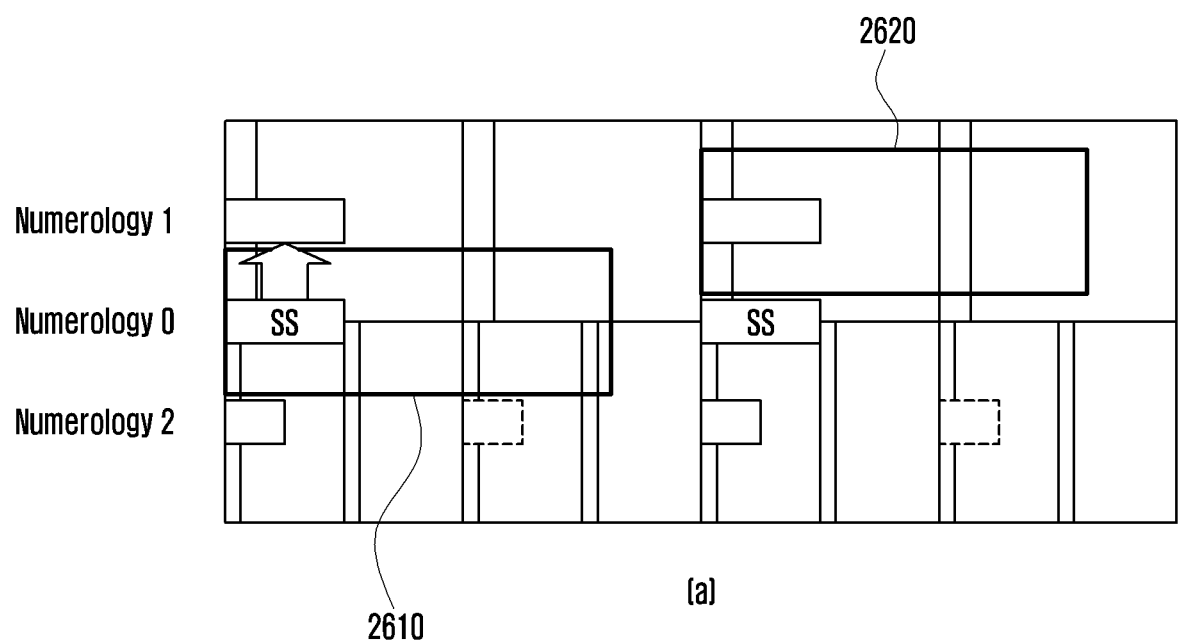
(a)
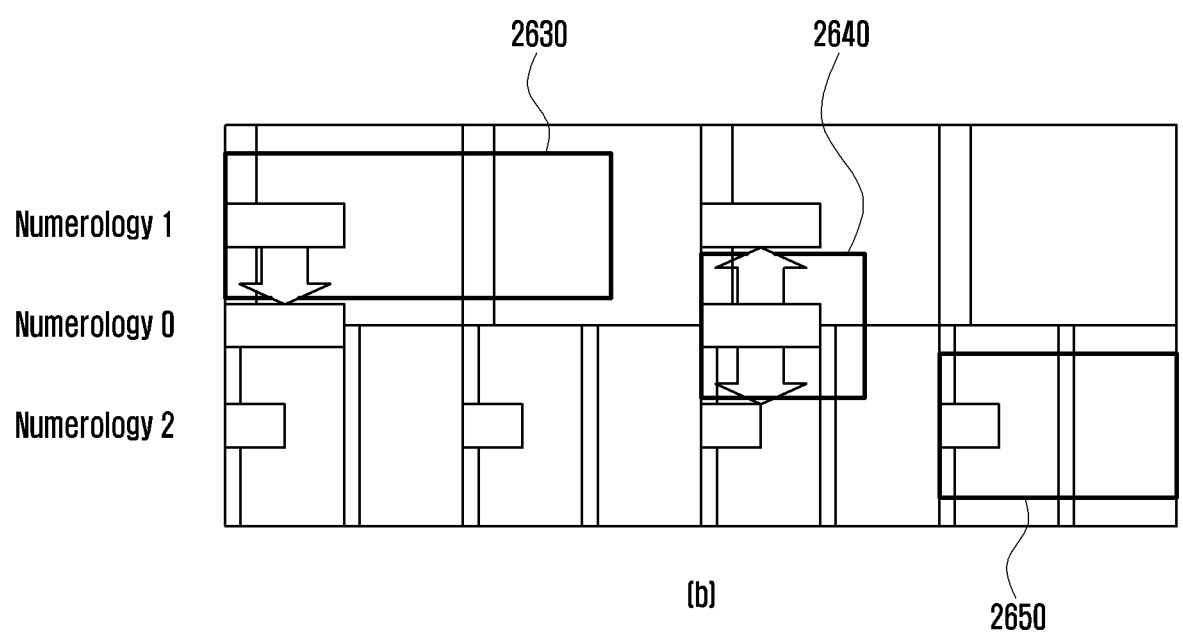
(b)

METHOD AND APPARATUS FOR TRANSMITTING AND RECEIVING DATA IN WIRELESS COMMUNICATION SYSTEM

CROSS-REFERENCE TO RELATED APPLICATION(S)

This application claims the benefit under 35 U.S.C. § 119(a) of a Korean patent application filed on Jan. 5, 2017 in the Korean Intellectual Property Office and assigned Serial number 10-2017-0002088, a Korean patent application filed on Mar. 23, 2017 in the Korean Intellectual Property Office and assigned Serial number 10-2017-0037160, a Korean patent application filed on May 4, 2017 in the Korean Intellectual Property Office and assigned Serial number 10-2017-0057052, and a Korean patent application filed on Aug. 10, 2017 in the Korean Intellectual Property Office and assigned Serial number 10-2017-0101905, the entire disclosure of which is hereby incorporated by reference.

TECHNICAL FIELD

The present disclosure relates to a wireless communication system. More particularly, the present disclosure relates to a method for reducing an active period of a terminal to reduce power consumption.

The present disclosure relates to a method for optimizing a paging area (PA) in a wireless communication system.

The present disclosure further relates to an operation of a physical (PHY) layer/a media access control (MAC) layer/a radio link control (RLC) layer of a terminal and a base station in a mobile communication system. More specifically, the present disclosure relates to a method and apparatus for supporting to maintain service continuity by a measurement and handover procedure according to a service that a terminal uses and a setting of a relevant PHY/MAC layer, when intending to perform the handover of transferring connection of the terminal from one base station to another base station.

Further, the present disclosure relates to an operation of determining, by a terminal, whether to measure signal strength of a neighbor base station in a mobile communication system. More specifically, an operation of determining, by a terminal, whether to measure a NR synchronization signal (NR-SS) or a channel state information reference signal (CSI-RS) transmitted by a neighbor base station when a serving base station transmits an NR-SS or a CSI-RS is suggested.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. Meanwhile, a need for a method for improving a function of a terminal in a wireless communication system has arisen, and the present disclosure suggests a method therefor.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for supporting quality of service (QoS) in a situation in which data is transmitted in a radio resource control (RRC) INACTIVE state, and a method for supporting QoS of data transmission when a base station where a terminal is located is changed in consideration of mobility of the terminal.

Embodiments of the present disclosure are directed to the provision of a method for optimizing a radio access network (RAN) notification area by minimizing the number of core network (CN) signaling messages according to a situation of a terminal (a moving speed of the terminal, a terminal traffic pattern, and the like).

Embodiments of the present disclosure are directed to the provision of measurement classified for each numerology, a triggering condition, radio resource management (RRM) resource reconfiguration and a handover procedure.

Further, it is not clear based on which reference signal strength the terminal should perform measurement for a neighbor base station when a serving base station transmits various kinds of reference signals. Therefore, the present disclosure provides a method for solving the problem.

Objects of the present disclosure are not limited to the above-mentioned objects. That is, other objects that are not mentioned may be obviously understood by those skilled in the art to which the present disclosure pertains from the following description.

In accordance with an aspect of the present disclosure, a method of a terminal in a wireless communication system is provided. The method includes receiving measurement configuration information including numerology information and bandwidth information from a base station, measuring a channel state based on the measurement configuration information, and transmitting information on the measured channel state to the base station.

In accordance with another aspect of the present disclosure, a method of a base station in a wireless communication system is provided. The method includes transmitting measurement configuration information including numerology information and bandwidth information to a terminal, and receiving information on a channel state, wherein the channel state is measured based on the measurement configuration information from the terminal.

In accordance with another aspect of the present disclosure, a terminal in a wireless communication system is provided. The terminal includes a transceiver, and at least one processor configured to receive measurement configuration information including numerology information and bandwidth information from a base station, measure a channel state based on the measurement configuration information, and report information on the measured channel state to the base station.

In accordance with another aspect of the present disclosure, a base station in a wireless communication system includes a transceiver, and at least one processor configured to transmit measurement configuration information including numerology information and bandwidth information to a terminal, and receive information on a channel state, wherein the channel state is measured based on the measurement configuration information from the terminal.

Various embodiments of the present disclosure are directed to the provision of a method of a terminal in a wireless communication system includes: transmitting a connection resume request including at least one of resume cause information, QoS-related information, and slice-related information to a base station, receiving a response connection message including configuration information for a bearer determined based on at least one of the resume cause information, the QoS-related information, and the slice-related information from the base station, and transmitting data through the bearer.

Various embodiments of the present disclosure are directed to the provision of a method of a terminal in a wireless communication system includes: determining whether to configure a paging area, requesting at least one of mobility information and traffic pattern information for configuring the paging area, and configuring the paging area based on the mobility information and the traffic pattern information.

Various embodiments of the present disclosure are directed to the provision of a method of a terminal in a wireless communication system includes: receiving first threshold value information for a first reference signal and second threshold value information for a second reference signal, receiving the first reference signal and the second reference signal, measuring a strength of the first reference signal and a strength the second reference signal, and determining whether to measure a signal strength of a neighbor cell based on a result of comparison between the strength of the first reference signal and the first threshold value and a result of comparison between the strength of the second reference signal and the second threshold value.

According to an embodiment of the present disclosure, when the terminal and the base station directly transmit data in the Inactive state in the communication system, since the transition to the RRC Connected_Active state does not occur, the wait time (C-DRX, radio tail) in the Active state is kept to a minimum, thereby reducing power consumption of the terminal.

Further, when intending to transmit data in the inactive (idle) state, the data may be transmitted without the RRC resume message for the RRC state transition, and since the transition of the RRC state to the Connected_active does not occur, the delay caused by the relevant control signaling is removed, thereby decreasing data transmission delay. Further, as the RRC release message for the RRC state transition is decreased, it is expected that cost efficiency is increased through reduction in power consumption of the 5G base station (RU/TRP) and use efficiency of the radio resource is increased through reduction in interference between neighboring 5G cells.

According to another embodiment of the present disclosure, the terminal and the base station set the RAN notification area (or PA) optimized for the moving speed of the terminal and the terminal traffic pattern, thereby decreasing unnecessary RRC signaling and CN signaling messages including X2 and S1. By decreasing the CN signaling messages, the network may reduce unnecessary waste of resources and power consumption. Further, the method in which the terminal maintains the inactive state and performs the PA update is suggested to omit the RRC transition procedure for the PA update, thereby reducing waste of resources and power consumption of the terminal.

According to still another embodiment of the present disclosure, the terminal or the base station may determine the handover or the RRM resource reconfiguration according to a result of the measurement classified for each numerology, based on the measurement classified for each numerology and the triggering condition suggested in the present disclosure. According to the result of the measurement classified for each numerology mapped with the service, the terminal may reduce unnecessary reports, and the base station may accurately perform the determination of the handover or the RRM resource reconfiguration. The RRM resource reconfiguration may be performed to enable normal measurement and reports when the terminal may not perform the measurement, the performance is not properly obtained, or delay occurs in the report of the terminal due to the RRM resource configuration different from that of the neighbor base station.

Further, by using the method suggested in the present disclosure, it is possible to determine based on which received signal strength the measurement operation for the neighbor base station is performed when the serving base station transmits various kinds of reference signals.

Other aspects, advantages, and salient features of the disclosure will become apparent to by those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 25 is a diagram illustrating an example of a case in which there is no change in a resource and numerology for radio resource management (RRM) measurement according to an embodiment of the present disclosure;

FIG. 26 is a diagram illustrating an example of a case in which there is a change in a resource and a numerology for RRM measurement according to an embodiment of the present disclosure;

Throughout the drawings, like reference numerals will be understood to refer to like parts, components, and structures.

DETAILED DESCRIPTION

Figure 1:
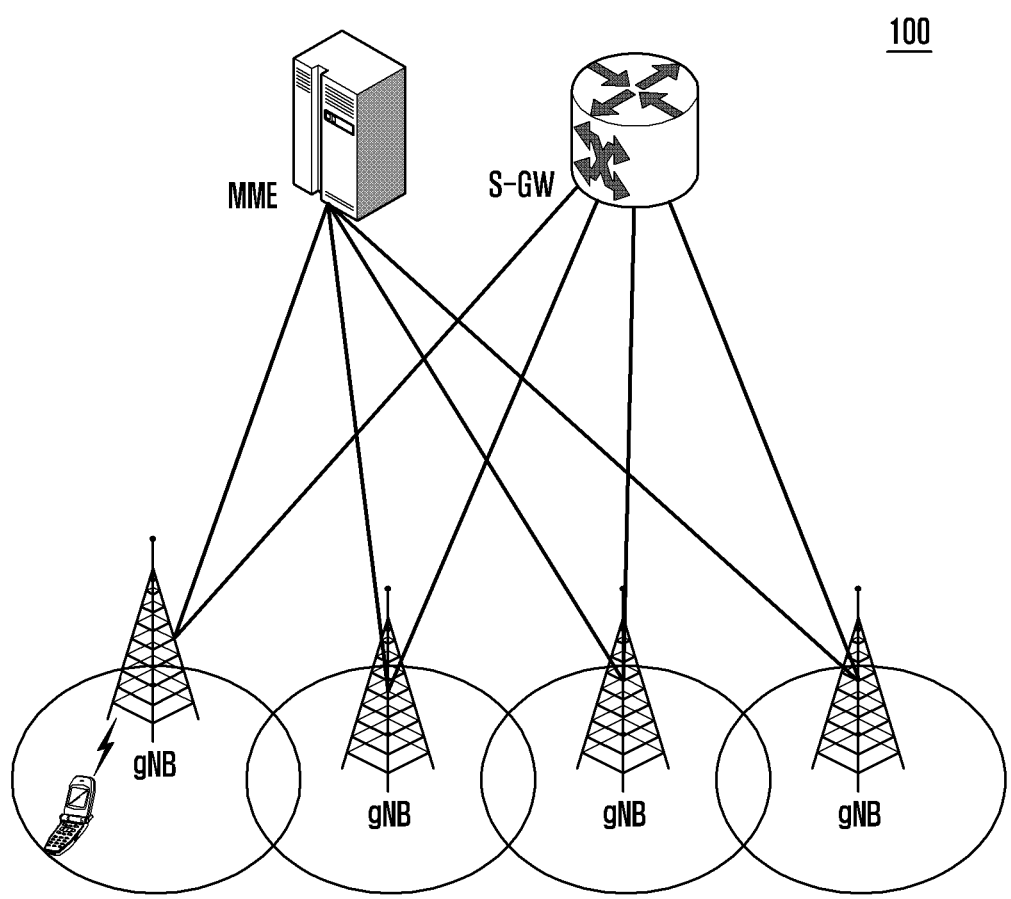
FIG. 1 is a diagram schematically illustrating a structure of a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Meanwhile, the present disclosure describes mobility in a Connected Inactive state (hereinafter, Inactive state) discussed in 5th generation (5G) communication or new radio (NR) which is a next generation mobile communication system. The Inactive state is a technology suggested to achieve an energy efficiency key performance indicator (KPI) discussed in $3^{rd}$ generation partnership project (3GPP) RAN 5G SI, and it is expected to bring an effect of reducing power consumption and extending battery life by an energy-efficient operation when a terminal is operated in the Inactive state.

Further, the present disclosure relates to an operation of physical (PHY)/media access control (MAC)/radio link control (RLC) layers of a terminal and a base station in a mobile communication system. More specifically, the present disclosure relates to a method and apparatus for supporting to maintain service continuity by a measurement and handover procedure according to a service that a terminal uses and a setting of a relevant PHY/MAC layer, when intending to perform the handover of transferring connection of the terminal from one base station to another base station.

Further, the present disclosure relates to an operation of determining, by a terminal, whether to measure signal strength of a neighboring base station in a mobile communication system. More specifically, an operation of determining, by a terminal, whether to measure an NR-SS or a CSI-RS transmitted by a neighbor base station depending on whether an s-Measure for an NR-SS is satisfied and whether an s-Measure for a CSI-RS is satisfied after the terminal measures a signal strength of an NR-SS or a CSI-RS when a serving base station transmits the NR-SS or the CSI-RS is suggested.

First Embodiment

The present disclosure is a technology for an operation method of a base station and a terminal for achieving an energy efficiency KPI discussed in a wireless communication system. In the corresponding standard, an energy-efficient operation is defined as having a main purpose of improving energy efficiency [bit/J] of a terminal and base station network by 1000 times or more in the next 10 years. To this end, a method of decreasing an active operation time of the terminal in order to decrease a possibility of additional power consumption according to a necessary beamforming transmission method at the time of millimeter wave (mmW) operation in a high frequency band.

The technology suggested in the present disclosure is a technology relating to a method for controlling and maintaining RRC connection based on three RRC states, a Connected_Active (RRC CONNECTED) state, a Connected_Inactive (RRC_INACTIVE) state, and an Idle (RRC IDLE) state in a mobile communication system (5G or NR). In particular, a method for determining an RRC state (inactive and/or active) for data transmission and a method for improving spectral efficiency (SE) for a case of efficiently performing transmission in an RRC Inactive state at the time of traffic transmission of the terminal and a channel access method. Meanwhile, the present disclosure describes data transmission by way of example, but the same method may be used for transmission of a control signal as well.

An RRC state for transmission and reception of data by a wireless communication terminal has been excessively conservatively designed based on the voice-call-oriented design philosophy of the previous generation. For example, power consumption for maintaining a wait time such as (Connected DRX) in an RRC connected state even when there is no traffic arrival for a predetermine time after traffic reception, is severe. Further, in a case of a smartphone user, a keep alive message or the like that is irrelevant to user QoS is frequently generated as data, and when RRC connection therefor is designed based on a voice call service, power consumption of the terminal may be further increased.

Therefore, the present disclosure suggests a method for determining an RRC state (Inactive and/or Active) for data transmission and a method for improving spectral efficiency by efficiently performing traffic transmission of the terminal in an RRC Inactive state and a channel access method.

FIG. 1 is a diagram illustrating a structure of a communication system 100 according to an embodiment of the present disclosure.

Referring to FIG. 1, the base stations (gNBs) are connected with a user equipment (UE) through a wireless channel, and may perform more complicated roles than those of a NodeB of the existing Universal Mobile Telecommunications Service (UMTS) and an evolved node B (eNodeB) base station of LTE.

In the corresponding mobile communication system, all user traffics including a real-time service such as a voice over IP (VoIP) service through an internet protocol are provided through a shared channel, thus a device for scheduling by collecting state information such as a buffer state, an available transmission power state, a channel state, and the like of UEs is needed, and the gNBs serve as the device. One gNB generally controls a plurality of cells.

A serving gateway (S-GW) is a device providing a data bearer, and generates or remove a data bearer according to a control of a mobility management entity (MME).

The MME is a device serving to perform various control functions in addition to a mobility management function for the terminal, and connected with a plurality of base stations.

FIG. 1 describes a structure of the communication system (5G, NR) according to an embodiment of the present disclosure, and next, a Connected_Active (RRC CONNECTED) state, a Connected_Inactive (RRC INACTIVE) state, and an Idle (RRC IDLE) state in the communication system according to an embodiment of the present disclosure will be described with reference to FIG. 2.

Figure 2:
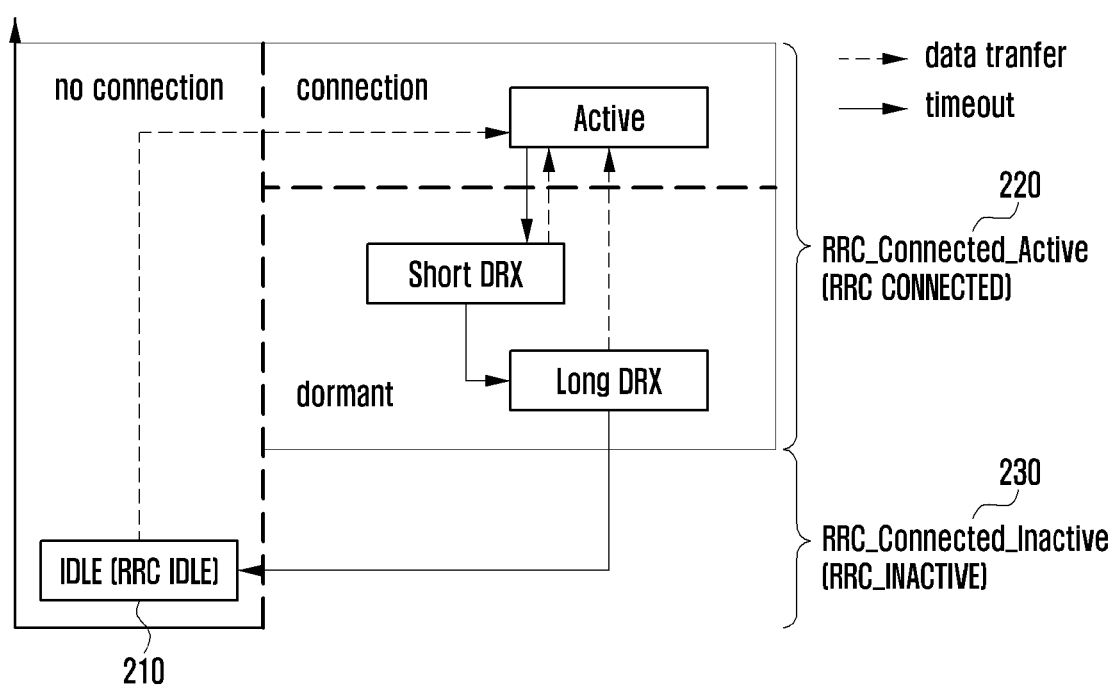
FIG. 2 is a diagram illustrating an example of an operation in a Connected_Active (RRC CONNECTED) state, a Connected_Inactive (RRC_INACTIVE) state, and an Idle (RRC IDLE) state in the communication system according to an embodiment of the present disclosure.

FIG. 2 is a diagram illustrating an example of an operation in a Connected_Active (RRC CONNECTED) state, a Connected_Inactive (RRC_INACTIVE) state, and an Idle (RRC IDLE) state in the communication system according to an embodiment of the present disclosure.

Referring to FIG. 2, the 3GPP NR operates three RRC states 210, 220, and 230 by adding the Inactive state to the existing two RRC states, and the terminal may be operated in one RRC state at a time.

Figure 3:
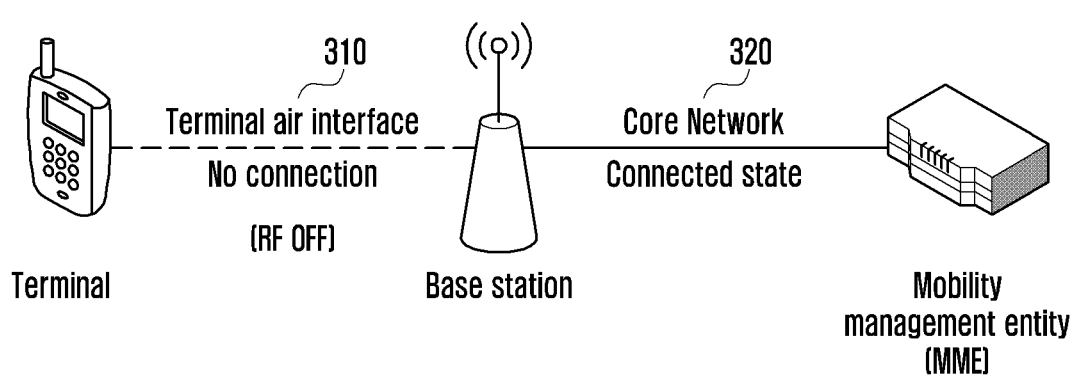
FIG. 3 is a diagram illustrating an example of a state of a terminal, a base station, and a mobility management entity (MME) in the Inactive (RRC_INACTIVE) state in the communication system according to an embodiment of the present disclosure.

FIG. 3 is a diagram illustrating an example of a state of a terminal, a base station, and an MME in the Inactive state in the communication system (5G, NR) according to an embodiment of the present disclosure.

In the Inactive state which is a new RRC state of NR, an air interface between the terminal and the base station is in a no-connection state (310), thus a radio resource allocated by the base station to the terminal is released, but a connection state between the base station and a core network maintains a CN-CONNECTED state. That is, the connection state between the MME and the base station means a state in which the terminal maintains (320) the CN-CONNECTED state, and releases the RRC Connected_Active (RRC CONNECTED) state with the base station, such that even when entering the RRC_INACTIVE state, the base station and the MME store a terminal context in an ECM connected state.

Figure 4:
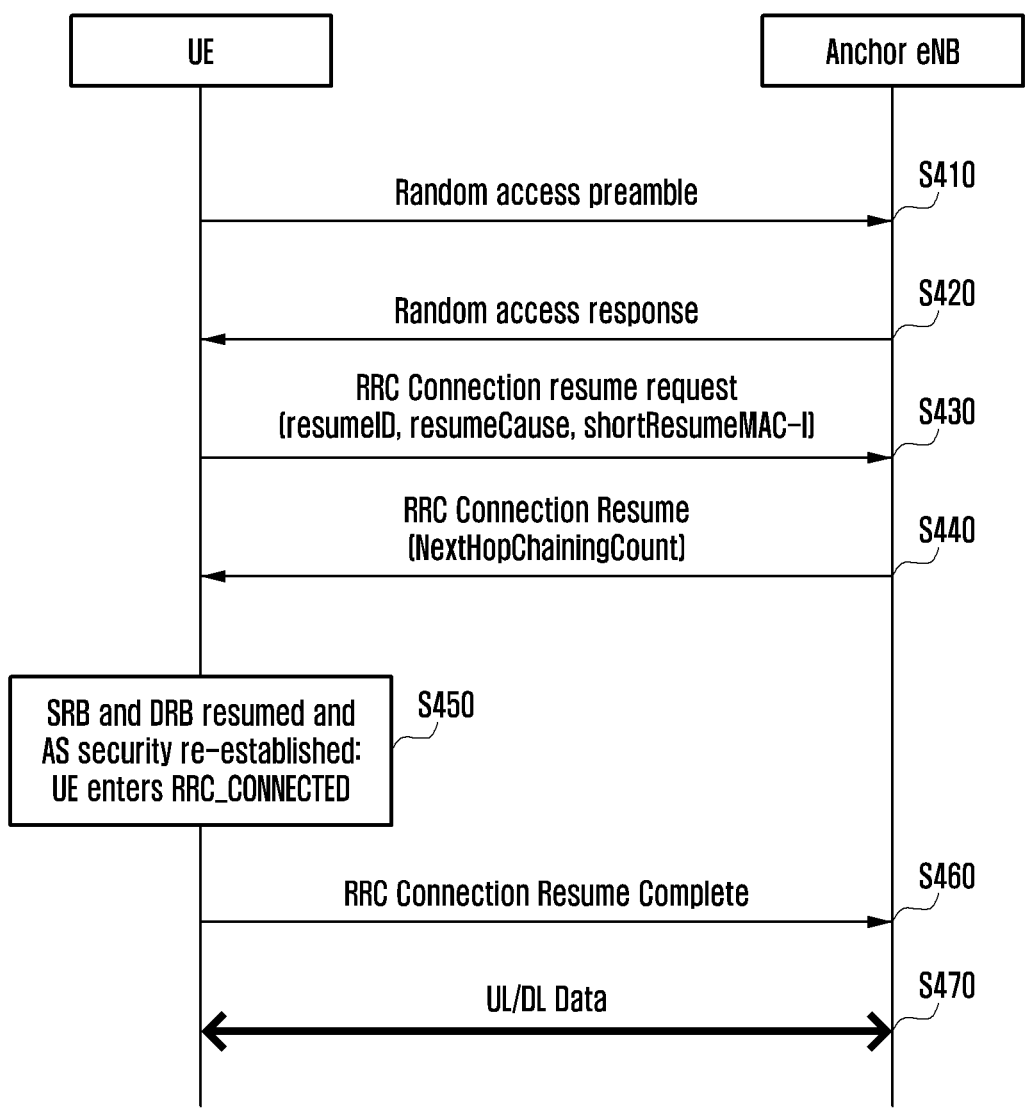
FIG. 4 is a diagram illustrating an example of state transition between RRC states (idle (RRC IDLE), Connected_Active (RRC CONNECTED), and Connected_Inactive (RRC CONNECTED))

FIG. 4 is a diagram illustrating an example of state transition between RRC states (Inactive and connected state) according to an embodiment of the present disclosure.

An S1 connection configuration and security procedure needs to be omitted to decrease RRC transition delay in an RRC idle state. For this, the RRC inactive state is introduced, and an anchor eNB stores a UE context including a resume ID for UE identification.

Referring to FIG. 4, the terminal may transmit a random-access preamble in paging area S410, and the base station may transmit a random-access response to the terminal in S420 accordingly.

Further, the terminal may transmit a corresponding ID in order to confirm an identity of the terminal in a process of accessing a new base station (gNB) at the time of movement in the RRC inactive state. Therefore, the terminal may include, for example, a resumeID in an RRC connection resume request and transmit the RRC connection resume request to the base station in paging area S430.

The base station (which is the existing base station when the terminal is stopped or is located in the same cell, or is the new base station when the terminal moves) that the terminal accesses retrieves the UE context based on a terminal ID, and transmits an RRC connection resume response message to the terminal in operation S440 to perform a subsequent access process.

However, in the case, since the terminal transmits data in operation S470 after the transition to the RRC connected state (RRC resume) in operations S450 and S460, a separate DRB configuration for the idle state is not made, and the corresponding configuration is not required.

Figure 5:
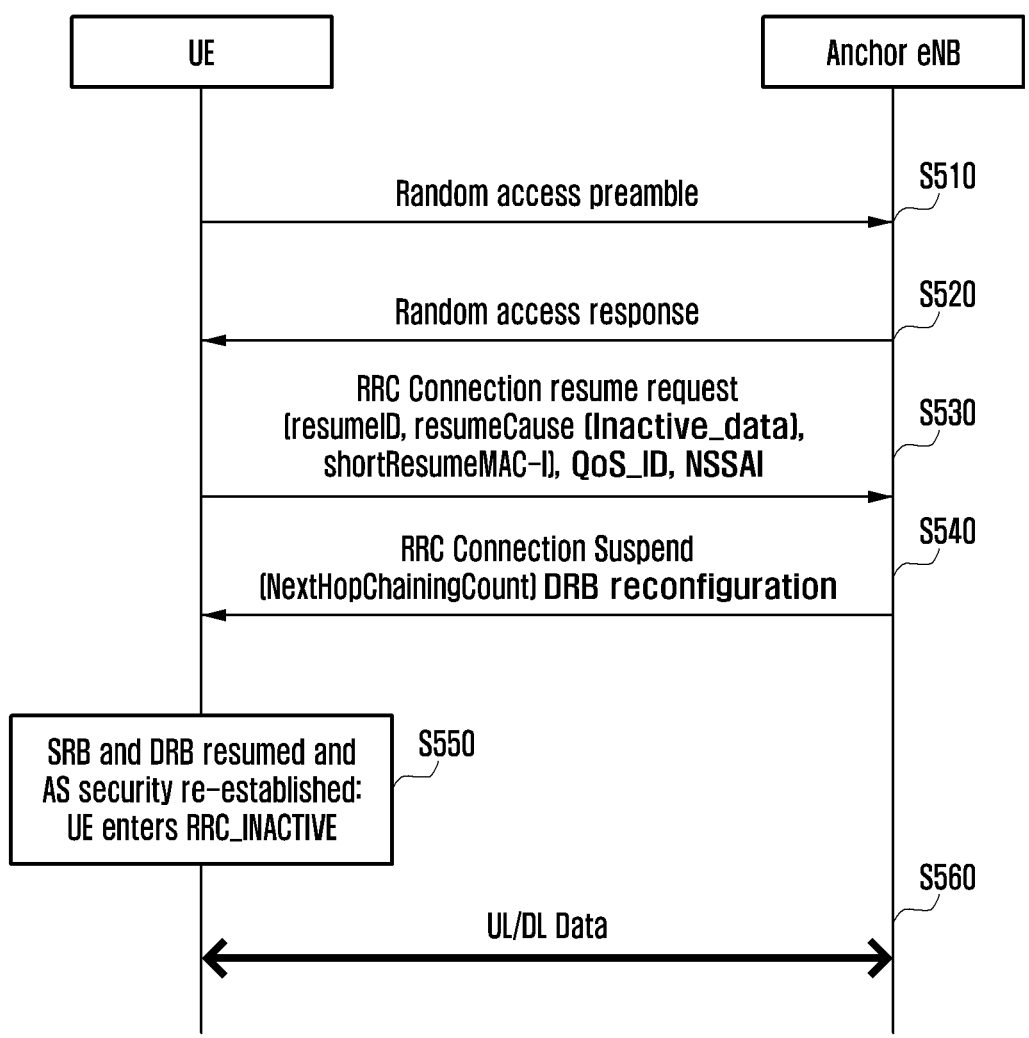
FIG. 5 is a diagram illustrating an operation of user equipment (UE) context (addition of information) transmission and data radio bearer (DRB) reconfiguration for a data transmission operation in the INACTIVE state in a new radio (NR) system according to an embodiment of the present disclosure.

FIG. 5 is a diagram illustrating an operation of UE context (addition of information) transmission and DRB reconfiguration for a data transmission operation in the INACTIVE state in an NR system according to an embodiment of the present disclosure.

Referring to FIG. 5, operations S510 and S520 are the same as operations S410 and S420 in FIG. 4.

As described above, the base station may omit the S1 connection configuration and security procedure through Resume_ID for anchor eNB/UE identification.

However, since data transmission in the newly introduced RRC_Inactive state is considered in NR, the terminal does not perform transition to the RRC Connected_active state (transmission and reception of RRC suspend message), a separate DRB configuration for data transmission in the INACTIVE state is additionally required. For this, as illustrated in FIG. 5, transmission of additional information 510 is required.

For this, the terminal may include QoS_ID, QoS_ID to DRM mapping, and network slice selection assistance information (NSSAI) alone or a combination thereof in the existing UE context field, in addition to resumeID, resume-Cause, shortResumeMAC-I, and the like, and store and transmit the same when transmitting an RRC connection resume request message in paging area S530. At this time, information included in the UE context may be configured as shown in the following Table 1.

TABLE 1

| UE context |
| --- |
| resumeID, shortResumeMAC-I, |
| QoS_ID, QoS_ID to DRB mapping, NSSAI | resumeID is a unique identity in a paging area of the terminal, which stores a UE context in an anchor eNB and is information for identifying a UE in a forwarding and retrieve operation between the base stations (anchor gNB–current gNB).

QoS_ID is a QoS Flow ID of a traffic to be transmitted by the terminal, and the terminal may transmit the corresponding information to the base station so that the information is used as additional information in a DRB configuration.

QoS_ID to DRB mapping information is information about to which DRB a QoS Flow ID of the traffic to be transmitted by the terminal is mapped based on a DRB mapping rule corresponding to a DL data QoS_ID while being in the active state recorded up to recently, and the information may be stored in the UE context.

NSSAI is network slice selection assistance information, and information on network slice corresponding to the terminal, and the terminal may transmit the corresponding information to the base station so that the information is used as additional information in a DRB configuration.

Alternatively, as another embodiment, in order for the terminal to transmit data in the Inactive state, together with a terminal ID for retrieving the UE context stored in the anchor gNB, the terminal may piggyback and transmit the following information as payload when transmitting an RRC connection request or RRC resume request.

TABLE 2

RRC connection request
resumeID, resumeCause (Inactive_data, Active_data),
shortResumeMAC-I, QoS_ID, QoS_ID to DRB mapping, NSSAI The corresponding resumeID is a unique identity in a paging area of the terminal, which stores a UE context in an anchor eNB and is information for identifying a UE in a forwarding and retrieve operation between the base stations (anchor gNB–current gNB).

The item, resumeCause may be set to be a mode (Inactive_data) in which data is transmitted in the Inactive (RRC INACTIVE) state, or a mode (Active_data) in which data is transmitted by transition to the Connected_active (RRC CONNECTED) state when starting data transmission in the Inactive state. Therefore, the terminal may transmit, to the base station, resumeCause set to be the mode (Inactive_data) in which data is transmitted in the Inactive state or the mode (Active_data) in which the data is transmitted by transition to the Connected_active state.

Accordingly, when such resumeCause is set, the terminal may or may not transmit QoS_ID and NSSAI which are additional information.

For example, when resumeCause=Inactive_data, the terminal may transmit QoS_ID and NSSAI.

On the contrary, when resumeCause=Active_data, the terminal may not transmit QoS_ID and NSSAI.

QoS_ID is a QoS Flow ID of traffic to be transmitted by the terminal, and the terminal may transmit the corresponding information to the base station so that the information is used as additional information in a DRB configuration.

QoS_ID to DRB mapping information is information about to which DRB a QoS Flow ID of the traffic to be transmitted by the terminal is mapped based on a DRB mapping rule corresponding to a DL data QoS_ID in the active state and inactive state recorded up to recently, and the terminal may transmit the corresponding information to the base station so that the information may be used as additional information in a DRB configuration.

NSSAI is network slice selection assistance information, and information on network slice corresponding to the terminal, and the terminal may transmit the corresponding information to the base station so that the information is used as additional information in a DRB configuration.

Therefore, the base station may transmit an RRC connection suspend (or RRC connection response) message including a DRB configuration to the terminal in operation S540. According to the message, the terminal may maintain the RRC inactive state in operation S550, and may transmit and receive data in operation S560.

As such, a DRB configuration operation for data transmission in the RRC Inactive state may be performed by the method of transmitting resumeCause (Inactive_data and Active_data), QoS_ID, or NSSAI alone or a combination thereof.

Figure 6:
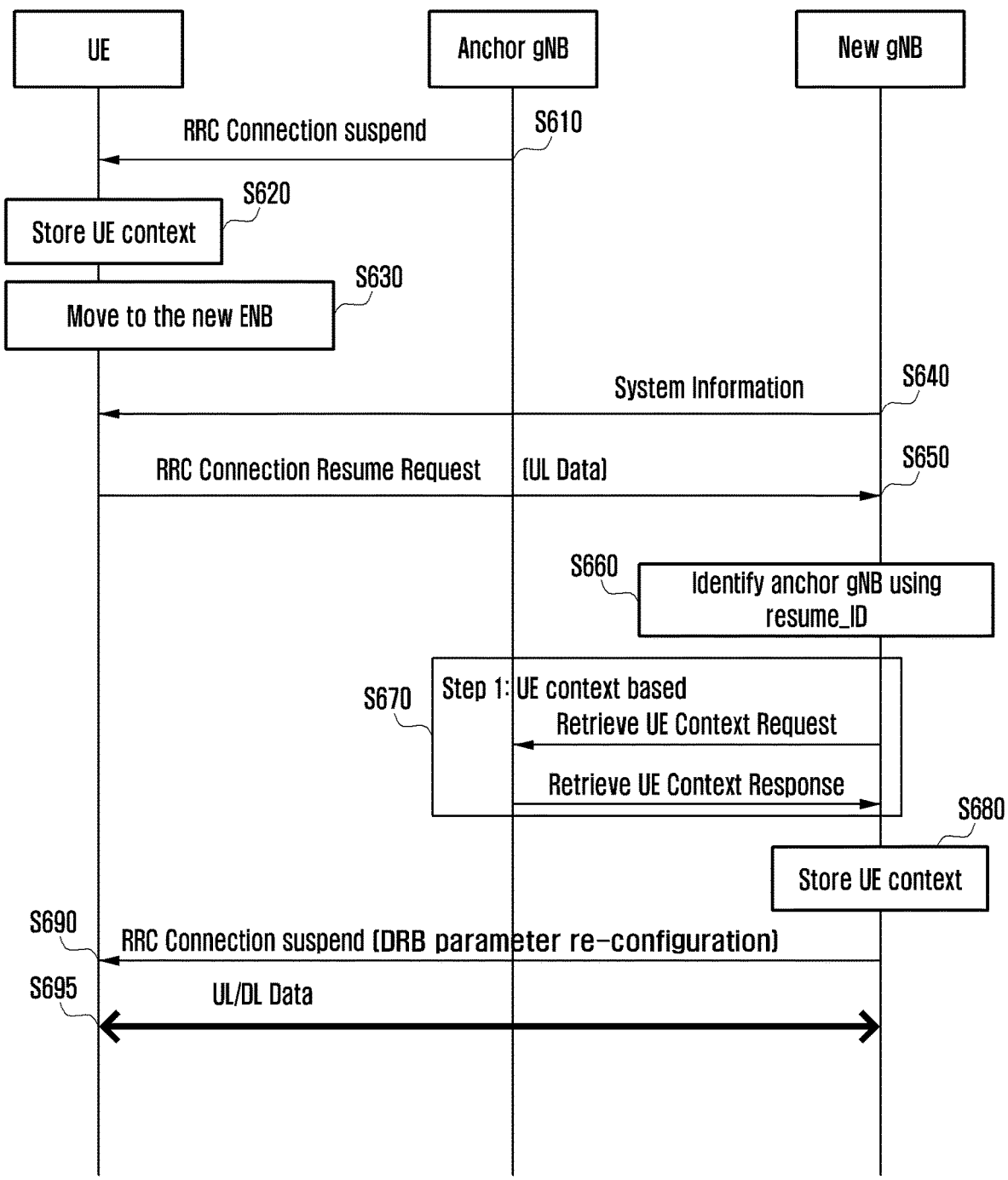
FIG. 6 is a diagram illustrating an operation of UE context (addition of information) transmission and DRB reconfiguration for a data transmission operation in the INACTIVE state in consideration of movement of the terminal according to an embodiment of the present disclosure.

FIG. 6 is a diagram illustrating an operation of UE context (addition of information) transmission and DRB reconfiguration for data transmission in the INACTIVE state in consideration of movement of the terminal according to an embodiment of the present disclosure.

In order to decrease RRC transition delay in the Inactive state, an S1 connection configuration and security procedure needs to be omitted. To this end, the anchor eNB stores a UE context including a resume ID for UE identification.

Specifically, the anchor eNB may transmit an RRC message (e.g., RRC connection suspend message) to the terminal in operation S610, and the terminal may store the UE context in operation S620.

Further, the terminal may move to a new base station (new gNB) in operation S630. In addition, the terminal may receive system information from the new base station (new gNB) in operation S640. When the terminal moves in the Connected_Inactive state, in the process of accessing the new base station (gNB), the terminal may transmit the corresponding ID to identify an identity of the terminal. Therefore, the terminal may include resumeID in an RRC connection resume request and transmit the request to the base station in operation S650.

The base station that the terminal accesses (which is the existing base station when the terminal is stopped or is located in the same cell, or is the new base station when the terminal moves) retrieves the UE context based on the terminal ID and performs a subsequent access process.

Specifically, when the base station (anchor gNB) storing the UE context and the base station (current gNB) to which the current terminal requests data transmission are different from each other as the terminal moves in the Inactive state period, the new base station identifies the anchor eNB using the resume ID in operation S660, and retrieves the UE context from the anchor gNB in operation S670 and performs a subsequent access process.

That is, although the UE context is stored in the anchor eNB which is the last connected_active cell, since there is a possibility that the base station (anchor gNB) storing the UE context in an initial stage and the base station (current gNB) to which the current terminal requests data transmission are different from each other due to a possibility that the terminal moves, the DRB configuration process for data transmission in the Inactive state includes a method including the following two operations.

Step 1] forwarding and retrieve operation between base stations (anchor gNB–current gNB) that reuses UE context stored in anchor eNB which is the last connected_active cell (operation S670).

When the UE context is stored in the anchor eNB which is the recent connected_active cell, a UE context field may include the following information.

| resumeID, shortResumeMAC-I, |
| QoS_ID, QoS_ID to DRB mapping, NSSAI |

In Step 1 described above, a method for storing the UE context and configuring DRB information in a retrieve procedure includes a static DRB parameter configuration method.

According to an embodiment, QoS ID to DRB mapping (from recent active state) information or network slice selection assistance information (NSSAI) and a combination thereof are included.

Further, the new base station (new gNB) may store the retrieved UE context in operation S680.

Step 2] data transmission operation in Inactive state by terminal (operation S695).

The terminal may piggyback and transmit the following information as payload together with a terminal ID for retrieving the UE context stored in the anchor gNB when transmitting an RRC connection request or RRC resume request.

| resumeID, resumeCause (Inactive_data, Active_data), |
| shortResumeMAC-I, QoS_ID, QoS_ID to DRB mapping, NSSAI |

At this time, in response to the corresponding RRC connection request or RRC resume request, the base station may transmit an RRC connection response (RRC connection suspend) in operation S690, and may configure a DRB of the terminal in the operation of transmitting the response.

In Step 2 described above, a method for configuring DRB information through RRC connection request/response signaling includes a dynamic DRB parameter configuration.

According to an embodiment, the dynamic DRB parameter configuration includes an AMBR, information, and a combination of a DRB based on NW loading information which is a time/channel varying parameter.

Through the DRB configured by the method as described above, the terminal may transmit and receive data in operation S695.

Figure 7:
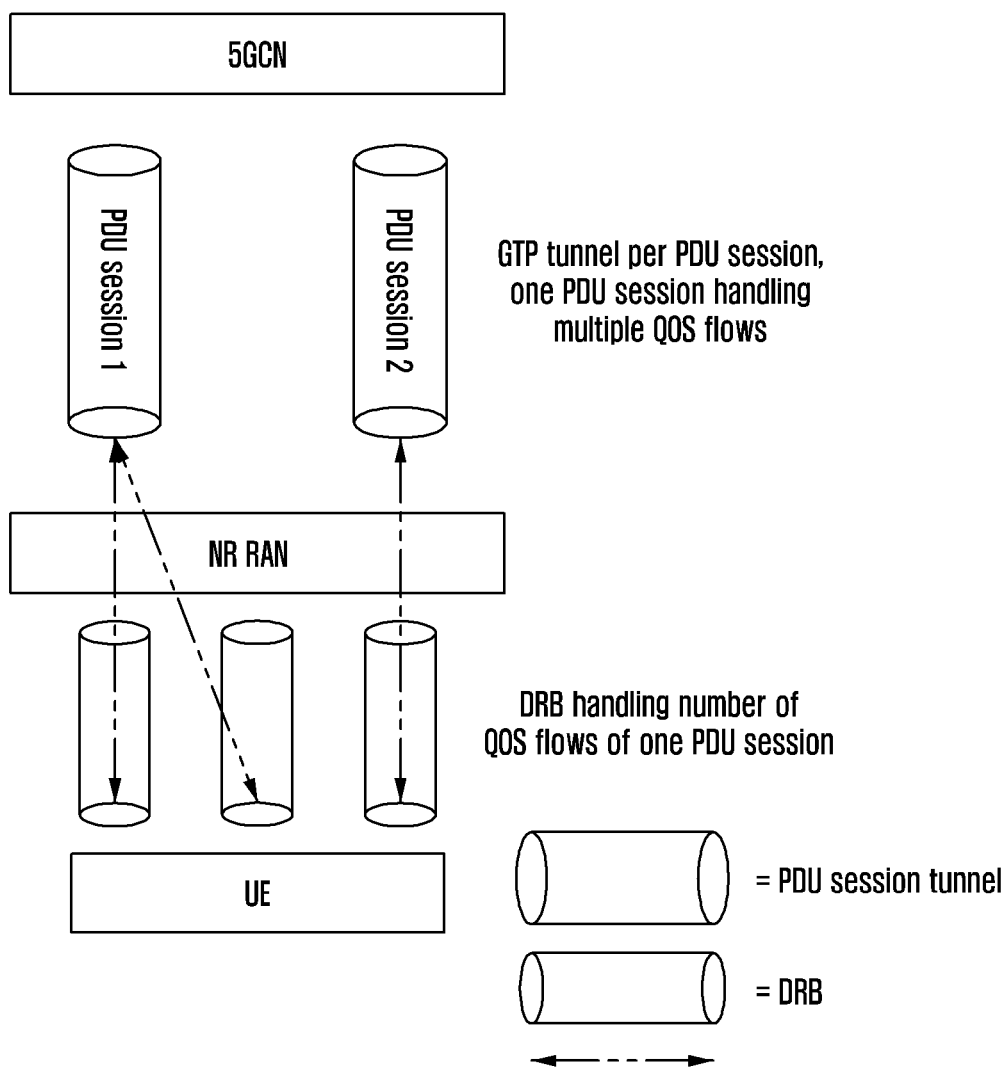
FIG. 7 is a diagram schematically illustrating a reflective quality of service (QoS) operation in the NR system according to an embodiment of the present disclosure.

FIG. 7 is a diagram schematically illustrating a reflective QoS operation in the NR system according to an embodiment of the present disclosure.

Reflective QoS may be operated as in an embodiment described below.

| For reflective QoS, the UE determines a QoS Flow ID to DRB mapping based on the downlink packets received within a DRB and applies those filters for mapping uplink flows to DRBs. |
| The UE continuously monitors the QoS Flow ID in downlink PDCP packets and updates the reflective QoS Flow ID to DRB mapping in the uplink accordingly. |
| Such uplink flow mapping may be configured through the RRC configuration or reconfiguration: |
| If a received UL packet does not match a QoS Flow ID (that is, for a QoS ID that is not configured via reflective QoS), an operation that the UE maps a DRB of the uplink flow to the default DRB of the PDU session based on the packet is included. |

Hereinafter, a QoS support operation at the time of data transmission in the Inactive state according to an embodiment will be described.

An option for the QoS support operation at the time of data transmission in the Inactive state may be set and transmitted by the base station according to the following methods:

1. A method of storing in the UE context and transmitting a QoS support operation option at the time of data transmission in the Inactive state of the corresponding terminal;

2. A method in which the base station determines an RRC state that will be applied at the time of data transmission (whether the transmission is performed in the Inactive state or the transmission is performed after transition to the active state) and a corresponding QoS support operation option, and transmits the determined option to the terminal through the RRC connection response for the RRC connection request;

Specifically, the base station may determine an RRC state that will be applied at the time of data transmission (whether the transmission is performed in the Inactive state or the transmission is performed after transition to the active state) based on QoS_ID or NSSAI information alone, or a combination thereof included in the UE context that is stored (or forwarded from the anchor gNB and retrieved) and the RRC connection request message, determine a QoS support operation option corresponding thereto, and transmit the determined option. (according to an embodiment, the base station may include, in the RRC connection response, and transmit the information).

3. alternatively, a method in which the corresponding base station includes, in a new field of system information, and transmits an option for a QoS support operation at the time of data transmission in the supported Inactive state.

The base station may set or update an option for the QoS support operation at the time of data transmission in the Inactive state by each of the methods or a combination of the methods.

The option for the QoS support operation at the time of data transmission may include the following options.

Option 1] Operation through default DRB (or operation to dedicated DRB)

1-1] Transmission through default DRB for data transmission in entire RRC Inactive state This means an operation of transmitting corresponding data through a fixed default DRB (or dedicated DRB) regardless of a QoS_ID of the terminal and the previous reflective QoS rule (QoS_ID to DRB mapping).

1-2] Generation of separate DRB for each QoS ID and data transmission through RRC resume message when terminal is switched to RRC Active state When it is determined that RRC state transition to the Active state (RRC CONNECTED) is needed except for initial transmission or from the initial transmission in order to satisfy performance requirement based on QoS_ID and NSSAI information, as a condition for switching to the Active state, the base station may generate a separate DRB for each QoS_ID based on QoS_ID and NSSAI information of the corresponding terminal included in the UE context, or may generate a separate DRB for each QoS ID based on QoS_ID and NSSAI information included in the RRC connection request. At this time, the base station may perform the determination based on the QoS_ID or NSSAI alone or a combination thereof.

Figure 8:
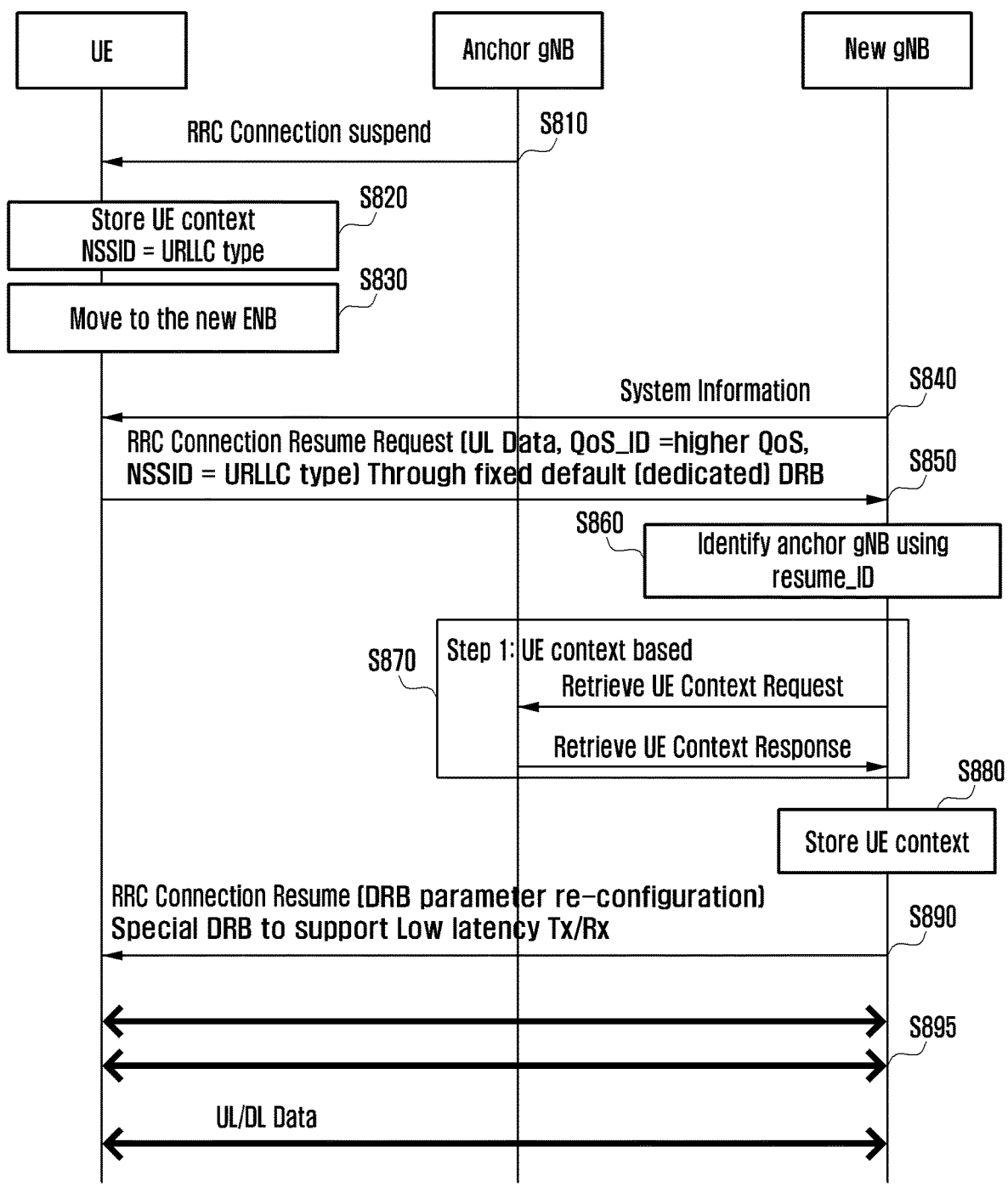
FIG. 8 is a diagram illustrating an example in which data is transmitted by transition to an RRC active state after initial transmission is performed in the Inactive state to support QoS of an ultra-reliable and low latency communication (URLLC) traffic according to an embodiment of the present disclosure.

FIG. 8 is a diagram illustrating an example in which data is transmitted by transition to an RRC active state after initial transmission is performed in the Inactive state to support QoS of an URLLC traffic according to an embodiment of the present disclosure.

Referring to FIG. 8, operations S810 to S840 are similar to operations S610 to S640 in FIG. 6, thus a detailed description thereof will be omitted.

However, FIG. 8 is to support QoS of an URLLC traffic, and NSSID may be set as an URLLC type and stored in the UE context in operation S820. However, a content of the present disclosure is not limited thereto.

As illustrated in FIG. 8, according to an embodiment, for a traffic flow corresponding to QoS_ID requiring low latency, the terminal performs piggybacking on the RRC connection request (resume request) through a fixed default DRB 810 (or dedicated DRB) to perform initial transmission in operation S850.

At this time, the RRC connection resume request message may include at least one of information such as uplink data, QoS_ID, NSSID, and the like. Next, operations S860 to S880 are the same as operations S660 to S680 in FIG. 6.

In the subsequent transmission, the terminal may transmit data through a separate DRB generated for each QoS ID based on the DRB configuration configured through the RRC connection response (RRC reconfiguration).

That is, the base station may transmit an RRC connection resume message to the terminal in operation S890. Accordingly, the state transition of the terminal to the RRC connected state may be made. At this time, the RRC connection resume message may include DRB configuration information, and for example, in the present disclosure, a DRB supporting low latency may be generated according to the DRB configuration information. Therefore, the terminal and the base station may transmit and receive data using the DRB in operation S895.

UL QoS_ID to DRB mapping information of the terminal for the DRB configuration configured through the RRC connection response (RRC reconfiguration) is initialized, and the terminal may monitor a PDCCH of a DL traffic from the start for confirmation or determination may be made based on the QoS_ID to DRB mapping information of the terminal included in the UE context.

Alternatively, a UL QoS_ID DRB mapping role may be reused based on the QoS_ID to DRB mapping information included in the RRC connection request.

Hereinafter, another option for the QoS support operation at the time of data transmission will be described.

Option 2] Transmission through default (or dedicated) DRB switched after maintaining QoS ID to DRB mapping rule 2-1] Transmission with reflective QoS in entire Inactive state The terminal may transmit data based on QoS_ID to DRB mapping information stored in the UE context.
The terminal may transmit data based on QoS_ID to DRB mapping information included in the RRC connection request.

That is, the terminal may transmit data by applying the QoS ID to DRB mapping rule from the initial data transmission when transmitting date in the Inactive state.

2-2] Transmission through default (fixed dedicated) DRB thereafter

1) An operation of performing data transmission with reflective QoS in the Inactive state may be performed before a validity timer of the reflective QoS expires.

The validity timer (Timer_RQ) of the reflective QoS (QoS ID to DRB mapping) may be included in the RRC suspend message when switching to the RRC inactive state by the setting performed by the base station. Alternatively, the timer may be broadcasted and updated through system information to be transmitted. Alternatively, the timer (Timer_RQ) may be reset when generating and transmitting a new DL/UL traffic.

2) Alternatively, when the corresponding terminal performs data transmission with the anchor base station accessed in the last connected_active state, the transmission is performed by applying the reflective QoS, and when the terminal moves to other base station and data transmission is performed in the Inactive state, the data may be transmitted through the default (fixed dedicated) DRB.

Alternatively, a method in which when the terminal moves to other base station and data transmission is performed in the Inactive state, the current base station identically applies the reflective QoS (QoS ID to DRB mapping rule) transmitted by the terminal through the UE context and/or RRC connection request or updates the reflective QoS to transmit the corresponding reflective QoS (QoS ID to DRB mapping rule) to the terminal through the RRC connection response, and apply the reflective QoS is included.

Option 3] Method of transmitting by switching to QoS ID to DRB mapping rule even in inactive state after initial transmission through fixed default (dedicated) DRB 3-1] Initial transmission through fixed default (dedicated) DRB (based on RRC connection resume request message and UE context)

3-2] Generations of separate DRB for each QoS ID and data transmission through RRC resume response message for requirement (e.g., requiring short delay that is shorter than threshold value) of newly generated DL/UL QoS ID while maintaining RRC inactive state.

Hereinafter, another method for the QoS support operation at the time of data transmission will be described.

Figure 9:
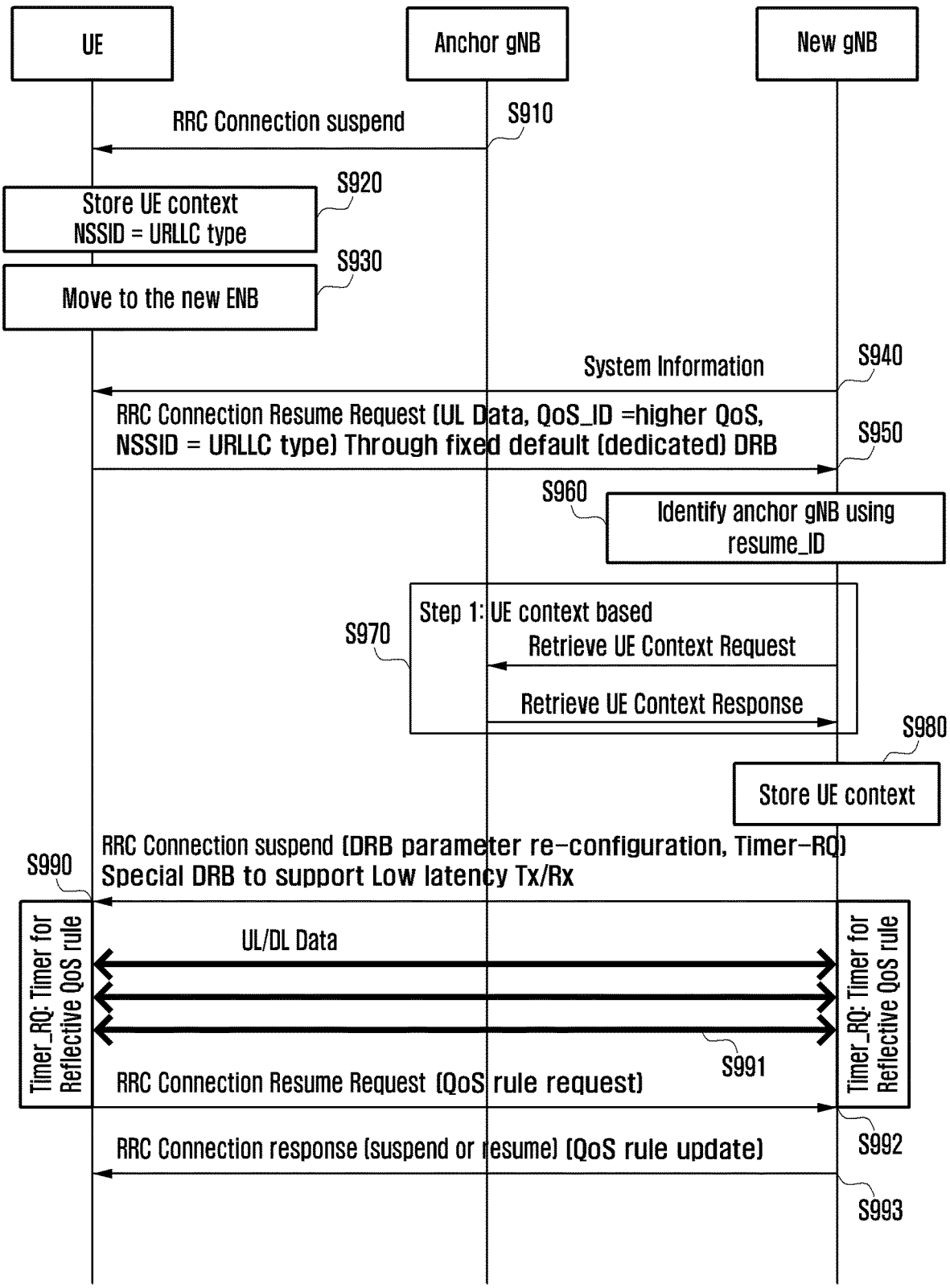
FIG. 9 is a diagram illustrating an example of a method of performing initial data transmission and subsequent data transmission for supporting QoS of an URLLC traffic in an RRC Inactive state according to an embodiment of the present disclosure.

FIG. 9 is a diagram illustrating an example of a method of performing initial data transmission and subsequent data transmission for supporting QoS of URLLC traffic in an RRC Inactive state according to an embodiment of the present disclosure.

Referring to FIG. 9, operations S910 to S980 are similar to operations S810 to S880 in FIG. 8, thus a detailed description thereof will be omitted.

Referring to FIG. 9, in the present embodiment, a method of performing preconfiguration of a special DRB for supporting low latency performance and applying the DRB is described.

According to an embodiment, for a traffic flow corresponding to QoS_ID requiring low latency, the terminal performs piggybacking on the RRC connection request (resume request) through a fixed default DRB (or dedicated DRB) to perform initial transmission in operation S950.

Further, in the subsequent transmission, the terminal may transmit data by generating a separate DRB for each QoS ID based on special DRB configuration configured through the RRC connection response (RRC reconfiguration).

Specifically, the base station may transmit an RRC connection suspend message to the terminal in operation S990. Accordingly, the state of the terminal may be maintained as the RRC inactive state. At this time, the RRC connection suspend message may include DRB configuration information, and for example, in the present disclosure, a DRB supporting low latency may be generated according to the DRB configuration information. Therefore, the terminal and the base station may transmit and receive data using the DRB in operation S991.

However, a validity timer of reflective QoS may be included in the RRC connection suspend message, and data transmission through the DRB may be performed before the timer expires.

When the timer expires, the terminal may transmit an RRC connection request message to the base station in operation S992, and a QoS rule request may be included in the base station. Accordingly, the base station may transmit an RRC connection response including an updated QoS rule in operation S993.

Second Embodiment

The present embodiment describes a method of designing a size of a panging area (PA) of the terminal through optimization. A subject mentioned in the present disclosure is a PA, but may be expanded to a RAN notification area including a tracking area (TA).

The PA is not changed until the terminal re-accesses, once the PA is configured. However, the number of RRC signaling messages and CN signaling messages may be changed in addition to signaling messages sent over X2, S1 interfaces according to a size of a PA. In particular, the number of signaling messages may be changed according to a situation of the terminal, for example, a moving speed of the terminal or a frequency of transmission and reception of a traffic of the terminal, thus the present disclosure suggests a PA optimization method according to the situation of the terminal.

Further, in optimizing a PA, a size of a PA is fixed, and may be commonly set for terminals belonging to the corresponding base station, cell or network through broadcasting of the base station. However, the present disclosure suggests an operation of optimizing the PA by reflecting an individual characteristic of a terminal under the assumption that a size of the PA may be set for each terminal.

PA optimization, that is, criteria for determination of a size of a PA may be determined by the following factors.

1) Terminal mobility (UE mobility): A size of a PA may be set to be different according to a moving speed of the terminal. The terminal mobility may be defined as an absolute speed of the terminal. Alternatively, the terminal mobility may be the number of times of handover per reference time, or the number of times of PA update per reference time, at this time, in order to avoid redundancy, restriction may be made so that only handover or PA update for a new base station/cell is valid.

The terminal mobility may be defined as a new parameter (e.g., timeMoblity . . . ) or calculated using the existing field value. For example, a time for which the terminal stays in a recently visited cell may be obtained by timeSpent value in VarMobilityHistoryReport defined as a UE variable, a field of a time for which the terminal stays in the specific number of cells may be newly defined by accumulating the value (e.g., timeSpent16 . . . ). The information may be continuously tracked and processed by the terminal itself even in a situation in which access to the base station is disabled.

2) Terminal traffic pattern (UE traffic pattern): A size of a PA may be set to be different according to a traffic pattern of the terminal. Specifically, the terminal traffic pattern may be defined as an average inter-arrival time within a reference time, and may also be considered as an inactive state operation time ratio within a reference time of the terminal. At this time, the reference time may be fixed, but may also be variably changed according to a situation of the terminal or network.

The terminal traffic pattern information may be defined as a new parameter or calculated using the existing field value. The corresponding information may be tracked by the terminal, but a connected base station/cell or anchor base station/cell may obtain and process the information.

3) Network loading: A size of a PA may be set to be different according to a network loading. The network unit may be a RAN notification area including cell or base station or TA or PA, and the network loading may be a size or ratio of downlink transmission data load or paging load for each network. This may be defined as a new parameter or calculated using the existing field value.

Figure 10:
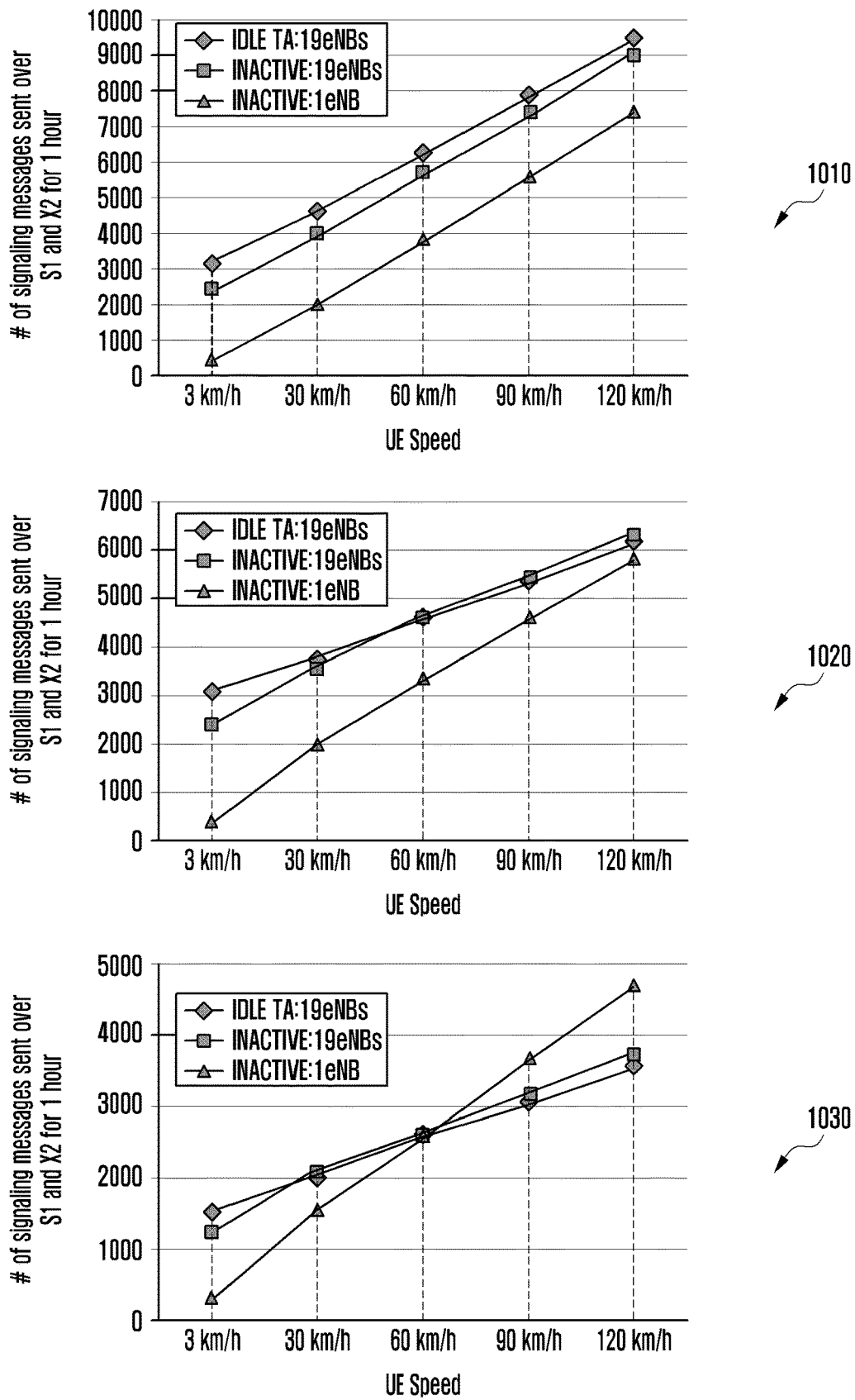
FIG. 10 is a diagram illustrating the number of signaling messages according to a state of the terminal according to an embodiment of the present disclosure.

FIG. 10 is a diagram illustrating the number of signaling messages according to a state of the terminal according to an embodiment of the present disclosure.

Referring to FIG. 10, the diagram illustrates an effect of the present disclosure, and shows the number of signaling messages sent over X2 and S1 according to a moving speed of the terminal and a size of a PA when the terminal transmits FTP1 traffic.

Specifically, 1010 represents a result obtained when an FTP traffic is transmitted once every 10 seconds, 1020 represents a result obtained when an FTP traffic is transmitted once every 30 seconds, and 1030 represents a result obtained when an FPT traffic is transmitted once every 60 seconds.

That is, referring to FIG. 10, the faster the speed of the terminal, the larger the number of signaling messages. Further, when an amount of traffic transmitted by the terminal is large (1010), the larger the size of the PA, the larger the number of signaling messages. Meanwhile, when the amount of traffic transmitted by the terminal is small (1030), the number of signaling messages is changed for each PA size according to the speed of the terminal.

Accordingly, since the speed of the terminal, the traffic pattern transmitted by the terminal, and the PA size may affect the number of signaling messages, the present disclosure describes a method of optimizing a size of a PA according to a state of the terminal (e.g., the speed of the terminal and the traffic pattern). At this time, the criteria for determining the PA size described above are determined by the base station or the terminal, and may be transferred to the network including the PA allocation base station or the MIME as information for PA optimization design. At this time, the network may request the information to the terminal precedently, and in this case, the terminal may share the corresponding information with the network in the form of response. Alternatively, the terminal in the connected or inactive state may share the corresponding content according to a specific event. Alternatively, when the terminal in the idle state is transited to the connected state for data transmission and reception, the corresponding content may be transferred to the network.

Next, a PA optimization procedure according to a PA optimization point in time is described.

First, a method of optimization at a PA update point in time due to a change of a PA will be described.

Figure 11:
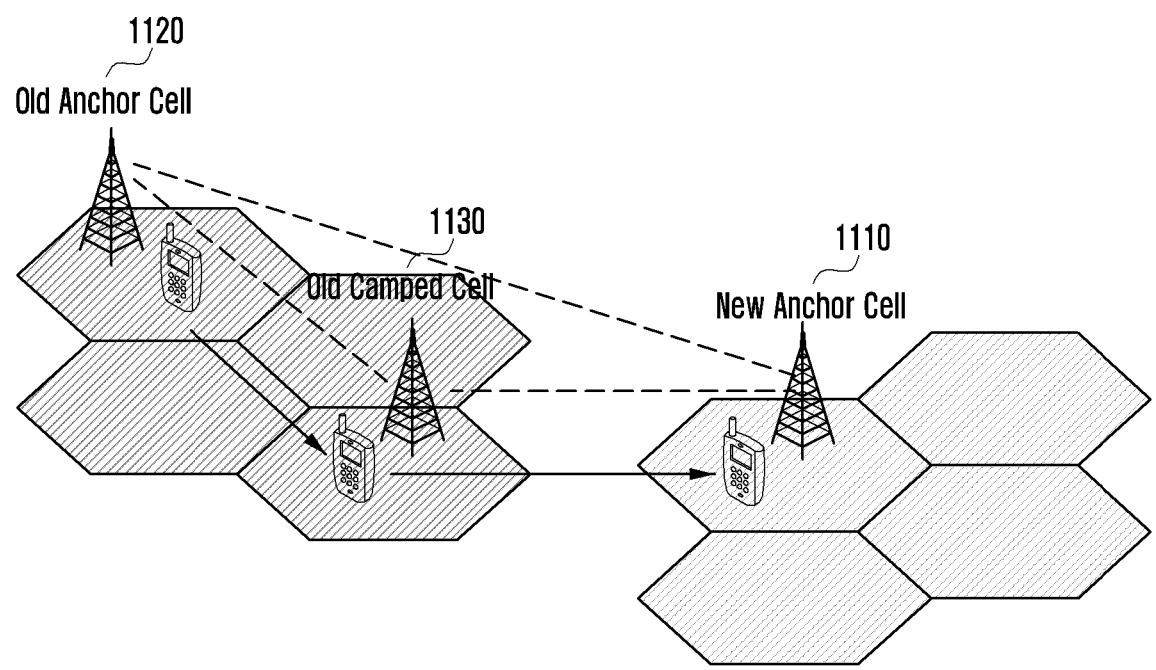
FIG. 11 is a diagram illustrating a paging area (PA) optimization method according to a change of a PA of the terminal according to an embodiment of the present disclosure.

FIG. 11 is a diagram illustrating a PA optimization method according to a change of a PA of the terminal according to an embodiment of the present disclosure.

Referring to FIG. 11, a case in which a change of a PA occurs includes a case in which the terminal moves to leave the existing PA and a new PA is allocated. At this time, the terminal performs PA update, and the following options are available.

1-1) As a first option, the terminal may be transited to the connected state to access a new base station, and perform PA update.

1-1-1) At this time, the terminal performs uplink transmission of mobility information of the terminal and/or traffic pattern information and/or information combining the mobility information and the traffic pattern which are the above-mentioned selection criteria for PA optimization (criteria for determining a PA size). The uplink data may be included in an RRC connection (resume) request message or an RRC connection resume complete message, or transferred to a new anchor cell 1110 in the form of response for a request of the base station.

1-1-2) Alternatively, the terminal may perform uplink transmission of tracked mobility information, and the new anchor cell 1110 may receive traffic pattern information from an anchor cell 1120 of the previous TA or camped cells 1130.

The mobility information required to be transmitted in uplink may be included in an RRC connection (resume) request message or an RRC connection resume complete message, or transferred in the form of response for a request of the base station as in the above-mentioned method. The new anchor cell 1110 may receive the traffic pattern information in the form of response by requesting to the anchor cell 1120 of the previous TA or camped cells 1140.

Alternatively, the new anchor cell 1110 may request the traffic pattern information only to the anchor cell 1120 of the previous TA, for this, while the terminal is camped to a cell other than the anchor cell, the transmitted and received data traffic information (a frequency of transmission/reception, and the like) may be processed in the camped cells, and transferred to the anchor cell. At this time a transfer point in time may be periodic, or may be triggered when the terminal leaves the camped cells. The anchor cell 1120 of the past TA may accumulate the obtained traffic pattern information of the terminal for obtaining the information in the long term. Accordingly, the anchor cell 1110 of the new PA may request the traffic pattern information of the terminal only to the anchor cell 1120 of the previous PA and receive the traffic pattern information in the form of response.

1-2) As a second option, a case in which PA update is performed while the terminal maintains the Inactive state may be included. For the second option, it is assumed that the terminal may support data transmission and reception in the Inactive state. When a change of a PA occurs and the terminal performs PA update, the terminal performs the PA update without transition to the connected state.

1-2-1) At this time, the terminal performs uplink transmission of mobility information of the terminal and/or traffic pattern information and/or information combining the mobility information and the traffic pattern which are the above-mentioned selection criteria for PA optimization (criteria for determining a PA size) in the inactive state. The uplink data may also be transmitted by being included in a PA update message. Alternatively, the data required to be transmitted in uplink may be included in an RRC connection (resume) request message or an RRC connection resume complete message, or transferred to the new anchor cell 1110 in the form of response for a request of the base station.

1-2-2) Alternatively, the terminal may perform uplink transmission of tracked mobility information, and the new anchor cell 1110 may receive traffic pattern information from an anchor cell 1120 of the previous TA or camped cells 1130.

The mobility information required to be transmitted in uplink may be included in an RRC connection (resume) request message or an RRC connection resume complete message, or transferred in the form of response for a request of the base station as in the above-mentioned method in the inactive state. The new anchor cell 1110 may receive the traffic pattern information in the form of response by requesting to the anchor cell 1120 of the previous TA or camped cells 1140.

Alternatively, the new anchor cell 1110 may request the traffic pattern information only to the anchor cell 1120 of the previous TA, for this, while the terminal is camped to a cell other than the anchor cell, the transmitted and received data traffic information (a frequency of transmission/reception, and the like) may be processed in the camped cells, and transferred to the anchor cell. At this time a transfer point in time may be periodic, or may be triggered when the terminal leaves the camped cells. The anchor cell 1120 of the past TA may accumulate the obtained traffic pattern information of the terminal for obtaining the information in the long term. Accordingly, the anchor cell 1110 of the new PA may request the traffic pattern information of the terminal only to the anchor cell 1120 of the previous PA and receive the traffic pattern information in the form of response.

Next, a method of optimization in a PA is described.

Figure 12:
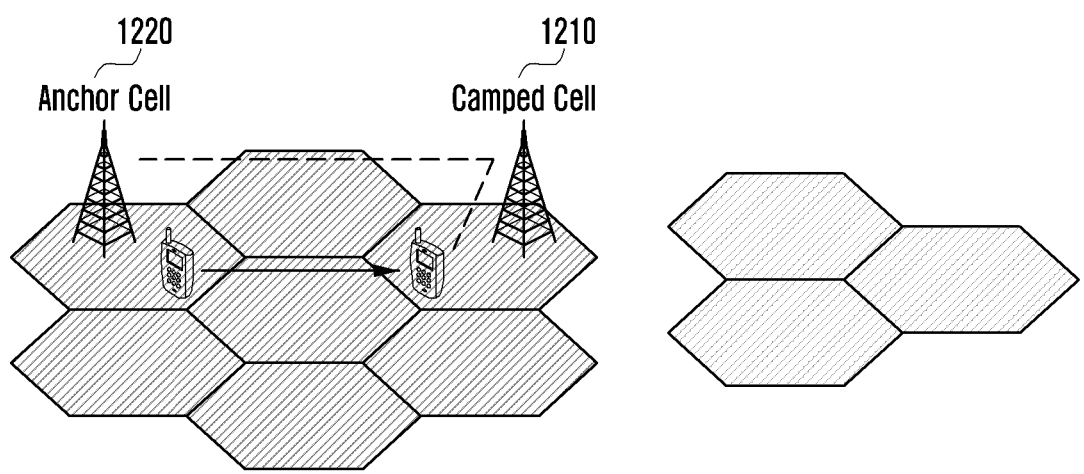
FIG. 12 is a diagram illustrating a PA optimization method in a PA of the terminal according to an embodiment of the present disclosure.

FIG. 12 is a diagram illustrating a PA optimization method in a PA of the terminal according to an embodiment of the present disclosure.

While the terminal belongs to the existing PA, a PA optimization procedure may be performed as a specific terminal event or base station event. This procedure may be performed under the assumption that the terminal may perform data transmission and reception in the Inactive state. In a case in which the terminal may not perform the data transmission and reception in the Inactive state, this procedure may be limitedly applied to the case in which the terminal is transited to the connected state.

1) The optimization procedure may be performed when the terminal first transmits a PA optimization request. At this time, together with the PA optimization request, or after or before transmitting the PA optimization request, the above-mentioned information on the relevant terminal for determining an optimized PA may be transmitted. That is, when the following event occurs, the terminal may transmit the information (criteria for determining a PA size) for determining a PA together with the PA optimization request or transmit the corresponding information in the form of response for a request of the base station receiving the PA optimization request. The terminal may transmit the PA optimization request for the following situation.

1-1) The terminal may transmit the PA optimization request by a periodic event. For this option, a terminal operation timer for the PA optimization request may be newly defined or the existing timer may be used.

1-2) When a mobility pattern of the terminal is changed, the PA optimization request may be triggered. For example, when an absolute speed of the terminal is changed to a specific threshold value or higher or a specific threshold value or less, or when the number of times of handover to a base station/cell or the number of times of PA update within a reference time is increased by a specific number of times and/or a specific ratio, the PA optimization request may be triggered.

1-3) Alternatively, when a traffic pattern of the terminal is changed, the PA optimization request may be triggered. For example, an average inter-arrival time within a reference time or a time ratio in which the terminal is operated in the inactive state that the terminal knows is increased or decreased by a specific time and/or a specific ratio, the PA optimization request may be triggered.

1-4) Terminal setting information, for example, when an element affecting a change in a state of the terminal is changed (e.g., a size of an inactivity timer of the terminal is changed), the PA optimization request may be triggered.

2) The network may first optimize a PA and transmit the corresponding information to the terminal. The network indicates a base station or a network entity such as an MME. When the event occurs, the base station may request information for determining PA optimization to the terminal in advance, and the terminal may transmit the corresponding information in the form of response for the request of the base station.

2-1) For this option, the network may periodically update a PA of the terminal. To this end, an operation timer may be newly defined or the existing timer may be used in the base station or network.

2-2) For a specific event occurring in a network unit, the PA optimization procedure may be performed. For example, and an amount and/or ratio of paging load in the current PA is changed to a specific threshold value or more or a specific threshold value or less, or an amount and/or ratio of downlink data load of the base station is changed to a specific threshold value or more or a specific threshold value or less, the event may occur. Alternatively, the corresponding event may occur according to an active time ratio of the network.

2-3) when terminal setting information is changed by the network, for example, when an element affecting a change in a state of the terminal is changed (e.g., a size of an inactivity timer of the terminal is changed), the network may perform the PA optimization.

2-4) When the terminal is transited to the connected state, information for determining a PA may be transferred to the network, and when it is determined that the PA optimization is needed based on the corresponding information, the network may perform the PA optimization.

For the operations 1) and 2), a PA optimization procedure in a case in which a cell to which the terminal is currently camped is not an anchor cell will be described as follows.

(1) A PA optimization procedure in a case in which the existing anchor cell 1220 determines everything, and a camped cell 1210 may only perform relaying is as follows.

For the operation of Option 1), that is, when a PA optimization request is transmitted from the terminal, the following operations are performed.

Step 1: As the events 1-1) to 1-4 of the terminal occur, the terminal transmits a PA optimization request to a camped cell. At this time, information of the terminal required for determining a PA may be transmitted together with the PA optimization request. In this case, the following step 2 may be omitted.

Step 2: The camped cell receiving the PA optimization request of the terminal requests necessary information to the terminal and receives the information in response thereto.

Step 3: The camped cell may transmit the PA optimization request of the terminal to the anchor cell. At this time, information of the terminal received in Step 1 or 2 may be transmitted together.

Step 4: The anchor cell additionally collects information for PA determination based on the requested terminal information and network information. At this time, the anchor cell requests terminal-related information to cells to which the terminal is previously camped other than the current camped cell and may receive the information in response thereto. Alternatively, the anchor cell may request and receive terminal information required for PA optimization to a higher network entity.

Step 5: The anchor cell performs PA determination based on the received information. At this time, the PA may be directly determined or optimized PA determination may be requested to a network including an MME. The determined PA of the terminal may be processed in a form of a list. In a case in which the PA is not changed, waste of resources may occur in transmitting the list, thus a field for whether or not the PA is changed may be set and transmitted.

Step 6: The determined PA information may be transmitted to the current camped cell requesting the PA optimization. In the case in which the PA is not changed, the anchor cell puts a mark in the field including the corresponding information and transmit the field in advance.

Step 7: The camped cell transmits information on whether the PA received from the anchor cell is changed and/or PA change information to the terminal. The terminal receiving the information removes the previous PA list information and performs update with the new received information.

For the operation of Option 2), that is, when a PA change is requested from the network, the following operations are performed.

—Step 1:

Option 1) A case in which the events 2-1 to 2-4 occur in a camped cell,

Option 1-1) The camped cell may request information for determining PA optimization to the terminal in advance, and the terminal may transmit the corresponding information in the form of response for the request of the base station. The camped cell may transmit the corresponding information together while transmitting a PA optimization request to the anchor cell.

Alternatively, Option 1-2) the camped cell transmits the PA optimization request to the anchor cell according to occurrence of the event. At this time, terminal information possessed by the camped cell may be transmitted together to the anchor cell without a request to the terminal. When the anchor cell additionally needs the terminal information for the PA determination, information is requested to the terminal through the camped cell, and the information may be received in response thereto. Alternatively, the camped cell may request and receive terminal information required for PA optimization to a higher network entity.

Option 2) When the events 2-1) to 2-4) occur in the anchor cell, information for determining PA optimization may be requested to the terminal through the camped cell, and the terminal may transmit the corresponding information in the form of response for the request of the base station. Alternatively, the anchor cell may request and receive terminal information required for PA optimization to a higher network entity.

Option 3) When the events 2-1) to 2-4) occur in the higher network entity than the base station, the higher network entity transmits a PA optimization command to the anchor cell. At this time, the higher network entity may transmit network information related to the PA optimization together. For example, when a maximum PA size is changed, the corresponding information may be transmitted to the anchor cell.

Step 2: The anchor cell performs PA determination based on the received terminal information and network information. At this time, the anchor cell requests terminal-related information to cells to which the terminal is previously camped other than the current camped cell and may receive the information in the form of response. The anchor cell may request the PA optimization to a network including an MME. The determined PA of the terminal may be processed in a form of a list. In a case in which the determined PA is the same as the previous PA, and there is no change, the anchor cell terminates the procedure.

Step 3: The anchor cell transmits determined PA change information to the current camped cell.

Step 4: The camped cell transmits the PA change information received from the anchor cell. The terminal receiving the information removes the previous PA list information and performs update with the new received information.

(2) A PA optimization procedure in a case in which a new camped cell optimizes and sets a new PA and changed PA information is notified to the anchor cell and the terminal is as follows.

For the operation of Option 1), that is, when a PA optimization request is transmitted from the terminal, the following operations are performed.

Step 1: As the events 1-1) to 1-4 of the terminal occur, the terminal transmits a PA optimization request to a camped cell. At this time, information of the terminal required for determining a PA may be transmitted together with the PA optimization request. In this case, the following step 2 may be omitted.

Step 2: The camped cell receiving the PA optimization request of the terminal requests necessary information to the terminal and receives the information in the form of response thereto.

Step 3: The camped cell additionally collects information for PA determination based on the requested terminal information and network information. At this time, the camped cell requests terminal-related information to the anchor cell or cells to which the terminal is previously camped and may receive the information in the form of response thereto. Alternatively, the camped cell may request and receive terminal information required for PA optimization to a higher network entity.

Step 4: The camped cell performs PA determination based on the received terminal information. The determined PA of the terminal may be processed in a form of a list. In the case in which the PA is not changed, waste of resources may occur in transmitting the list, thus a field for whether or not the PA is changed may be set and transmitted.

Step 5: The camped cell transmits information on whether the determined PA is changed and/or PA change information to the terminal. The terminal receiving the information removes the previous PA list information and performs update with the new received information. At the same time, the determination information is transmitted to the anchor cell. The anchor cell updates the corresponding information and refers to the corresponding information at the time of paging in future. The anchor cell may transmit the corresponding information to the MME.

For the operation of Option 2), that is, when a PA change is requested from the network, the following operations are performed.

—Step 1:

Option 1) When the events 2-1) to 2-4) occur in the camped cell, the camped cell may request information for determining PA optimization to the terminal, and the terminal may transmit the corresponding information in the form of response for the request of the base station.

Alternatively, the camped cell requests information for determining a PA to the anchor cell or cells to which the terminal is previously camped and may receive the information in the form of response thereto.

Alternatively, the camped cell may request and receive terminal information required for PA optimization to a higher network entity.

Option 2) When the events 2-1 to 2-4 occur in the anchor cell, the anchor cell transmits a PA optimization request/command to the camped cell. At this time, the anchor cell may transmit terminal information required for PA optimization together.

Alternatively, the camped cell receiving the PA optimization request/command may request the corresponding information to the anchor cell and receive the corresponding information in the form of response. Alternatively, the camped cell requests information for determining a PA to cells to which the terminal is previously camped and may receive the information in the form of response. Alternatively, the anchor cell may request and receive terminal information required for PA optimization to a higher network entity.

Option 3) When the events 2-1) to 2-4) occur in the higher network entity than the base station, the higher network entity transmits a PA optimization command to the camped cell. At this time, the higher network entity may transmit network information related to the PA optimization together. For example, when a maximum PA size is changed, the corresponding information may be transmitted to the camped cell. When necessary, the camped cell requests information for determining a PA to the anchor cell or cells to which the terminal is previously camped and may receive the information in the form of response.

Step 2: The camped cell performs PA determination based on the received terminal information and network information. The determined PA of the terminal may be processed in a form of a list. In a case in which the determined PA is the same as the previous PA, and there is no change, the camped cell terminates the procedure.

Step 3: The camped cell transmits the finally determined PA change information to the terminal. The terminal receiving the information removes the previous PA list information and performs update with the new received information. At the same time, the determination information is transmitted to the anchor cell. The anchor cell updates the corresponding information and refers to the corresponding information at the time of paging in future. The anchor cell may transmit the corresponding information to the MME.

(3) A PA optimization procedure of a case in which a new camped cell is changed to a new anchor cell, the new anchor cell optimizes a PA, and changed PA information is notified to the terminal and the previous anchor cell is as follows.

For the operation of Option 1), that is, when a PA optimization request is transmitted from the terminal, the following operations are performed.

Step 1: An anchor cell of the terminal is changed. This operation is performed in response to the PA optimization request of the terminal. The camped cell receiving the PA optimization request transmits an anchor cell change request to the anchor cell. The anchor cell receiving the request transmits terminal context information possessed by the anchor cell to the camped cell. Further, the anchor cell notifies a change to a higher network entity including an MME to newly configure S1 connection with the existing camped cell.

At this time, the anchor cell transfers ID information of the existing camped cell together with the change, and may relay a message required at the time of S1 connection configuration between the MME and the camped cell.

Step 2: The new anchor cell collects required information before performing PA optimization change. Before Step 1, the terminal may transmit information required for determining a PA together with the PA optimization request. Alternatively, in this step, the new anchor cell may request required information to the terminal. Alternatively, the new anchor cell may request the corresponding information to cells to which the terminal is previously camped and receive the corresponding information in the form of response. Alternatively, the new anchor cell may request the corresponding information to the higher network entity and receive the corresponding information in the form of response.

Step 3: The new anchor cell performs PA determination based on the collected terminal information. The determined PA of the terminal may be processed in a form of a list. In the case in which there is no change, waste of resources may occur in transmitting the list, thus the new anchor cell may set and transmit a field for whether there is a change or not.

Step 4: The new anchor cell transmits information on whether the finally determined PA is changed and/or PA change information to the terminal. The terminal receiving the information removes the previous PA list information and performs update with the new received information. At the same time, the new anchor cell transmits the determination information to the previous anchor cell and the MME over X2 and S1.

For the operation of Option 2), that is, when a PA change is requested from the network, the following operations are performed.

—Step 1:

Option 1) When a PA optimization trigger event occurs in the camped cell, the camped cell transmits an anchor cell change request to the anchor cell. The anchor cell receiving the request transmits terminal context information possessed by the anchor cell to the camped cell. Further, the anchor cell notifies a change to a higher network entity including an MME to newly configure S1 connection with the existing camped cell.

At this time, the anchor cell transfers ID information of the existing camped cell together with the change, and may relay a message required at the time of S1 connection configuration between the MME and the camped cell.

Option 2) When a PA optimization trigger event occurs in the anchor cell, the anchor cell transmits an anchor cell change request to the camped cell. Further, the anchor cell transmits terminal context information possessed by the anchor cell to the camped cell. Further, the anchor cell notifies a change to a higher network entity including an MME to newly configure S1 connection with the existing camped cell.

At this time, the anchor cell transfers ID information of the existing camped cell together with the change, and may relay a message required at the time of S1 connection configuration between the MME and the camped cell.

Option 3) When a PA optimization trigger event occurs in a higher network entity than a base station, the higher network entity transmits an anchor cell change request to the camped cell through the anchor cell. The anchor cell receiving the request transmits terminal context information possessed by the anchor cell to the camped cell. Further, the anchor cell notifies a change to a higher network entity including an MME to newly configure S1 connection with the existing camped cell. At this time, the anchor cell transfers ID information of the existing camped cell together with the change, and may relay a message required at the time of S1 connection configuration between the MME and the camped cell.

Step 2: The new anchor cell collects required information before performing PA change. At this time, the new anchor cell may request the required information to the terminal and receive the information in the form of response. Alternatively, the new anchor cell may request the corresponding information to the existing anchor cell or cells to which the terminal is previously camped and receive the corresponding information in the form of response. Alternatively, the new anchor cell may request the corresponding information to the higher network entity and receive the corresponding information in the form of response.

For Option 3) in Step 1, the new anchor cell may receive the corresponding information from the existing anchor cell together with the anchor cell change request.

For Option 3) in Step 1, the new anchor cell may receive the relevant terminal and network information together with the anchor cell change request.

Step 3: The new anchor cell performs PA determination based on the collected terminal information. The determined PA of the terminal may be processed in a form of a list. In a case in which the determined PA is the same as the previous PA, and there is no change, the new anchor cell terminates the procedure.

Step 4: The finally determined PA change information is transmitted to the terminal. The terminal receiving the information removes the previous PA list information and performs update with the new received information. At the same time, the determination information is transmitted to the previous anchor cell and the MME over X2 and S1.

Meanwhile, a method for maintaining/changing a relationship between a network and an anchor cell at the time of DL/UL data transmission and reception in the Inactive state includes the following options.

1) Relationship maintaining method option 1: The anchor cell is maintained. The new camped cell of the terminal simply performs relaying.

2) Relationship maintaining method option 2: The anchor cell is maintained. The new camped cell of the terminal collects a terminal context from the anchor cell and performs relaying.

3) Relationship change method: The anchor cell is changed to the new camped cell.

Third Embodiment

Meanwhile, the mobile communication system has been evolved from second generation (2G) only supporting voice-oriented service through third generation (3G) and fourth generation (4G) to support both of voice and data services. In particular, in 4G, orthogonal frequency-division multiple access (OFDMA) has been introduced to increase data capacity, and the voice service is also supported by a packet system like the data service. Therefore, in the existing 4G LTE, the voice and data services are supported with one PHY/MAC layer. However, even in LTE, a PHY and MAC operation having a different structure has been defined by separating a part of frequency resources to support additional new services, that is, broadcast, device to device (D2D), vehicle-to-vehicle (V2V), and the like. However, in future, various services and a communication system optimized according thereto need to be provided in time, thus it is difficult to satisfy the requirement with a new standardization and implementation method requiring a long time. Accordingly, an expandable communication standard is being discussed to support all the various services to be provided in future with one standard for the 5G new radio mobile communication system.

Meanwhile, in order to support various services, the PHY/MAC layer needs to support various structures, mechanisms, and protocols. Particularly, the PHY layer may have various physical layer structure (e.g., a subcarrier spacing, a symbol length, a CP length, a subframe length, a slot length, an operating bandwidth (BW), a reference signal, and the like). Such physical layer structures are collectively called numerology. Generally, the terminal measures channel performance of a target base station and reports the measured result to a network for a handover procedure for supporting mobility. In a case in which the target base station has a plurality of different numerologies, and a communication range, that is, link performance or reception requirement performance is different from each numerology, the terminal needs to be able to move to a base station suitable for each numerology. Further, even when the target base station supports a required service of the terminal, the target base station may use a different numerology in a supporting method. In this case, the terminal may not appropriately perform measurement due to an operation of a serving base station (serving cell). Accordingly, the present disclosure suggests a general HO procedure and method including RRM measurement, HO triggering condition, measurement report, and HO decision in a mobile communication system based on 5G new radio. In particular, measurement and report, HO triggering and decision considering a base station supporting one or more numerologies are considered. In the 5G mobile communication system, it is expected that various services (or slice) such as enhanced mobile broadband (eMBB), URLLC, enhanced machine type communication (eMTC) will be supported. This may be understood in the same vein as that voice over Internet protocol (VoIP) and best effect (BE) services and the like which are voice-oriented services are supported in LTE which is a 4G mobile communication system. Further, it is expected that various numerologies will be supported in the 5G mobile communication system. Specifically, this means a subcarrier spacing, and the like, which directly affects a transmission time interval (TTI). Therefore, it is expected that TTIs having various lengths will be supported in the 5G mobile communication system. This is one of significantly distinct characteristics of the 5G mobile communication system from that only one kind of TTI (1 ms) is supported in the standardized LTE up to now. In a case in which the 5G mobile communication system supports a TTI that is much shorter than 1 ms TTI of LTE, it is expected that it will be very helpful for supporting URLLC and the like requiring a short delay time. In the present document, it is to be noted that the term "numerology" is used as a generic term of a subcarrier spacing, a subframe/slot length, a symbol/sequence/CP length, a subcarrier spacing, an operating BW, a reference signal type, and the like. Further, depending on the context, the term "numerology" may also collectively refer to a relevant TTI, a bandwidth (BW), a modulation and coding scheme (MCS), and transmission power information. A base station may represent various abbreviations such as gNB, eNB, NB, BS, and the like, and a coverage provided by the base station is referred to as a cell. The cell becomes smaller in an order of a macro cell, a pico cell, and a femto cell according to a size of the coverage. A terminal may represent various abbreviations such as UE, MS, STA, and the like.

In the existing mobile communication system including LTE, a handover (HO) procedure is defined for supporting terminal mobility. The terminal is transited from the RRC IDLE state to the RRC CONNECTED state and performs an operation corresponding to a CONNECTED mode UE when receiving a paging message from a network or intending to transmit data in uplink (UL). The base station performs preparation for HO to the CONNECTED mode UE, that is, configuration for measurement and report. Since the terminal continuously monitors cell quality (base station quality) of a serving base station (serving cell) in the connected state, the base station instructs a channel measurement report configuration for a neighbor base station to the terminal through an RRC connection reconfiguration message.

The RRC connection reconfiguration message includes at least one of a measurement configuration, a report configuration, and a neighbor cell list (neighbor base station list), and a measurement and/or report target frequency carrier. In the neighbor cell list, a neighbor base station is indicated by using a physical cell ID (PCI). The terminal performs base station quality measurement for neighbor base stations according to the RRC connection reconfiguration message. Since the base station informs a measurement object for one carrier in the measurement configuration, the terminal receives a synchronization signal (PSS/SSS) through the carrier, and when a PCI included in the neighbor cell list is obtained, obtains BW information through a physical broadcast channel (PBCH) that may be decoded by a synchronization signal corresponding to the PCI. In LTE, a structure and position of a cell-specific reference signal (CRS) for the base station from BW information and a cell ID, that is, the PCI, thus the terminal may measure base station quality (RSRP, RSRQ) by receiving the CRS. As such, the terminal obtains a measured base station quality value of one base station once every 40 ms, and may average base station quality values obtained within 200 ms to report the average value to the measurement report procedure. Accordingly, the base station decides HO based on the measurement report of the terminal.

Figure 13:
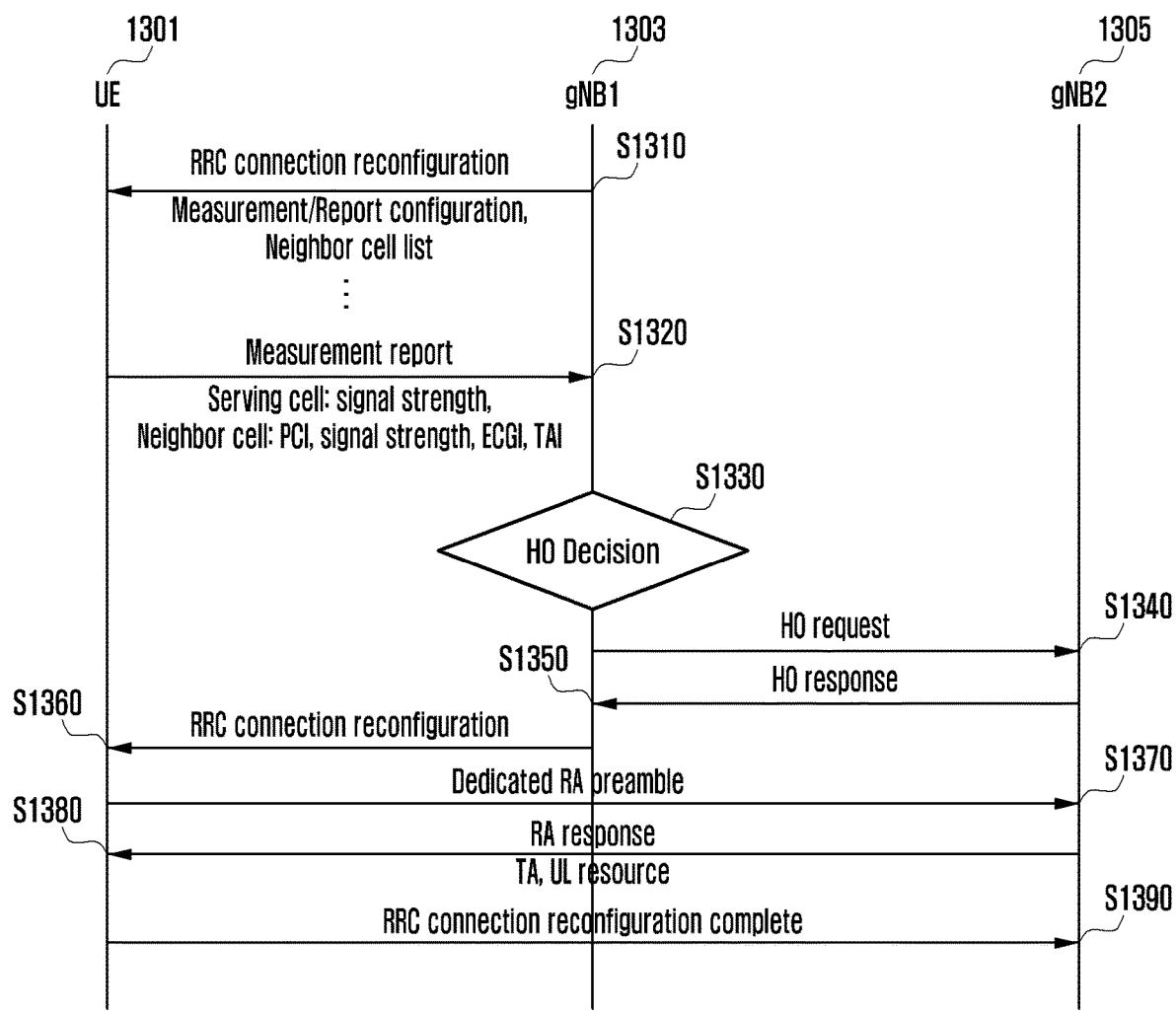
FIG. 13 is a diagram illustrating a measurement and handover procedure in long term evolution (LTE) according to the present disclosure.

FIG. 13 is a diagram illustrating a measurement and handover procedure in LTE according to the present disclosure.

Referring to FIG. 13, a first base station 1303 may transmit an RRC connection reconfiguration message to a terminal in operation S1310, and the terminal 1301 may transmit a measurement report to the first base station 1303 in operation S1320. At this time, the RRC connection reconfiguration message may include at least one of a measurement configuration, a report configuration, and a neighbor cell list. Further, the measurement report may include at least one of a signal strength of a serving cell, signal quality and a signal strength of a neighbor cell, an evolved universal terrestrial radio access network (E-UTRAN) cell global identifier (ECGI), a tracking area identity (TAI), and a PCI.

Further, the first base station 1303 may decide handover in operation S1330. The first base station (gNB1) 1303 that decides to handover the terminal to a second base station 1305 transmits an HO request message including a HO cause, a target cell ID, a GUMMEI ID, UE context information, and the like directly over a network interface such as X2, S1, or Xn or through a gateway to the second base station (gNB2) 1305 in operation S1340. The second base station 1305 transmits a HO response message to the first base station 1303 in operation S1350.

The first base station 1303 receiving the HO response message transmits an RRC connection reconfiguration to the terminal in operation S1360 to instruct to move the connection to the target cell, that is, the second base station 1350.

Accordingly, the terminal performs an RA procedure starting from random access (RA) preamble transmission to obtain uplink synchronization for the second base station in operation S1370. When the terminal obtains (S1380) the uplink synchronization, that is, timing advanced (TA) and UL resources as RA response, the terminal terminates the HO procedure by transmitting an RRC connection reconfiguration complete message in operation S1390.

Figure 14:
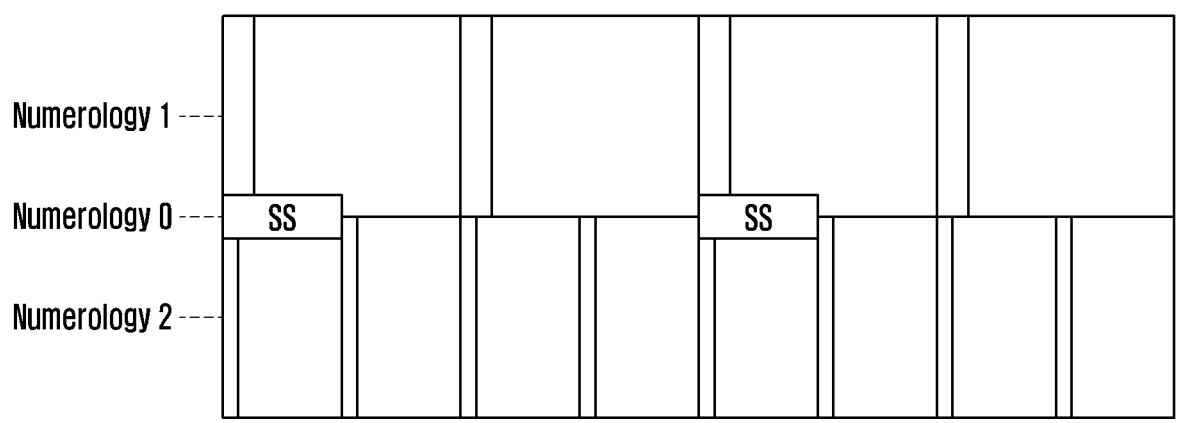
FIG. 14 is a diagram illustrating an example of supporting a plurality of numerologies in a frequency division multiplexer (FDM) scheme according to an embodiment of the present disclosure.
Figure 15:
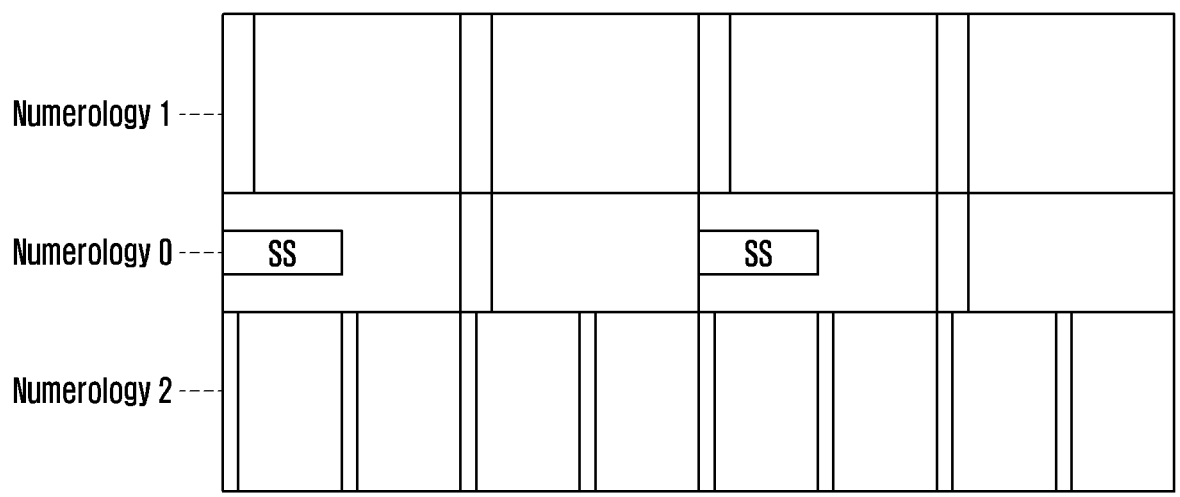
FIG. 15 is a diagram illustrating an example of supporting a plurality of numerologies in an FDM scheme according to an embodiment of the present disclosure.
Figure 16:
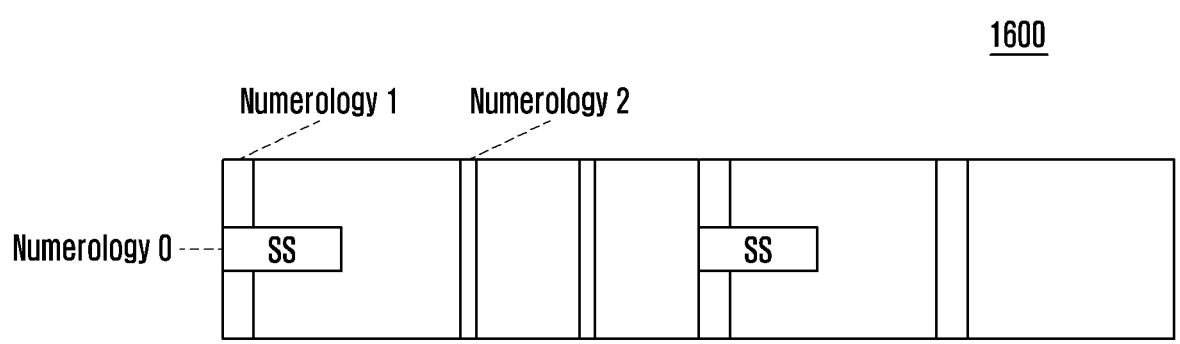
FIG. 16 is a diagram illustrating an example of supporting a plurality of numerologies in a time division multiplexing (TDM) scheme according to an embodiment of the present disclosure.

According to a physical layer design of the 5G new radio based mobile communication system, in a frequency band operated by one base station, different numerologies may be operated by an FDM scheme as in FIG. 14 or 15, or may be operated by a TDM scheme as in FIG. 16. At this time, control channel structures are also different for each numerology.

FIGS. 14 and 15 are diagrams illustrating an example of supporting a plurality of numerologies in an FDM scheme according to an embodiment of the present disclosure.

According to the FDM scheme, different numerologies may be operated by dividing frequency resources, and a synchronization signal (SS) may be operated as Numerology 0 which is a default numerology. If not separately configured, the default numerology is determined for each carrier in advance, thus is a value that the terminal has in advance. Since a position of a center frequency of one carrier is determined in the standard, the terminal may perform a scanning operation of receiving a synchronization signal for a carrier position in a predetermined range. If a synchronization signal is received with predetermined quality or more in any carrier, the terminal may obtain system information (SI) by receiving a PBCH. That is, the terminal may perform an idle mode operation such as obtaining of a synchronization signal, a PBCH, SI, and paging and the like based on the default numerology. Since a physical random access channel (PRACH) configuration is an uplink (UL) signal, a separate numerology for PRACH may be configured in SI. According to an embodiment, a resource (frequency offset, a used band, the number of resource block) for other numerology additionally configured for a service, for example, Numerologies 1 and 2, and reference signal (RS) information may be 1) obtained by receiving SI in the structure as illustrated in FIG. 14, or 2) obtained through an RRC message after establishing connection based on Numerology 0 in the structure as illustrated in FIG. 15.

In the present disclosure, Numerology 0 is also called a default numerology, and is a numerology that may be obtained by receiving a synchronization signal (SS) and a broadcast channel (PBCH). The default numerology may be determined based on predetermined information or configured by the base station using system information (SI) in a PBCH.

The terminal explicitly or suggestively receives a numerology required for control and data channel transmission and reception configured by the base station through an RRC connection setup procedure. The base station may configure a numerology other than Numerology 0 (default) 1) together with a configuration of a subband/bandpart in which the terminal is operated or 2) a CSI-RS configuration of the terminal. In a case of the configuration of the subband, a configuration of a CSI-RS and other signal in the configured subband is in accordance with the numerology that is configured together.

The base station may include Numerology 0 (default) as well at the time of the subband or CSI-RS configuration. According to an embodiment, if not separately and explicitly configured, the terminal may transmit and receive a control channel/data channel by the same configuration as the band and numerology used for the reception of the synchronization signal and the PBCH.

Referring to FIGS. 14 and 15, according to an embodiment, the network may receive an SS even in other frequency other than the center frequency in the entire band. This is because synchronization performance for a wide band may not be guaranteed only with the SS transmitted in the center frequency in an ultra-wide band. When the SS is transmitted in other frequency, sync offset for the center frequency may be transmitted using a sequence of the SS or the PBCH transmitted together. When informing the sync offset, a field for informing a state of an object that whether it is the center of the entire BW may be added. The field may be substantially the same as information on whether the received SS is received in the center frequency. The terminal may determine whether to continuously observe a non-center sync signal (SS) currently received or to observe an SS transmitted through the center frequency based on whether an SS candidate signal is received in the center frequency. For example, the terminal operated in the resource configured by the serving base station receives a non-center SS of a neighbor base station and identifies a position of a center SS of the neighbor base station, and when necessary, may observe the center SS of the neighbor base station for RRM measurement.

FIG. 16 is a diagram illustrating an example of supporting a plurality of numerologies in a TDM scheme according to an embodiment of the present disclosure.

Referring to FIG. 16, when operated by the TDM scheme, after obtaining the synchronization signal, the terminal may obtain a resource (time offset, a used band, a position and the number of resource block (RB)) for other dedicated numerology additionally configured for a service, for example, at least one numerology of Numerologies 1 to N, and reference signal (RRS) information 1) by receiving SI, or 2) through an RRC message after establishing connection based on at least one numerology of the dedicated Numerologies 1 to N or a message (RRC or MAC) transmitted and received during a random access process.

In order to support the operation as 2), a) a relationship between default Numerology 0 and a dedicated numerology is determined in advance, or b) information on an initial numerology to be used for control/data channel transmission and reception for a connection setup procedure in SI is informed by the base station to the terminal, such that it is possible to reduce overhead of the RRC message. In the case of a), the terminal may define Numerology 1 to be used identically to default Numerology 0 used for the synchronization signal/PBCH.

Meanwhile, according to an embodiment, the network may support communication of the terminal by a specific numerology set for a service/slice that the terminal subscribes. For example, the terminal subscribing an eMBB service may perform communication with the network by Numerology 0 or 1, and the terminal subscribing an URLLC service may perform communication with the network by Numerology 1 or 2. However, since a one-to-one relationship between a service and numerology is not determined, the network may inform the numerology set used by the network to support a specific service/slice to the terminal at the time of connection establishment of the terminal or through an SI message.

The 5G NR communication system and network need to support various services in various deployment environments. A mobile communication carrier provides a plurality of services including services A and B to the subscriber or a subscriber of a virtual private network (VPN) or a slicing operator.

Figure 17:
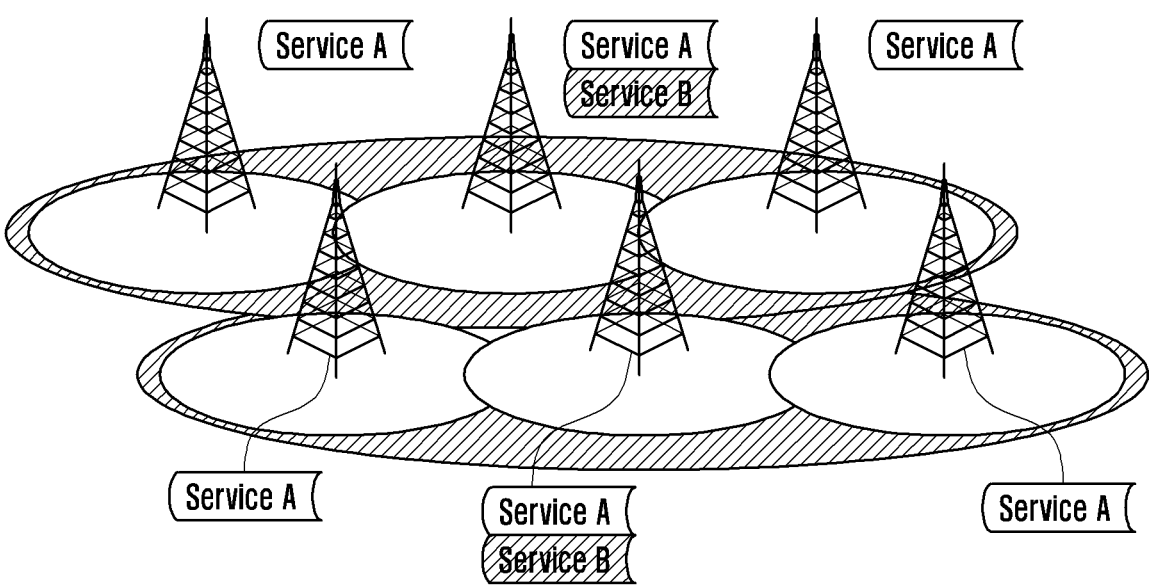
FIG. 17 is a diagram illustrating an example of a dynamic service support of a 5G NR communication network according to an embodiment of the present disclosure.

Referring to FIG. 17, according to distribution of the terminal and service requirements, and an available resource amount, a kind of service that is currently provided in each base station may be different actually.

When a network of the mobile communication carrier is lent to a third party like VPN, the required number, location, coverage, and the like of the base station may be different according to a kind of a service. Accordingly, the mobile communication carrier requires a communication technology in which flexible deployment is possible.

As such, in the network in which the service and the operated numerology are changed dynamically, the radio resource management (RRM) measurement and HO procedure of the terminal is an important technology for estimating the performance. The RRM measurement is performed mainly to measure cell quality (base station quality of a neighbor base station (neighboring cell) and report the measurement quantity to a serving base station (serving cell). However, when measuring the base station simultaneously providing the service A and the service B, in a case in which the terminal receiving the service A may not distinguish a measurement value for a numerology and an RS for the service A and a measurement value for a numerology and an RS for the service B, the terminal does not have a choice but to report measurement values for all RSs of the base station regardless of the service. According to the procedure, although overall quality of the specific base station is good, but quality of a partial resource for the used service may not be good. Alternatively, due to different in transmission power of the base station for the partial resource for the used service, the overall quality of the base station and reception quality of the partial resource for each service may be different from each other. Alternatively, even when the overall quality of the specific base station and the quality of the partial resource for each used service are similar to each other, there needs to be a difference in a quality value set for measurement report or HO decision of the terminal according to a difference in the network facility and the provided service of each base station. Alternatively, even when requirements for mobility for each service are the same, accuracy of a measurement value for an RS according to a different numerology for each service may be different. Further, if a difference between measurement quality for a default numerology and measurement quality for a dedicated numerology is large, the terminal should dividedly report the quality. Alternatively, if a difference between measurement quality for a default numerology that may be identified by SS reception of the base station and measurement quality for a dedicated numerology that may be identified by CSI-RS reception is large, the terminal should dividedly report the quality. Further, since a difference between the measurement quality that may be identified by SS reception of the base station and measurement quality that may be identified by CSI-RS reception is large, the terminal should dividedly report the quality.

Further, due to restrictions in capability of the terminal or a transmission and reception operation, there may be a limitation in measuring quality of a neighbor base station simultaneously with communication with a serving base station. That is, a predetermine delay time is caused in switching from one numerology to other numerology or the terminal needs to measure quality of the neighbor base station by switching the numerology at a time that a numerology currently in communication does not use. For example, the terminal performs communication with the serving base station through the Numerology 0 resource may easily measure a Numerology 0 resource operated by the neighbor base station in the same frequency band, but a Numerology 1 resource operated by the neighbor base station may be measured when having time to spare during communication with the serving base station, thus it may be considered that the measurement result for the Numerology 0 resource based on more samples is more accurate. Meanwhile, measurement results for the Numerology 0 resource and the Numerology 1 resource may also be combined and averaged. However, in a case in which a linear average is adopted as in the related art, a result based on the smaller number of samples may be less reflected over the entire result.

According to any scenario, the network may inform the terminal of a list of base stations supporting a service/slice that the terminal desires or that is set for the terminal. Alternatively, when the terminal performs tracking area update (TAU) for paging, the network may inform the terminal of a list of services/slices available in the corresponding TAU with a carrier frequency, a radio access technology (RAT), and a cell, if necessary. This information is called slice availability, and the network informs the terminal of information of a service/slice that may be supported in one mobile communication network. When performing measurement for HO, it may be difficult to perform an operation of dividing, measuring, and reporting a change of a numerology according to a dynamic service/slice change only with the static slice availability information.

According to any scenario, requirements of HO for each service/slice of the terminal may be different. In this case, unnecessary reports may be decreased by applying different report periods to one base station, rather than applying the same period. For example, a period of measurement report for massive machine type communications (mMTC) may be longer than that for URLLC. Although the period may be set to the terminal by the base station, when it is based on an event, since it is a result according to a triggering condition, control variables (timer, hysteresis margin, and the like) used for event determination need to be differently set for each service/slice or numerology.

Interference affects a measurement value of base station quality in a wireless channel. That is, when a reception power value of a desired signal from the base station is the same, in an environment with high interference, a low base station quality value is obtained, and in an environment with low interference, a high base station quality value is obtained. The terminal receiving a signal by a specific numerology may not detect a signal if it is not a signal transmitted by the same signal, thus a signal transmitted by other numerology is reflected as interference. For example, when a base station 1 is a serving base station, and a terminal 1 operated by Numerology 1 receives and measures signals of a base station 2 operated by Numerology 1 and a base station 3 operated by Numerology 2, a signal strength/quality measurement value for the base station 2 may be obtained, but a signal strength/quality measurement value for the base station 3 may not be obtained.

Meanwhile, in the same environment, when the base station 1 is a serving base station, and a terminal 2 operated by Numerology 2 receives and measures signals of the base station 2 operated by Numerology 1 and the base station 3 operated by Numerology 2, a signal strength/quality measurement value for the base station 3 may be obtained, but a signal strength/quality measurement value for the base station 2 may not be obtained. However, when it is assumed that a base station actually close to the base station 1 is the base station 2, the terminal 1 may perform handover to the base station 2, but a possibility that the terminal 2 fails to perform handover to the close base station 2 is high or the terminal 2 may perform handover to the base station 3 that the delay may occur. In this case, in order for the terminal 2 to obtain accurate signal strength/quality measurement value for the base station 2, the base station 1 need to inform the terminal 2 of an RRM measurement resource for the base station 2 and used Numerology 1 information. Alternatively, one or more of the RRM measurement resource to be used to observe the serving base station and the neighbor base station and the used numerology information need to be able to be configured as needed.

Therefore, in order to solve the above problems, measurement for partial resources for each service, that is, service-specific or numerology-specific resources also needs to be numerology-specifically performed. In Layer 1 (L1, physical layer), the service is not recognized, and only the numerology is distinguished, thus in the measurement procedure, terms such as numerology-specific measurement, numerology-specific triggering condition, numerology-specific measurement quantity, and the like will be used. On the contrary, in the measurement procedure in LTE, terms such as carrier-specific measurement, carrier-specific triggering condition, and carrier-specific measurement quantity are used. In the present disclosure, according to an embodiment, the RRM measurement procedure may be configured of a combination of the respective carrier-specific or numerology-specific processes.

Meanwhile, effective periods of the RRM measurement resource and the numerology information may be set to be the same as each other by the base station. The terminal is operated by relying on the information in the effective period, and when the effective period expires, the terminal may ignore the measurement and report or request resetting to the base station. According to another embodiment, configuration/reconfiguration of the RRM measurement resource and the numerology information may be requested by the base station, and the terminal may configure the RRM measurement resource and the numerology information according to the configuration or reconfiguration request of the base station.

According to the present disclosure, the base quality may be expressed by RSRP, RSRQ, SINR, spectral efficiency (SE), and the like. When the numerology-specific information is transmitted as SI, the numerology-specific information may be transmitted as other SI, other than the minimum SI. According to an on-demand SI procedure, the base station may receive SI request information of the terminal (transmitted through message 1 (RA preamble) or message 3 of the random-access process), and transmit numerology-specific SI corresponding to the request. According to a kind of procedure, information transmitted in the on-demand SI may include SS or CSI-RS information for RRM measurement, that is a kind of RS, transmission resources (period, band, and offset), and a numerology.

The terminal measures a reference signal (RS) for measurement configured to obtain channel quality of one base station according to RRM measurement configuration configured by the base station or network. Further, the terminal converts the measurement result into at least one value of RSRP, RSRQ, SINR, and SE according to the configuration of the base station, and reviews a triggering condition based on the converted value or quantity.

When the triggering condition is satisfied for any base station, the terminal reports one or more quantity for report for the base station to the serving base station. The present disclosure suggests how the RS for measurement is distinguished for each numerology based on a new measurement framework considering a numerology, how the measurement amount for each numerology is reflected in the triggering condition, or how any report result related to the satisfied triggering condition is reported. The measurement amount for each numerology may be a value obtained by averaging for each numerology in L1, or an output value obtained by configuring an L3 filter for each numerology in L3. Generally, the L3 filter may be configured by the base station, but in the present disclosure, the base station may perform configuration to the terminal so that at least measurement values for different numerology-specific RSs are separated and averaged to obtain an L1 average value.

Measurement Framework

Hereinafter, the measurement framework of the entire RRM measurement procedure of the present disclosure will be described.

Figure 18:
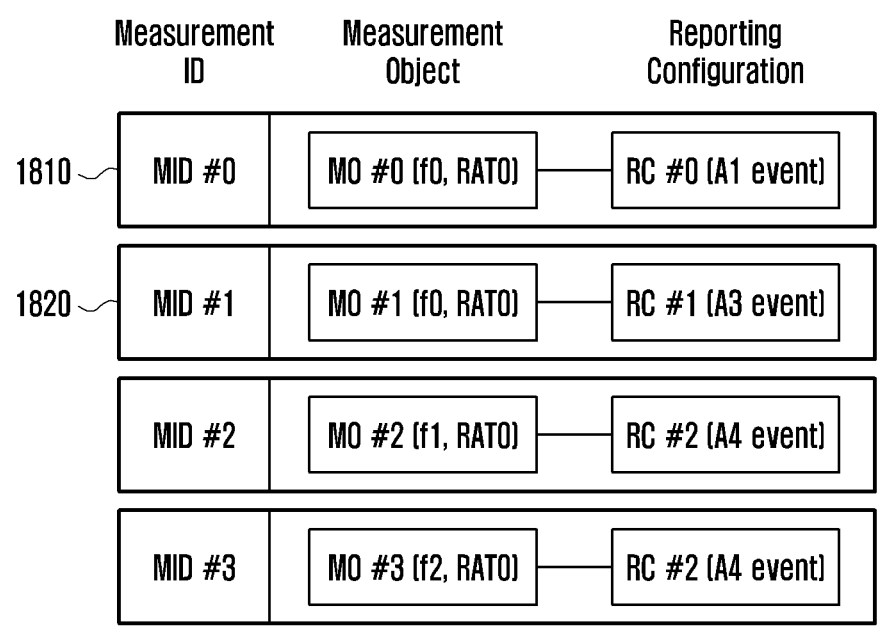
FIG. 18 is a diagram illustrating a measurement framework of an LTE system according to an embodiment of the present disclosure.

FIG. 18 is a diagram illustrating the measurement framework of the LTE system according to an embodiment of the present disclosure.

Referring to FIG. 18, the measurement framework of the LTE communication system illustrates one measurement object and one reporting configuration that are bundled with one measurement ID. The measurement ID is a standard for triggering for the measurement report of the terminal and the measurement report.

The measurement object includes information such as carrier frequency locations (f0, f1, etc.) and system types (LTE, WCDMA, etc.). The reporting configuration includes variables (offset, threshold) associated with a type of events and conditions used for the triggering.

According to the LTE measurement framework of FIG. 18, a plurality of events (A1, A3) may be bundled for one carrier (f0) so that the measurement configuration can be performed relatively freely and the bundled events may be managed with other measurement IDs (MID #0 and MID #1) 1810 and 1820.

On the other hand, in the 5G NR, the measurement framework considering the measurement resources for each numerology may consider various measures as follows.

Method 1) Reflecting a value measured based on the measurement resource configuration for one numerology set for one carrier to a triggering condition Method 2) Values measured for at least one numerology used when the terminal measures a measurement object configured for one carrier are separately stored and reflected to the triggering condition for one numerology.

Method 3) Results measured for one measurement object configured for one carrier and at least one sub-object are reflected to the triggering condition.

Method 4) Results measured for the measurement object configured for the resource regions for at least one numerology set for one carrier are reflected to the triggering condition.

According to the method 1, the terminal and the base station can be operated without changing the existing measurement framework. For example, if the serving base station sets one numerology for each RRM measurement in the terminal by using a Layer 1 signal, an MAC message, or an RRC message and informs locations (time/frequency) of the resource to be observed and an RS kind, the terminal may reflect the values measured in the configured measurement section and resource to calculate the triggering conditions for each measurement object. The problem of the method 1 is that the terminal does not have information on what time/frequency resources the neighbor base station should be operated in what numerology and therefore the terminal should try to measure all measurement objects in the RRM measurement resource configured by the L1 signal, the MAC message, or the RRC message. Also, the terminal should update base station quality values differently measured according to the set numerology for the measurement object, which is a cause of reducing the measurement accuracy. The method 1 may be useful when a common resource having the same numerology is configured between the serving base station and the neighbor base station.

According to the method 2, it is possible to perform the operation without greatly changing the existing measurement framework. For example, if the terminal receives a configuration of a measurement gap or an RRM measurement resource, the terminal performs the measurement using numerology currently in use or one numerology of a numerology set associated with a service/slice. The terminal separately stores the base station quality values for the measurement object according to each numerology used for the measurement. Generally, an L1 sample value measured every 40 ms is weighted and averaged during an L3 filtering process and reported once every 200 ms. According to the terminal implementation, the L1 sample values measured every 40 ms may also be stored separately for each numerology, and weighted and averaged during the L3 filtering process. However, according to the terminal implementation, since the values separated by numerology are averaged at the time of L3 filtering, the influence of interference for each numerology disappears. On the other hand, if the L3 filtering for each numerology is introduced, the terminal manages base station quality for each measurement object at L3 for one measurement object, and if the triggering condition is satisfied, the terminal reports one representative base station quality value for a target base station. A method of obtaining a representative base station quality value from a base station quality for each numerology will be described below in detail.

According to the method 3, when the serving base station transmits the configuration for the measurement and report with an RRC connection reconfiguration message, the serving base station informs not only the carrier of the measurement object but also the locations of the partial resource (time/frequency) and numerology to be measured. The measurement resources may be cell-specific, RS-specific, UE group-specific, UE-specific, BW-specific, or numerology-specific.

Figure 19:
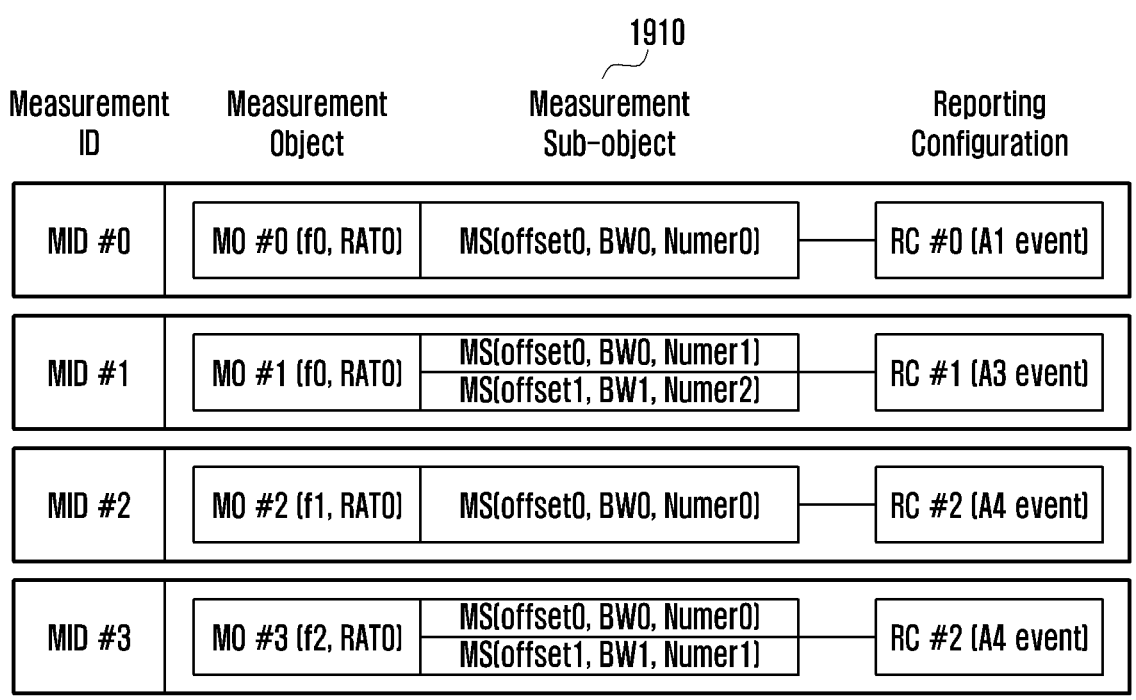
FIG. 19 is a diagram illustrating an example of a carrier-specific measurement framework having a sub-object according to an embodiment of the present disclosure.

For this purpose, as illustrated in FIG. 19, a measurement sub-object 1910 may be introduced to configure the locations (offset, BW etc.) of the partial resource and the numerology information together. The measurement sub-object may be configured to be the same reporting configuration as the measurement object. Therefore, the base station quality value measured for the measurement sub-object is reflected to the triggering condition together with the base station quality value measured for the measurement object. How to reflect the value to the triggering condition based on the measurement values for the measurement object and the sub-object will be described in detail later.

According to an embodiment, the measurement sub-object may be represented by an index indicating at least one configuration for SS, CSI-RS, or BW in consideration of a separate configuration not belonging to the measurement framework. The configuration for the separate SS or CSI-RS can be configured in the terminal as at least one of RS type, subframe/slot index, transmission period, offset for transmission period, and BW.

FIG. 19 illustrates a case where the measurement object is assumed as the SS, but the measurement object may also be configured as the CSI-RS. In this case, the numerology of the CSI-RS configured in the measurement object may be omitted as long as it has the same default numerology as the SS, but the measurement object configuration may include numerology if the numerology is not the default numerology.

Table 4 shows a case in which the measurement object and the sub-object are configured for the SS and the CSI-RS, respectively, according to the embodiment of the method 3. The numerology and BW for the SS may be omitted from the configuration. It is understood that the terminal performs the measurement and reporting on the serving cell and the neighboring cells for the measurement object, i.e., the IS and reporting. In addition, one white cell list may be additionally set for the measurement object.

The numerology and BW for the CSI-RS should be included for each measurement sub-object configuration. One white cell list may be additionally configured for all measurement sub-objects, one white cell list may be additionally configured for each measurement sub-object, or one white cell list may be additionally set for each BWP. Alternatively, one white cell list may be additionally configured for the measurement object and the sub-object. If only the serving cell ID is listed in the white cell list, the terminal performs only the serving cell for the measurement for the corresponding measurement object or the measurement sub-object. However, according to different configurations, the terminal may compare measurement values for different measurement objects and sub-objects and report the comparison results when the event is generated.

TABLE 4

| MO/MS ID | RS Configuration | Numerology | Allowed measurement BW |
| --- | --- | --- | --- |
| MO#0 | SS | Numer#0 (Default) | BWP#0 (Default) |
| MO#0/MS#0 | CSI-RS#0 | Numer#1 | BWP#1 |
| MO#0/MS#1 | CSI-RS#1 | Numer#1 | BWP#2 |
| MO#0/MS#2 | CSI-RS#2 | Numer#2 | BWP#3 |

On the other hand, when the measurement BW for the measurement object and the sub-object are configured, the existing LTE indicates only the bandwidth of the BW to measure the CRS in the Allowed measurement BW. That is, the following Enumeration is used.

AllowedMeasBandwidth ::= ENUMERATED {mbw6, mbw15, mbw25, mbw50, mbw75, mbw100}

This is because the previous CRS was that the center frequency of the carrier was determined from the specification and SS reception and the only variable was the bandwidth. However, in the 5G NR, the SS measurement BW may have a fixed center frequency and a predetermined bandwidth as in LTE, but the CSI-RS resource and the measurement BW may be configured for each terminal. Therefore, the base station should inform the mobile station of the difference between the center frequency of the measured BW and the carrier center frequency as a variable such as offset. The base station may configure information on at least one of Offset, BW, start and end of BW, number to be used, and a control channel in the terminal as RRC in one unit called a BW part (BWP). Therefore, using the BW part helps to simplify the measurement setting by bundling the above variables and expressing the bundled variables as one.

The base station may command the BW for RRM measurement by directly using its BWP index or similarly to LTE, by reconstructing all or a part of the set BWPs in a list format and using the index, based on the configuration for the plurality of BWPs. When further commanding the measurement operation associated with the BWP, the base station can reconstruct the BWP in a sequence format, in which the associated variables (at least one of period, time offset, opportunity, and section) are added, together with a BWP ID and instruct it using the index.

```
AllowedMeasBandwidth ::= BWP1
    or
AllowedMeasBandwidth ::= List {BWP0, BWP1, BWP3, BWP4, BWP6, BWP7}
    or
AllowedMeasBandwidth ::= Sequence {BWP ID, measPeriodicity, measPeriodOffset,
measOccasion}
```

Table 5 shows a case in which both of the measurement object and the sub-object are configured for the CSI-RS, respectively, according to another embodiment of the method 3. The numerology and BW for the CSI-RS should be included for each measurement object and sub-object configuration. A single white cell list may be additionally configured for all measurement objects and sub-objects, a single white cell list may be additionally configured for the measurement objects and all the measurement sub-objects, a single white cell list may be additionally configured for the measurement object and each measurement sub-object, or one white cell list may be additionally configured for each BWP. If only the serving cell ID is listed in the white cell list, the terminal performs only the serving cell for the measurement for the corresponding measurement object or the measurement sub-object. However, according to different configurations, the terminal may compare measurement values for different measurement objects and sub-objects and report the comparison results when the event is generated.

TABLE 5

| MO/MS ID | RS Configuration | Numerology | Allowed measurement BW |
|---|---|---|---|
| MO#0 | CSI-RS#0 | Numer#1 | BWP#1 |
| MO#0/MS#0 | CSI-RS#1 | Numer#1 | BWP#2 |
| MO#0/MS#1 | CSI-RS#2 | Numer#2 | BWP#3 |
| MO#0/MS#2 | CSI-RS#3 | Numer#2 | BWP#4 |

As an example of the CSI-RS configuration in the above example, if the port ID is fixed or preset or configured in the measurement configuration IE, the base station can set other parameters as follows.

```
MeasCSI-RS-Config ::=          SEQUENCE {
    measCSI-RS-Id                 MeasCSI-RS-Id-r12,
    physCellId                    INTEGER (0..503),
    scramblingIdentity            INTEGER (0..503),
    resourceConfig                INTEGER (0..31),
    subframeOffset                INTEGER (0..4),
    csi-RS-IndividualOffset       Q-OffsetRange,
    ...
}
```

Alternatively, the base station can set the following parameters including the port ID.

```
MeasCSI-RS-Config ::=          SEQUENCE {
    CSI-RS-port                   INTEGER (0..8),
    measCSI-RS-Id                 MeasCSI-RS-Id-r12,
    physCellId                    INTEGER (0..503),
    scramblingIdentity            INTEGER (0..503),
    resourceConfig                INTEGER (0..31),
    subframeOffset                INTEGER (0..4),
    csi-RS-IndividualOffset       Q-OffsetRange,
    ...
}
```

Alternatively, the base station may configured as follows, including numerology information.

```
MeasCSI-RS-Config ::=          SEQUENCE {
    CSI-RS-port                   INTEGER (0..8),
    measCSI-RS-Id                 MeasCSI-RS-Id-r12,
    physCellId                    INTEGER (0..503),
    scramblingIdentity            INTEGER (0..503),
    resourceConfig                INTEGER (0..31),
    CSI-RS-numerology             INTEGER (0..4),
    subframeOffset                INTEGER (0..4),
    csi-RS-IndividualOffset       Q-OffSetRange,
    ...
}
```

In the configuration of the measurement object and the measurement sub-object, the numerology information for measuring the CSI-RS may be explicitly commanded as the measurement object/sub-object configuration or the BW part or the measurement CSI-RS configuration. In general, the CSI-RS configuration may be defined for the entire system band of the base station regardless of the BW part. If the numerology is different, the base station may command the terminal to configure CSI-RS resources for each numerology.

Meanwhile, the base station can command numerology for the transmission/reception of the control/data channel to the terminal by the system information (SI) or the BW part configuration. The RRC idle UE indicates the numerology for the control/data channel through the SI, but the RRC Connected UE receives the numerology for the control/data channel from the base station through the BW part configuration. If the numerology set in the BW part operated currently actively does not have the same as the numerology included in one or more CSI-RS configuration, the terminal determines one of the CSI-RS configurations arbitrarily or according to the set priority to perform the CSI-RS reception operation. In this case, the terminal should perform an RF retuning process to change the numerology prior to measuring the CSI-RS. When the CSI-RS measurement ends at this point, the terminal performs the RF retuning process to change the numerology according to the BW part configuration.

Unlike the previous case where the RF retuning process is required, if the numerology set in the BW part currently actively operated is the same as the numerology included in one or more CSI-RS configuration, the terminal selects the same CSI-RS configuration having the same numerology to perform the CSI-RS reception operation. In this case, the terminal need not perform the RF retuning process to change the numerology prior to measuring the CSI-RS.

According to another embodiment of the method 3, a series of RS lists are configured in the measurement sub-object of the one measurement object, and one or more RS list may be configured. At this time, the numerology information and the offset and BW information which is the measurement band information are commonly applied to one measurement sub-object.

TABLE 5A

| MO ID | MS ID | RS Configuration | Numerology | Allowed measurement BW |
|---|---|---|---|---|
| MO#0 | MS#0 | CSI-RS#0 CSI-RS#1 | Numer#1 | BWP#1 |
|  | MS#1 | CSI-RS#0 CSI-RS#1 | Numer#2 | BWP#2 |

According to the method 4, when the serving base station transmits the configuration for the measurement and report with the RRC connection reconfiguration message, the serving base station can also indicate the carrier as the measurement object as before, but can also indicate the partial resource (time/frequency) in the carrier.

Figure 20:
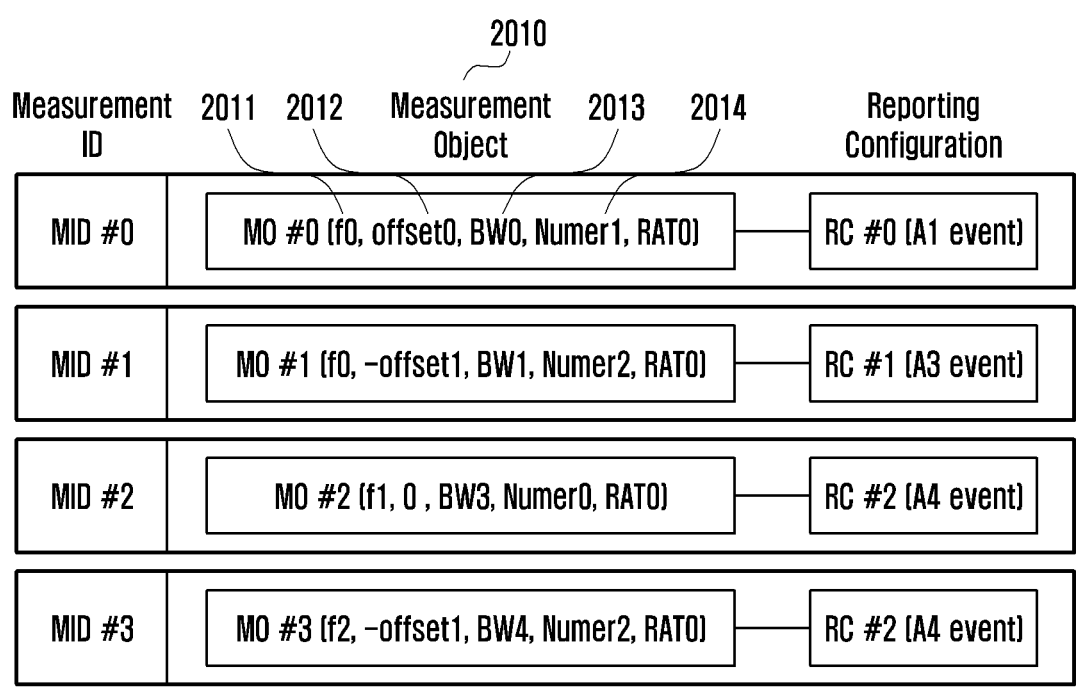
FIG. 20 is a diagram illustrating an example of a numerology-specific measurement framework according to an embodiment of the present disclosure.

FIG. 20 is a diagram illustrating an example of a numerology-specific measurement framework according to an embodiment of the present disclosure.

Referring to FIG. 20, when the measurement object 2010 is indicated, if the offset 2012 is 0 compared to a center carrier frequency or a direct current (DC) component carrier (f0) 2011, the existing carrier is indicated, and If the offset value is positive or negative, the offset value corresponds to a median value of the partial resources in the carrier. In addition, since the BW of the resource to be subjected to the RRM measurement should be known to perform the accurate measurement, the base station may additionally inform the BW information 2013.

As in the method 2, the base station also informs numerology 2014 to measure the measurement object. The measured carrier-specific, RS-specific, UE group-specific, UE-specific, BW-specific or numerology-specific base station quality values measured for the measurement object are reflected to the triggering conditions bundled with the measurement ID. If the plurality of measurement objects and the triggering condition are configured for one carrier or a base station, the terminal can construct a plurality of MO sets for the same base station based on carrier only or carrier and PCID. How to reflect it to the triggering condition for one HO decision for the MO set will be described in detail later.

The base station may indicate the identifier of the serving carrier together with the MO configuration so that the terminal configures an MO set composed of one or more MOs for the serving carrier. Alternatively, in order for the terminal to obtain measurements based on one or more RSs for the serving carrier, the base station may indicate an identifier for the serving carrier along with the RS configuration. Alternatively, in order for the terminal to obtain measurements based on one or more RRM BW for the serving carrier, the base station may indicate an identifier for the serving carrier along with the BW configuration.

According to the embodiment of the method 4, the base station may configure a series of RS lists in the one measurement object. However, for one or more RSs, the offset, BW, and numerology information, which are the measurement band information, are applied in common. Table 6 shows a case where the one or more CSI-RSs in the measurement object is configured.

The numerology and BW configurations are common to all CSI-RSs. In addition, one white cell list may be additionally configured for all the measurement objects. If only the serving cell ID is listed in the white cell list, the terminal performs only the serving cell for the measurement for the corresponding measurement object or the measurement sub-object. However, according to different configurations, the terminal may compare measurement values for different measurement objects and sub-objects and report the comparison results when the event is generated.

TABLE 6

| MO ID | RS Configuration | Numerology | Allowed measurement BW |
|---|---|---|---|
| MO#0 | CSI-RS#0 CSI-RS#1 CSI-RS#2 CSI-RS#3 | Numer#1 | BWP#1 |

According to another embodiment of the method 4, the base station configures a series of RS lists in the one measurement object, and may configure one or more RS list. At this time, the numerology information and the offset and BW information which is the measurement band information are commonly applied to one or more RS in one list.

TABLE 6A

| MO ID | RS list | RS Configuration | Numerology | Allowed measurement BW |
|---|---|---|---|---|
| MO#0 | List#0 | CSI-RS#0 CSI-RS#1 | Numer#1 | BWP#1 |
|  | List#1 | CSI-RS#0 CSI-RS#1 | Numer#2 | BWP#2 |

According to another embodiment of the method 4, the base station may configure one or more cell configuration information in the one measurement object. At this time, the numerology information and the offset and BW information which is the measurement band information are commonly applied to one or more RS in one cell configuration information.

TABLE 6B

| MO ID | Cell Configuration | RS Configuration | Numerology | Allowed measurement BW |
|---|---|---|---|---|
| MO#0 | Cell#0 | CSI-RS#0 CSI-RS#1 | Numer#1 | BWP#1 |
|  | Cell#1 | CSI-RS#0 CSI-RS#1 | Numer#2 | BWP#2 |

According to another embodiment of the method 4, the base station may configure one or more cell configuration information in the one measurement object. At this time, the numerology information and the offset and BW information which is the measurement band information are commonly applied to one or more RS in one list. In addition, the base station may also configure one or more RS lists in one cell configuration information.

TABLE 6C

| MO ID | Cell Configuration | RS list | RS Configuration | Numerology | Allowed measurement BW |
|---|---|---|---|---|---|
| MO#0 | Cell#0 | List#0 | CSI-RS#0 CSI-RS#1 | Numer#1 | BWP#1 |
|  |  | List#1 | CSI-RS#0 CSI-RS#1 |  |  |
|  | Cell#1 | List#0 | CSI-RS#0 CSI-RS#1 | Numer#2 | BWP#2 |
|  |  | List#1 | CSI-RS#0 CSI-RS#1 |  |  |

According to another embodiment of the method 4, the base station may configure one or more cell configuration information in the one measurement object. At this time, the base station may also configure one or more RS lists in one cell configuration information. At this time, the numerology information and the offset and BW information which is the measurement band information are commonly applied to one or more RS in one list.

TABLE 6D

| MOID | Cell Configuration | RS list | RS Configuration | Numerology | Allowed measurement BW |
|---|---|---|---|---|---|
| MO#0 | Cell#0 | List#0 | CSI-RS#0 CSI-RS#1 | Numer#1 | BWP#1 |
|  |  | List#1 | CSI-RS#0 CSI-RS#1 | Numer#2 | BWP#2 |
|  | Cell#1 | List#0 | CSI-RS#0 CSI-RS#1 | Numer#1 | BWP#1 |
|  |  | List#1 | CSI-RS#0 CSI-RS#1 | Numer#2 | BWP#2 |

According to the embodiment of the method 4, the base station may configure a series of RS lists in the one measurement object. However, the numerology information is commonly applied to one or more RS. Table 7 shows a case where the one or more CSI-RSs in the measurement object is configured.

The numerology setting is commonly applied to all the CSI-RSs, but the BWP setup can be configured separately for each CSI-RS. One white cell list may be additionally configured for all the measurement objects, or one white cell list may be additionally configured for each BWP. If only the serving cell ID is listed in the white cell list, the terminal performs only the serving cell for the measurement for the corresponding measurement object or the measurement sub-object. However, according to different configurations, the terminal may compare measurement values for different measurement objects and sub-objects and report the comparison results when the event is generated.

TABLE 7

| MO ID | RS Configuration | Numerology | Allowed measurement BW |
|---|---|---|---|
| MO#0 | CSI-RS#0 | Numer#1 | BWP#1 |
|  | CSI-RS#1 |  | BWP#2 |
|  | CSI-RS#2 |  | BWP#3 |
|  | CSI-RS#3 |  | BWP#4 |

In the above embodiments, at least one of the measurement object, the measurement sub-object, and the BWP information effective for the white cell list configuration may be connected and configured. By doing so, there is no need to overlappingly configure the white cell lists for each measurement object, measurement sub-object, and BWP setting.

According to an embodiment, if at least one of the methods 1 to 4 is operated together in one network, the base station may inform the terminal of an indication informing whether or not the RRM resources measured by the terminal is common to the serving base station and the neighbor base station. If receiving the common RRM resource indication, the terminal does not perform an operation of acquiring additional RRM measurement resources (RS, numerology, band, etc.) for the neighbor base station. According to a specific scenario in the measurement framework, the base station may inform the time information (period, length, etc.) of resources that are not changed frequently.

In the above embodiments, the BWP information for the measurement (location and bandwidth (BW)) may be at different levels. For example, 1) the BW value is applied in the cell unit and the location value is applied to the RS list, 2) the BW value is applied to the cell unit and the location value is applied to the CSI-RS configuration, or 3) the BW value is applied to the RS list, and the location value is applied to the CSI-RS configuration.

Measurement and Reporting Procedure

Various measurement and reporting procedures may be considered for various measurement framework methods described above.

Figure 21:
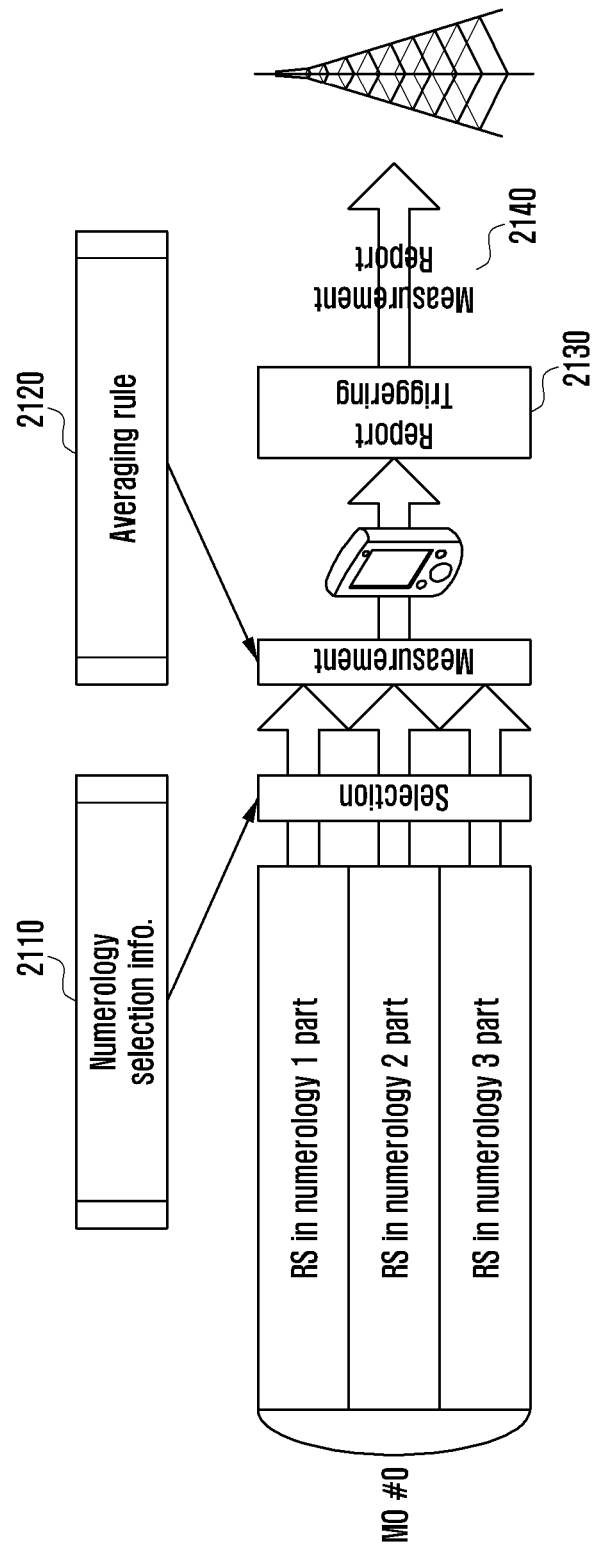
FIG. 21 is a diagram illustrating an example of a measurement and report procedure according to an embodiment of the present disclosure.

FIG. 21 is a diagram illustrating an example of a measurement and reporting procedure according to an embodiment of the present disclosure.

Referring to FIG. 21 is applicable to the methods 2 and 3, but is not limited thereto.

The terminal separately has values obtained by measuring one or more numerology-specific RS for a single measurement object (MO). In some cases, the terminal may reflect only some measured values to the overall cell quality according to numerology selection information 2110. That is, the terminal performs the averaging on the selected numerology-specific RS according to the numerology command of the base station or based on the service (slice)-numerology mapping information that the terminal has. An averaging method 2120 may be determined in advance or may be established in accordance with a command of the network.

The terminal performs a procedure of confirming the triggering condition based on one cell representative quality obtained according to the result of averaging. If the triggering condition is satisfied (2130), the terminal reports (2140) one or more measurement quantity according to the configuration of the base station.

Meanwhile, the terminal may perform the measurement operation only on the cell specified in the white cell list configured for the measurement ID, the measurement object, the measurement sub-object, and the BW part. If the white cell list is specified in the measurement ID, the terminal performs the measurement by applying the white cell list to all the measurement objects and measurement sub-objects belonging to the measurement ID. If the white cell list is specified in the measurement ID, the terminal performs the measurement by applying the white cell list to all the measurement objects and measurement sub-objects belonging to the measurement object. If the white cell list is specified in the measurement sub-object, the terminal performs the measurement by applying the white cell list to each measurement sub-object. If the white cell list is configured separately for the measurement object and the measurement sub-object, the white cell list configured for the object is not applied to the sub-object for which the white cell list is separately set. If the white cell list is configured for each BW part, the white cell list configured for the SS, CSI-RS, object or sub-object associated with the corresponding BW part is applied. According to the embodiment, when the terminal measures neighboring cells in the serving cell, the base station may configure the terminal to restrict the measurement by applying a different white cell list for each BWP. The base station exchanges information between the base stations to know which BWP the neighboring cell has set as the RRM BW.

TABLE 8

| MO ID | RS Configuration | Numerology | Allowed measurement BW | White cell list |
|---|---|---|---|---|
| MO#0 | CSI-RS#0 | Numer#1 | BWP#1 | Cell 1, 3, 5 |
|  | CSI-RS#1 |  | BWP#2 | Cell 2, 4, 6 |

In the present disclosure, the numerology-specific RS may correspond to at least one of a cell-specific RS, a UE-specific RS, or a UE group-specific RS. The cell-specific RS may include a common RS and/or a dedicated RS. The terminal-specific RS or the UE group-specific RS may include the dedicated RS. The configuration information of the numerology-specific RS may be transmitted to the terminal using at least one of dedicated RRC signaling, L1 signaling, and MAC signaling. The numerology-specific RS may include at least one of a SS, a CSI-RS, a CRS, a beam reference signal (BRS), a mobility reference signal (MRS), a discovery reference signal (DMRS), and a demodulation reference signal (DMR).

Figure 22:
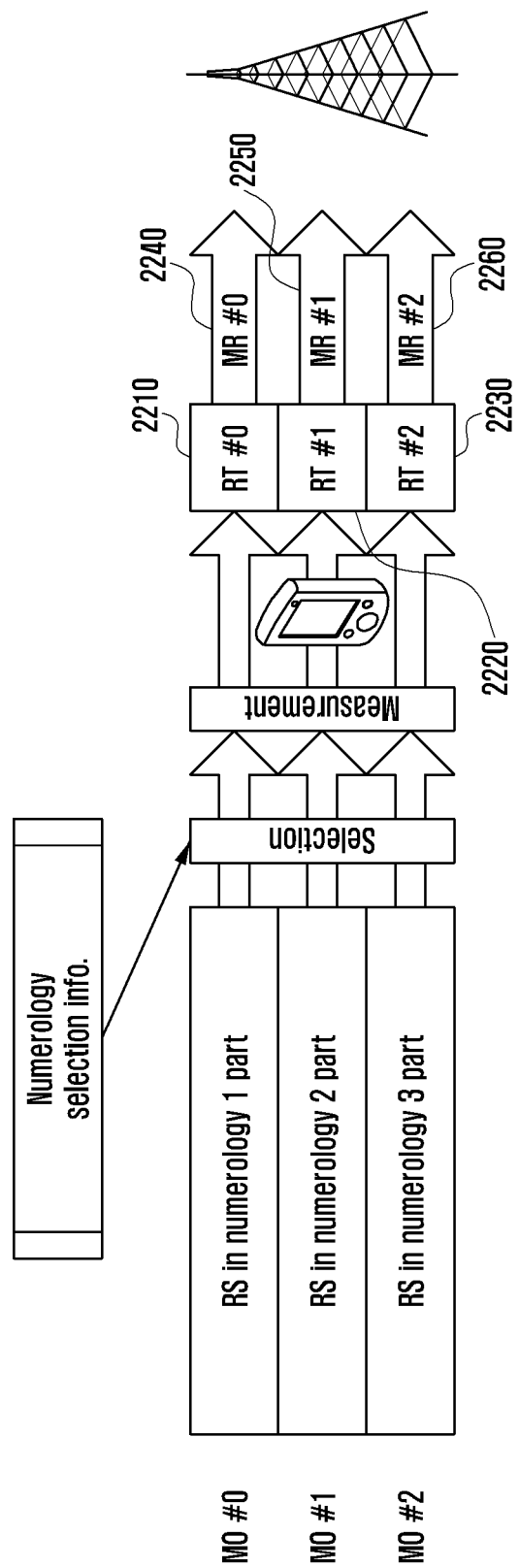
FIG. 22 is a diagram illustrating another example of the measurement and report procedure according to an embodiment of the present disclosure.

FIG. 22 is a diagram illustrating an example of a measurement and reporting procedure according to an embodiment of the present disclosure.

The procedure illustrated in FIG. 22 is applicable to the method 4, but is not limited thereto.

Similar to the LTE, the terminal acquires a measurement result by applying the L1 averaging and the L3 filtering to each measurement object. The terminal applies a triggering condition based on the channel quality determined by each measurement result. However, when one or more triggering condition 2210, 2220, and 2230 are simultaneously operated for one base station, the HO decisions should be unified into one. Therefore, the base station makes one HO decision based on one or more measurement reports 2240, 2250, and 2260.

The base station should be operated in such a manner that one HO decision is obtained when there is a conflict between one or more triggering conditions, by additionally considering the service/slice or QoS information used by the terminal according to the implementation. For example, if the terminal is receiving URLLC and eMBB services, higher priority may be assigned to the base station that is using numerology used for URLLC. The base station may assign the priorities among the service/slice/numerology to the terminal based on at least one of RRC signaling, MAC signaling, and L1 signaling.

Figure 23:
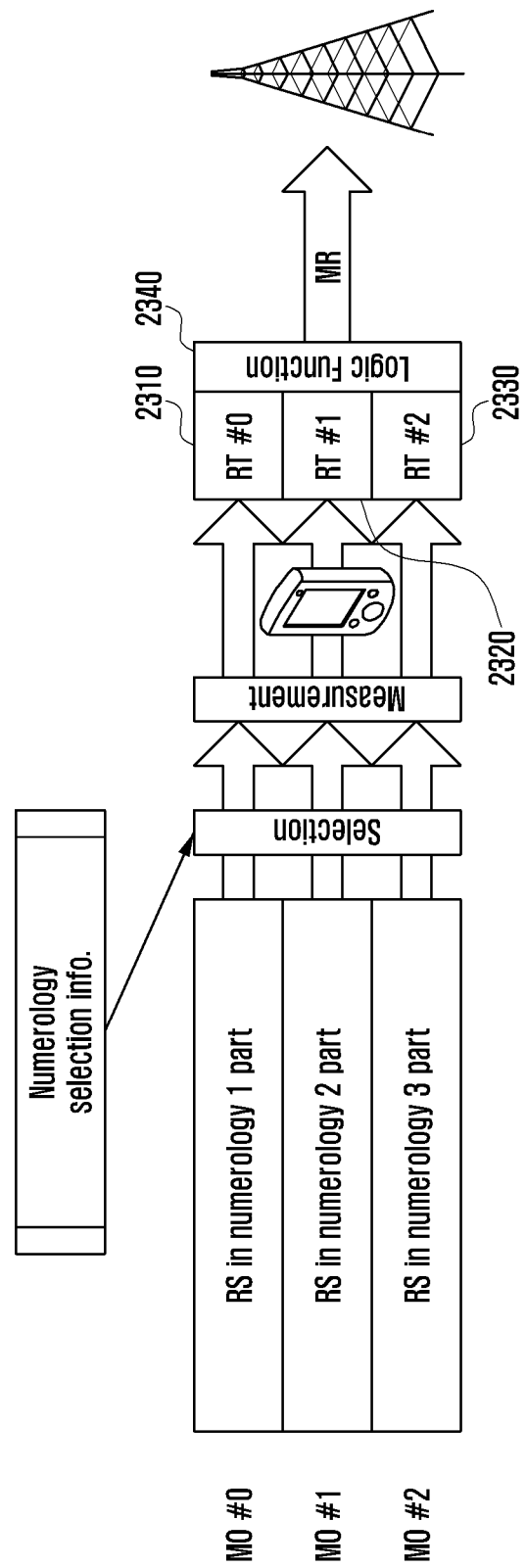
FIG. 23 is a diagram illustrating still another example of the measurement and report procedure according to an embodiment of the present disclosure.

FIG. 23 is a diagram illustrating another example of a measurement and reporting procedure according to an embodiment of the present disclosure.

The procedure illustrated in FIG. 23 is applicable to the method 4, but is not limited thereto.

Similar to the LTE, the terminal acquires the measurement result by applying the L1 averaging and the L3 filtering to each measurement object. The terminal applies a triggering condition based on the channel quality determined by each measurement result. However, when one or more triggering condition 2310, 2320, and 2330 are simultaneously operated for one base station, the HO decisions should be unified into one. Therefore, the terminal should make one HO decision based on one or more measurement reports.

To this end, the terminal may obtain one decision for each triggering condition (TC) based on logical function (2340). For example, the terminal may determine the triggering condition in the same way as TC=TC #0 AND TC #1 or TC=(TC #0 OR TC #1) and TC #2. To use this logical function, the terminal receives the configuration of table and index information from the base station. In addition, the terminal may be operated based on the numerology set configured by the base station or the numerology set information associated with the service/slice being used, assuming that no event has occurred in the triggering condition not included in the numerology set. Alternatively, if there is priority information in the numerology set, the terminal is operated according to TC=TC #0 AND TC #1 AND TC #2 when all possible TCs are satisfied, and it is possible to determine whether the TC is satisfied by excluding the low priority TC according to a change in an index due to failure of the HO related operation or the signal detection.

For example, when the TC_all=TC #0 AND TC #1 AND TC #2 condition is not satisfied and the TC_some=TC #0 AND TC #1 condition is satisfied, if a T312 timer for determining RLF is performed by predetermined ratio (X %), the terminal can determine whether or not to perform the triggering using the TC_some instead of the TC_all as the determination condition. However, the terminal should report the measurement report transmitted as the determined result based on the TC_some to the base station.

Figure 24:
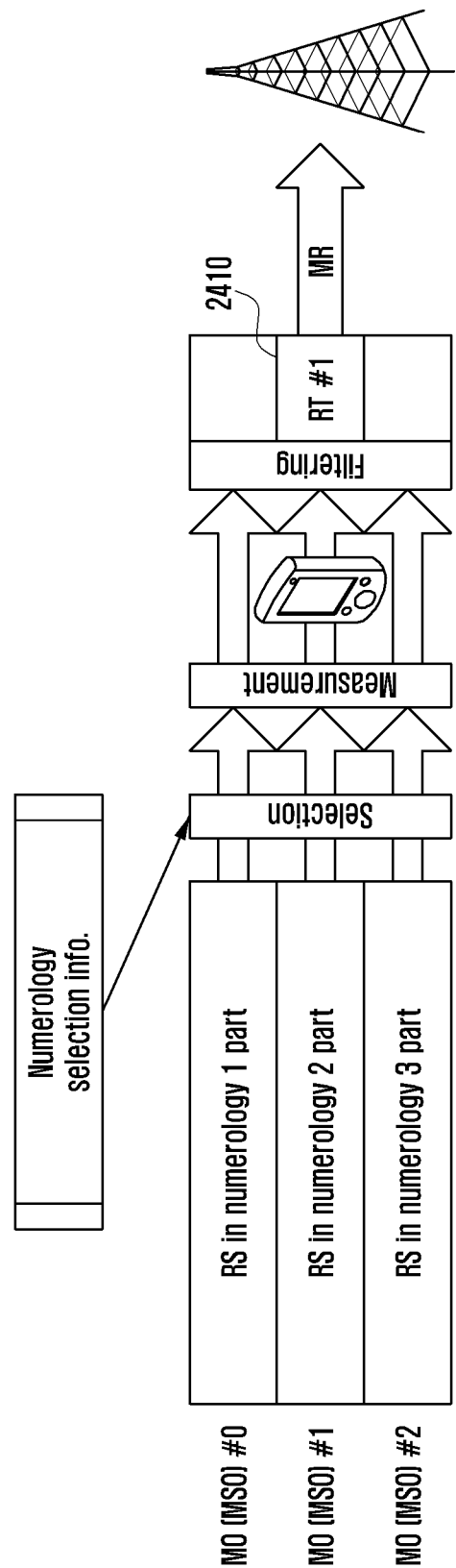
FIG. 24 is a diagram illustrating still yet another example of the measurement and report procedure according to an embodiment of the present disclosure.

FIG. 24 is a diagram illustrating another example of a measurement and reporting procedure according to an embodiment of the present disclosure.

The procedure illustrated in FIG. 24 is applicable to the methods 3 and 4, but is not limited thereto.

According to the methods, the terminal acquires the measurement result by applying the L1 averaging and the L3 filtering to each measurement object. Then, the terminal applies only one triggering condition (2410).

In the case of the method 3, the triggering condition follows the TC of the measurement object, and in the case of the method 4, the terminal follows the TC of one measurement object according to the rule established by the base station.

In order to obtain one measurement result for one TC, the terminal performs the filtering by assigning a weight to a plurality of measurement results. For example, a value obtained by performing normalization on a value obtained by multiplying/adding a weight by each measurement result and adding them according to the frequency of use by numerology used when the terminal performs the measurement may be determined as a final measurement result. Alternatively, the terminal may determine one measurement result based on the numerology set configured by the base station or the numerology set associated with a service/slice being used and the priority (or weight) information thereof. The terminal transmits the final measurement report to the base station if it satisfies the triggering condition previously determined by the base station or determined for one numerology determined according to the rule/priority information indicated or configured by the base station.

In the above description of the overall measurement framework, the measurement resource is generally carrier-specific, but may be cell-specific or UE-specific or UE group-specific in some cases. That is, if the measurement resource is carrier-specific, the measure object is a carrier and the time/frequency resources common to the carrier are configured.

If the measurement resource is cell-specific, if the measurement object is a carrier, one or more measurement resource indices or cell ID is included in the measurement configuration so that the measurement resources for each cell having a separate index or cell ID is associated with the measurement object.

If the measurement resource is cell-specific and the measurement object is a cell, then one cell ID for each measurement configuration is sufficient.

If the terminal UE-specifically receives the configuration of the measurement resources, the base station should inform the terminal of the relationship between UE-specific measurement resource and the measurement configuration. The terminal applies the measurement filtering and the triggering conditions according to the setting of the measurement configuration connected to the measurement resources.

The measurement object may be configured for each of the numerology-specific reference signals, and the base station may configure in the terminal what type of numerology-specific reference signal is configured according to the separate indication information or the predetermined information.

According to an embodiment, since only the base station may dynamically configure the CSI-RS in the measurement object or the sub-object configuration, the base station may inform the terminal of the validation date of the configuration. The validation date is represented by a combination of at least one of a frame number, a subframe index, and a slot index. The range of the configuration may be limited to one of a serving base station, a TRP list, a base station list, a RAN paging area, and a CN paging area.

According to an embodiment, the terminal basically should perform the RRM measurement for the SS configured in one carrier. The configuration of the SS may include at least one variable of an SS transmission period, a period and a length of the SS group (or burst), an SS transmission frequency offset, and an SS transmission band index separately from the RRM measurement configuration. The base station may configure it in the terminal. If the SS is specified in the measurement object or the sub-object to additionally configure information corresponding to the SS configuration information, the terminal is operated by overriding the existing SSS configuration to the SS measurement configuration included in the measurement object/sub-object configuration.

Report Configuration

In the case of the methods 3 and 4, the RRM measurement report configuration indicated to the terminal by the base station may be different by numerology. This is to support a case in which handover requirements by service/slice handover are different. For the method 3, the base station may configure different reporting periods, offsets, and thresholds for each measurement sub-object. For the method 4, like the LTE, the base station may configure variables such as different reporting periods, offsets, and thresholds for each measurement sub-object. Meanwhile, for efficient use of resources, when the terminal transmits a reporting message according to one reporting configuration under a plurality of triggering conditions, the terminal may piggyback and transmit another reporting configuration, i.e., a report for another measurement object/sub-object, another report configuration, that is, reporting on another measurement object/sub-object. The terminal determines at least one report to be piggybacked according to at least one of a priority according to reporting urgency, a priority set by the base station, and a priority according to the service/slice. The base station can set the maximum amount of report that the terminal piggybacks and transmits.

The terminal may report using the measurement resource index instead of the cell ID or transmit the cell ID and the measurement resource index together when reporting according to the report configuration. The measurement resource index may be at least one of an SS time index, an SS burst index, and an SS measurement interval index in the case of the SS. In the case of the CSI-RS, it may be at least one of a physical resource port number, a CSI-RS resource index, and a BW part index.

The report configuration may be configured for each numerology-specific reference signal, and the base station may configure in the terminal what type of numerology-specific reference signal is configured according to the separate indication information or the predetermined information.

According to an embodiment, if there are measurement values for one or more RS for one or more BW part in a measurement object in the measurement report, the terminal may determine and report one representative measurement for each BW part or report BW part index information along with the measurement values for each RS.

Selection for Measurement Object/Sub-Object

When the terminal measures the RRM resource determined based on the measurement object or the sub-object, the terminal may select an object to be used for the measurement according to at least one of the following methods. In the following description, the numerology set may be set as the SI or RRC signal or the L1 signal or the MAC signal by the base station according to service/slice information and/or UE capability information and/or mobility type (L1/L2 mobility or L3 mobility).

Option 1) The terminal selects a measurement (sub-) object corresponding to numerology or numerology set that the base station indicates by L1, RRC (L3) or MAC (L2) signal.

Option 2) The terminal selects the measurement (sub-) object corresponding to numerology associated with the RS detectable in the resources that the base station indicates by the L1 or RRC (L3) or MAC (L2) signal. The terminal may receive the configuration of the numerology set for blind detection from the base station according to the example.

Option 3) The terminal selects a measurement (sub-) object corresponding to the upper N-th according to the numerology set and the priority/weight thereof that the base station indicates by L1, RRC (L3) or MAC (L2) signal. The N is determined according to the UE capability or the restriction of the operation or the network acquired through the RRC connection establishment procedure may configure the UE capability information in the terminal.

Averaging/Filtering Measurement Value for Measurement RS

If priority or selection is used for one or more measurement resources configured for one serving carrier, one cell, or one MO, the priority or selection may be set by the network, or may be set by the terminal according to rules that the network gives. The priority are determined according to at least one of priorities of service/slice, priority between numerologies, priority between measurement (sub-) objects, priority according to QoS, priority according to power consumption, priority according to delay, priority according to time when the RS is detected, priority according to urgency of the reporting, priority according to a mobility type, and priority according to the RS type. The selection is determined according to at least one of whether to use the service/slice, whether to use the numerology, whether to satisfy TC, whether to detect the RS, and whether to support according to the UE capability.

When there are a plurality of measurement resources for each set numerology, the terminal may transmit to the base station at least one of what numerology is used, what RS is used, or at least one of the measurement (sub-) object or the measurement ID information by including it the measurement report.

A. When the terminal performs averaging at L 1, an additional example of the averaging method is as follows.
  A-1) Linear average value for all detected RSs.
  A-2) Largest value among the linear average values for all the detected RSs in the resources for each numerology.
  A-3) Linear average value for all the detected RSs in the highest priority numerology resource.
  A-4) Weighted average value according to priority for all the detected RSs.
  A-5) Largest value among the weighted average values for all the detected RSs in the resources for each numerology.
  A-6) Filtering value according to priority/weight for the linear average value for all the detected RSs in the resources for each numerology.

B. When the terminal performs filtering at L3, an additional example of the filtering method is as follows.
  B-1) All L1 sample values are input to an L3 filter.
  B-2) L1 samples corresponding to the highest k priority among the L1 sample acquisition period (e.g., 40 ms) are input to the L3 filter according to the priority. k may be set by the base station.
  B-3) If a plurality of L3 measurement results are operated, the L3 filter corresponding to the highest k priority among the L3 reporting period (e.g., 200 ms) according to the priority is reported. k may be set by the base station.
  B-4) L1 samples corresponding to the measurement (sub-) object selected in the L1 sample acquisition period (e.g., 40 ms) are input to the L3 filter according to the selection rule.
  B-5) If a plurality of L3 measurement results are operated, the L3 filter corresponding to measurement (sub-) object selected in the L3 reporting period (e.g., 200 ms) according to the selection rule is reported.
  B-6) The existing measurement framework is left as it is and additional filtering information is provided according to the numerologies for each cell at L 1. At L3, the filtering at the L1 is agnostic.

Triggering Condition

Hereinafter, the triggering condition framework of the entire RRM measurement procedure of the present disclosure will be described.

There is a need for a method of determining one of a plurality of TCs for stability of the HO for a measurement framework in which a plurality of triggering conditions are configured for one carrier or a base station (group) or a measurement object. For example, a combination of various conditions can be considered as follows. This condition may be determined as one in the network/cell, or the network may be UE-specifically configured in the terminal.

When the triggering condition is determined according to the priority or the selection, the priority or the selection for determining the triggering condition may be determined by the network or may be determined by the terminal according to the rule that the network assigns. The priority are determined according to at least one of priorities of service/slice, priority between numerologies, priority between measurement (sub-) objects, priority according to QoS, priority according to power consumption, priority according to delay, priority according to a mobility type, and priority according to the RS type. The selection is determined according to at least one of whether to use the service/slice, whether to use the numerology, whether to satisfy TC, whether to detect the RS, and whether to support according to the UE capability.

The triggering condition can be determined by the following example.
  C-1: When all TCs are satisfied.
  C-2: When one TC are satisfied.
  C-3: When the selected K TCs are satisfied; K may be directly set in the terminal by the base station or may be the size of a numerology set configured in the terminal by the base station.
  C-4: When the K TCs having highest priority are satisfied; K may be directly set in the terminal by the base station or may be the size of a numerology set configured in the terminal by the base station.
  C-5: When the K TCs having lowest priority are satisfied; K may be directly set in the terminal by the base station or may be the size of a numerology set configured in the terminal by the base station.

As an example of the triggering condition and the reporting procedure, the base station may be configured in the terminal whether to reflect the measurement values for each measurement sub-object or BW part as a target of the triggering condition. Also, it is possible to determine whether to reflect the measurement values for each measurement sub-object or BW part as the target of the triggering condition even for a specific event, not all events. By this operation, the base station sets the terminal to trigger only an A3 event (A3 compares the serving cell with the neighboring cell) for a certain measurement sub-object or BW part, and to trigger only A1 event (A1 compares an absolute value of the serving) for other measurement sub-objects or BW parts. This method has the advantage of expressing more various cases than the method using the white cell list described above.

If the triggering condition is satisfied, the terminal reports it to the base station with a measurement ID indicating the TC satisfying the condition according to at least one of the periodic, semi-periodic, and aperiodic report formats according to the configuration of the base station.

According to an embodiment, the following method can be realized by combining the above-mentioned triggering condition and report method. That is, the measurement resource for reviewing the triggering condition is applied to only one reference measurement RS (or reference MO or reference MS or reference BW) and the contents of the measurement report performed by satisfying the triggering condition may include the information on one or more measurement resource configured for the serving carrier (or serving cell or MO) applying the triggering condition.

Measurement Reconfiguration>

Herein, the measurement reconfiguration of the entire RRM measurement procedure of the present disclosure will be described.

The merit of the numerology-specific measurement framework described so far is that the measurement report is classified by numerology so that it can detect the problem of the measurement of the base station or terminal to adjust the RRM measurement configuration.

FIGS. 25A and B and 26A and 26B show how the numerology of the base station to be observed is configured and operated. In this case, resources 2510 and 2520 in FIGS. 25A and 25B and resources 2610, 2620, 2630, 2640 and 2650 in FIGS. 26A and 26B represent resources in which the terminal is operating in the serving base station.

FIGS. 25A and 25B are diagrams illustrating an example in which there is no change in resource and numerology for RRM measurement according to an embodiment of the present disclosure.

Referring to FIG. 25, object (a) illustrates a case in which a serving base station is configured so that the terminal is operated in a resource including a center carrier as numerology 0 and measures a resource corresponding to numerology 0 of a neighbor base station, and object (b) illustrates a case in which the serving base station is configured so that the terminal is operated in a resource not including a center carrier as numerology 1 and measures a resource corresponding to numerology 0 of a neighbor base station. In both cases of FIGS. 25A and 25B, there is no loss in the measurement result because the numerology and the measurement resources are the same.

FIG. 26 illustrates an example in which there is a change in resource and numerology for RRM measurement according to an embodiment of the present disclosure.

Referring to FIG. 26, object (a) illustrates a case in which a serving base station is configured so that the terminal is operated in a resource including a center carrier as numerology 0 and measures a resource corresponding to numerology 1 of a neighbor base station, and object (b) illustrates a case in which the serving base station is configured so that the terminal is operated in a resource not including a center carrier as numerology 2 and measures a resource corresponding to numerology 1 of a neighbor base station.

In both cases shown in FIG. 26, there may be a loss in the measurement result because the numerology and the measurement resources are not the same. In the case shown in object (a) of FIG. 26, for example, the network identifies the problem in the measurement report for the numerology 0 of the terminal and reconfigures the terminal to measure the resource of the numerology 1. In the case shown in object (b) of FIG. 26, for example, the network identifies the problem in the measurement report for the numerology 1 of the terminal and reconfigures the terminal to first measure the resource of the numerology 0. If the corresponding TC is satisfied as the measurement report result for the numerology 0 of the terminal, it is reconfigured to measure the resource of the numerology 2 associated with the service/slice. According to the reconfiguration method, 1) the base station allows the terminal to reconfigure the numerology and resource information with the L1 signal, 2) reconfigure the measurement (sub-) object with the RRC connection reconfiguration message, or 3) reconfigure the measurement (sub-) object with the cell-specific signals (e.g., PBCH, SI) or the UE-specific signal (e.g., RRC message) of the neighbor base station.

Meanwhile, in the example illustrated in FIG. 26, in order to measure other RRM resources, the base station may allow the terminal to configure the measurement gap and/or measurement resources. According to the measurement gap operation used in the LTE, the terminal can search for another bas station without monitoring the serving base station for consecutive subframes for a maximum of 6 ms every 40 ms or 80 ms. In 5G NR, since the resources by numerology of the neighbor base station may be changed dynamically a short measurement gap spreading over a few ms interval may be rather useful. Alternatively, an explicit and temporal measurement gap setting may be added to a response message of the base station to the measurement report of the terminal. The base station may further configure the numerology and resource information to be observed when setting the measurement gap.

Figure 37:
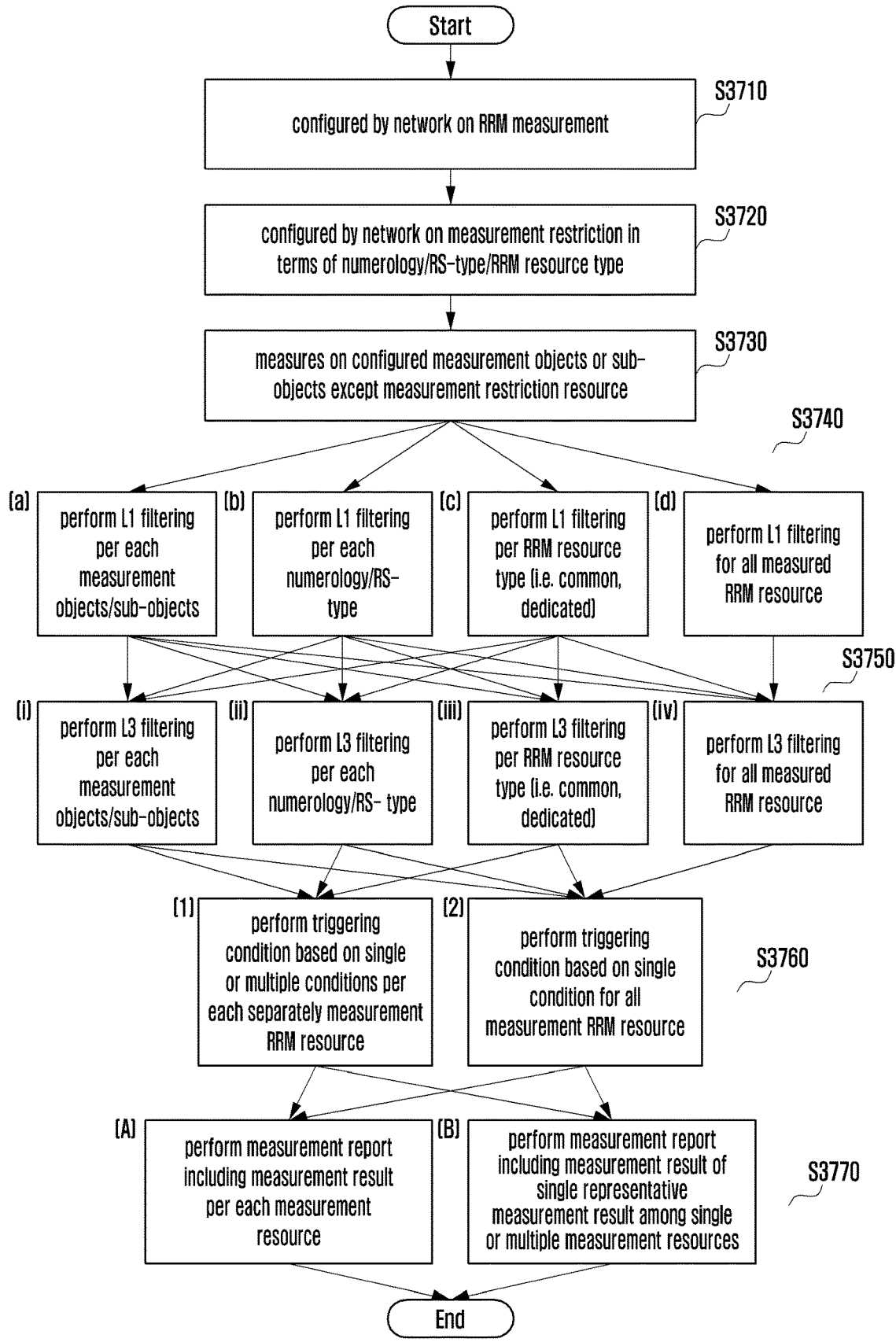
FIG. 37 is a diagram illustrating an operation of a terminal according to various embodiments of the present disclosure.

FIG. 37 illustrates an operation of the terminal according to various examples of the measurement configuration, measurement object/sub-object, L1/L3 filtering, triggering condition, and measurement report as described above.

FIG. 37 is a diagram illustrating an operation of a terminal according to various examples of the present embodiment.

Referring to FIG. 37, in operation S3710, the terminal receives the RRM measurement configuration for the RRM resource and reporting from the base station. The RRM resource can be configured by numerology, RS-type, and RRM resource type (Common/Dedicated). Also, in operation S3720, the terminal receives the configuration for measurement restriction from the base station.

Then, in operation S3730, the terminal measures the measurement resources other than the resource in which measurement restriction is configured.

The measurement procedure is largely divided into four operations: L1 filtering (or averaging) (S3740), L3 filtering (S3750), triggering condition (S3760), and measurement report (S3770). Each operation may be performed in different ways according to the option.

The L1 filtering operation may be operated according to one of (a) separate operation by the measurement object and the measurement sub-object separately, (b) separate operation by numerology or RS-type, (c) separate operation by RRM resource type, or (d) operation without being separated for all the RRM resources.

The L3 filtering operation may be operated according to one of operations (i) being separately performed by the measurement object and the measurement sub-object separately, (ii) separately performed by numerology or RS-type, (iii) separate operation by RRM resource type, or (iv) performed without being separated for all the RRM resources, according to the result of the L1 filtering operation.

The triggering condition operation S3760 may be operated according to one of operations of 1) identifying a triggering condition and 2) identifying only one triggering condition, for the filtering result values separately performed in the L3 filtering operation.

In the process of identifying each triggering condition, a procedure may be further included to identify that one or N triggering conditions are satisfied.

The measurement report operation S3370 is performed when in the triggering condition operation, the condition is satisfied, for the triggering condition result, the terminal is operated according to one of operations of (A) reporting a separate measurement result for each measurement resource and (B) reporting a single representative value integrated for each measurement resource.

(A) and (B), the terminal may be operated according to one of the operations of reporting only the measurement resources satisfying the triggering condition and reporting all of the N measurement resources, according to the terminal implementation or the base station configuration.

Figure 38:
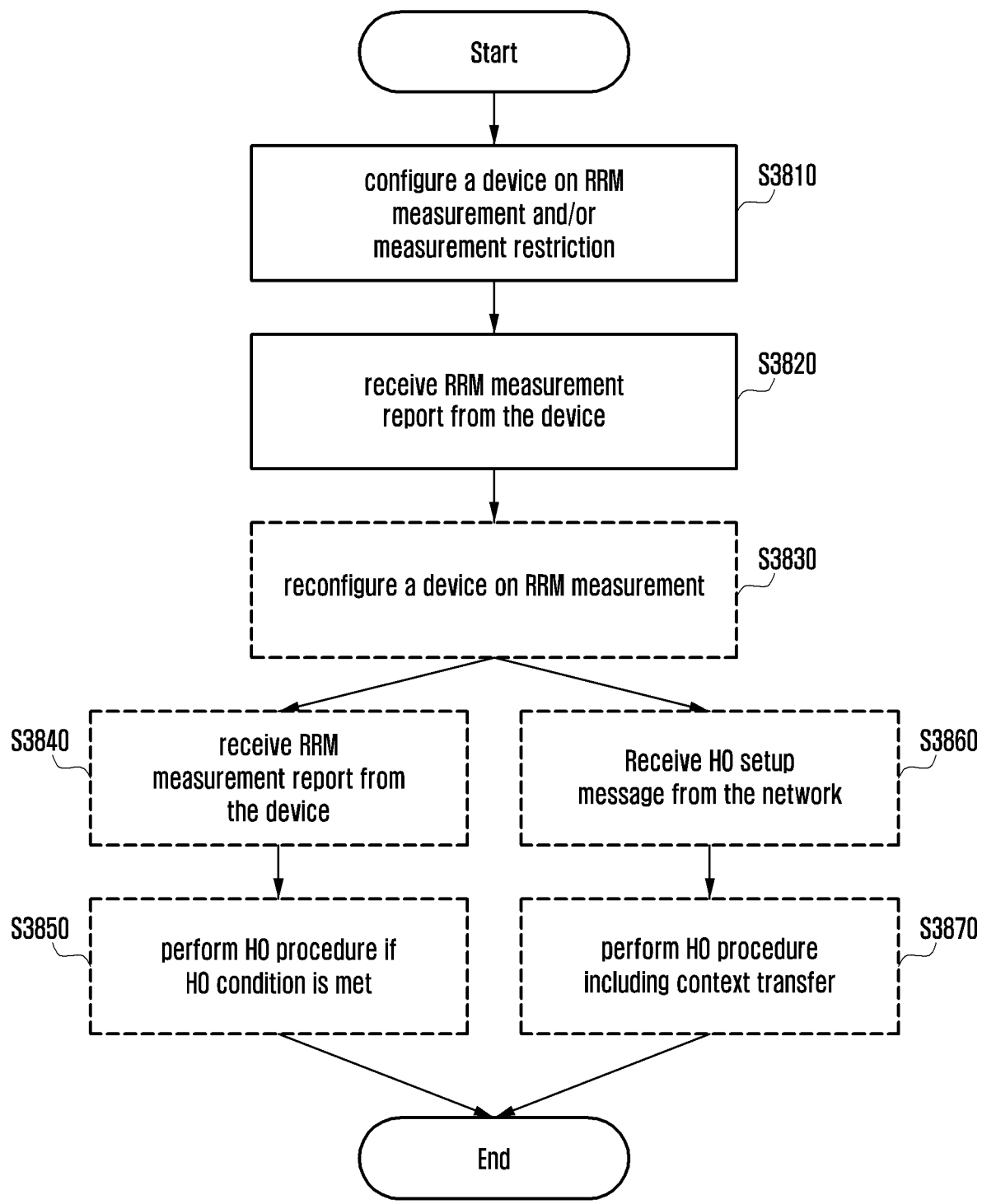
FIG. 38 is a flowchart illustrating measurement configuration and a part of an operation of the base station according to an embodiment of the present disclosure.

FIG. 38 is a flow chart of the measurement configuration and a part of the operation of the base station according to an embodiment of the present disclosure.

The base station transmits the measurement configuration and the measurement restriction configuration to the terminal in operation S3810. The base station receives the measurement report from the terminal in operation S3820.

If necessary, the base station transmits the reconfiguration to the terminal according to the changed RRM resource and the changed reporting method in operation S3830.

Upon receiving the RRM measurement report from the terminal in operation S3840, the base station identifies whether the HO condition is satisfied and starts the HO procedure in operation S3850.

Meanwhile, if it is determined that the terminal satisfies the HO condition and the terminal-based HO procedure of initiating the HO is configured, the terminal first performs the HO procedure with the neighbor base station selected and the serving base station receives an HO setup message for the required procedure from the neighbor base station in operation S3860. In operation S3870, the serving base station performs the HO procedure for handing over the terminal information (HO context and the like) and the remaining data to the neighbor base station.

Handover Procedure

Here, the HO procedure based on numerology-specific RRM measurement will be described.

HO procedure method 1. If there is one mobility decision for one terminal.

In the present disclosure, it is assumed that there is a mobility decision for most of the HO procedure method 1, i.e., one terminal. This means that the terminal cannot simultaneously perform HOs with a plurality of other base stations. In the context, a flow chart of some cases corresponding to the HO procedure method 1 is described.

HO procedure method 2. If there are a plurality of mobility decisions for one terminal.

A case where one terminal performs HO with a plurality of different base stations according to a plurality of triggering conditions. However, at this time, the terminal should be able to support dual connectivity (DC) or multi connectivity (MC).

Figure 27:
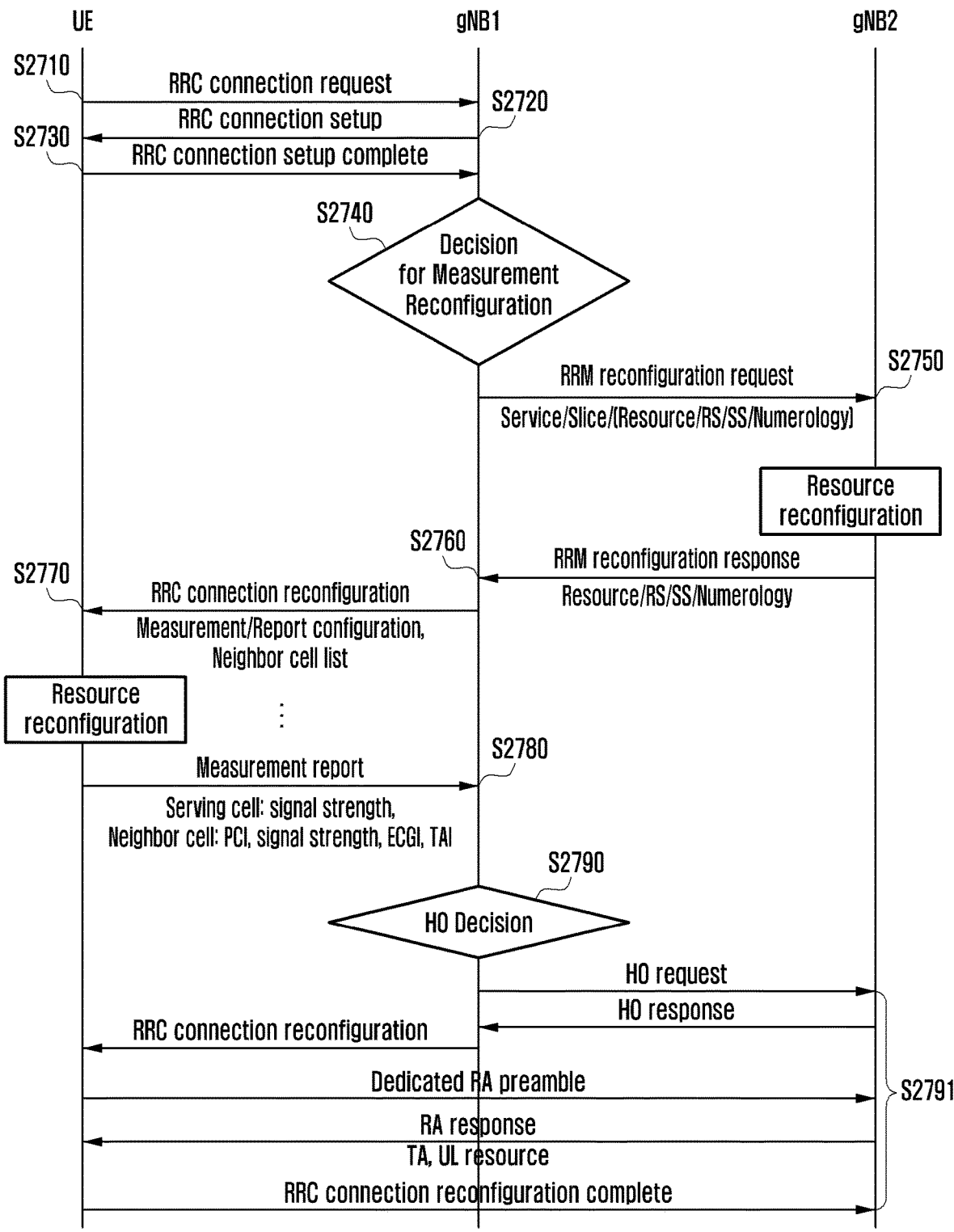
FIG. 27 is a diagram illustrating an example of base station control RRM measurement reconfiguration according to an embodiment of the present disclosure.

FIG. 27 is a diagram illustrating an example of base station control RRM measurement reconfiguration in accordance with an embodiment of the disclosure.

Referring to FIG. 27 illustrates a procedure of allowing a serving base station to inform CONNECTED UE that RRM measurement information (at least one of resource, RS, SS, numerology) is periodically exchanged between base stations to update RRM measurement information.

The terminal transmits an RRC connection setup request message to the serving base station in operation S2710, and if the terminal receives an RRC connection setup message from the serving base station in operation S2720, and receives an RRC connection setup message to the serving base station in operation S2730.

Thereafter, the serving base station may determine the measurement reconfiguration in operation S2740, and when the measurement reconfiguration is performed, the serving base station may transmit an RRM reconfiguration request message to a target base station in operation S2750.

When the serving base station gNB1 transmits the RRM measurement reconfiguration request to a target base station gNB2, the request message includes at least one of service/slice/numerology information and a numerology specific RS type. The gNB2 provides RRM measurement resource information to the gNB1 by including the RRM measurement resource information in the RRM reconfiguration response message, based on the resources used in the gNB2 for at least one of the service/slice/numerology information requested in the operation S2760.

In operation S2770, the serving base station transmits the RRC connection request message including a measurement configuration, a reporting configuration, and a neighbor cell, receives measurement report in operation S2780, and performs a handover in operation S2790 to perform a handover procedure operation S2791.

That is, according to FIG. 27, the terminal performs the handover according to the same procedure as the existing HO procedure. However, this method may generate a considerable load on a network interface such as X2, S1, and Xn between the base stations.

Figure 28:
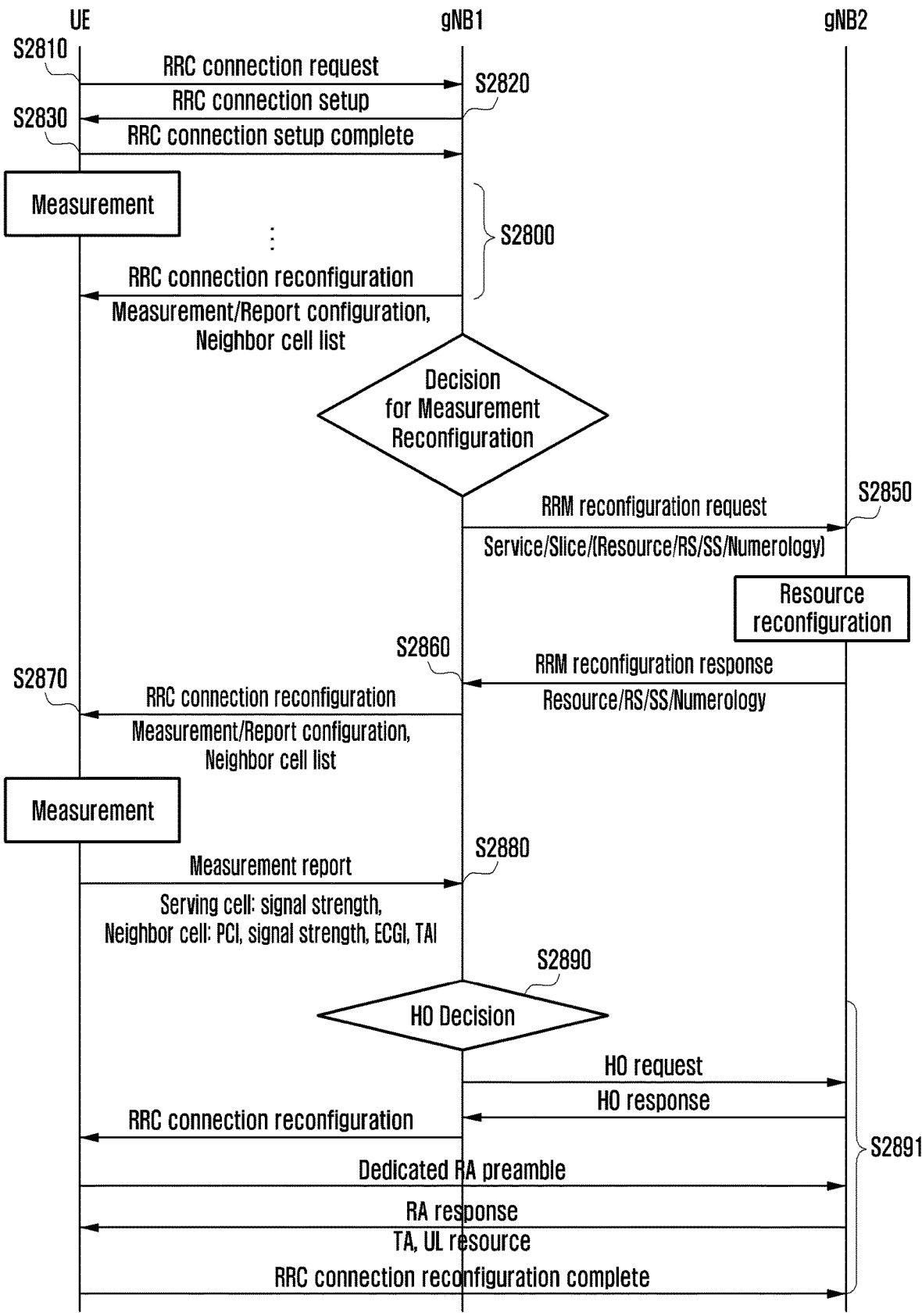
FIG. 28 is a diagram illustrating an example of base station control RRM measurement reconfiguration according to an embodiment of the present disclosure.

FIG. 28 is a diagram illustrating an example of base station control RRM measurement reconfiguration according to an embodiment of the present disclosure.

Operations S2810 to S2891 in FIG. 28 are the same as operations S2710 to S2791 in FIG. 27, and detailed description thereof will be omitted.

FIG. 28 is similar to the method of FIG. 27, but the base station performs the reconfiguration in an event-driven manner based on the measurement report at operation S2800 of the terminal without periodically performing the RRM measurement reconfiguration. That is, if the channel quality for the neighbor base station is less than a predetermined value in the measurement report of the terminal, the serving base station recognizes the problem and exchanges (S2850, S2860) the RRM measurement reconfiguration request and response message with the base station gNB2, which can be known with the PCI and the ECGI information included in the measurement report of the terminal, to update the information.

More specifically, the method may be applied when the network is operated as the common RS and the dedicated RS. The common RS may correspond to a cell-specific RS. The dedicated RS may correspond to a cell-specific RS or a UE-specific RS. For example, the terminal is configured to measure and report only a common RS (numerology 0) of the neighbor base station. If the measurement result indicates how much the channel quality is reliable based on the common RS according to the report of the terminal, the base station may additionally configure the dedicated RS (numerology 1) and the related RRM resource information in the terminal. Accordingly, the terminal may measure the channel by dividing the numerology 0 and the numerology 1 according to one of the methods proposed by the present disclosure, and report the measurement result on a triggering condition based on one representative value based thereon or reports the measurement result on the plurality of triggering conditions by numerology, and the network obtains one mobility decision.

Figure 29:
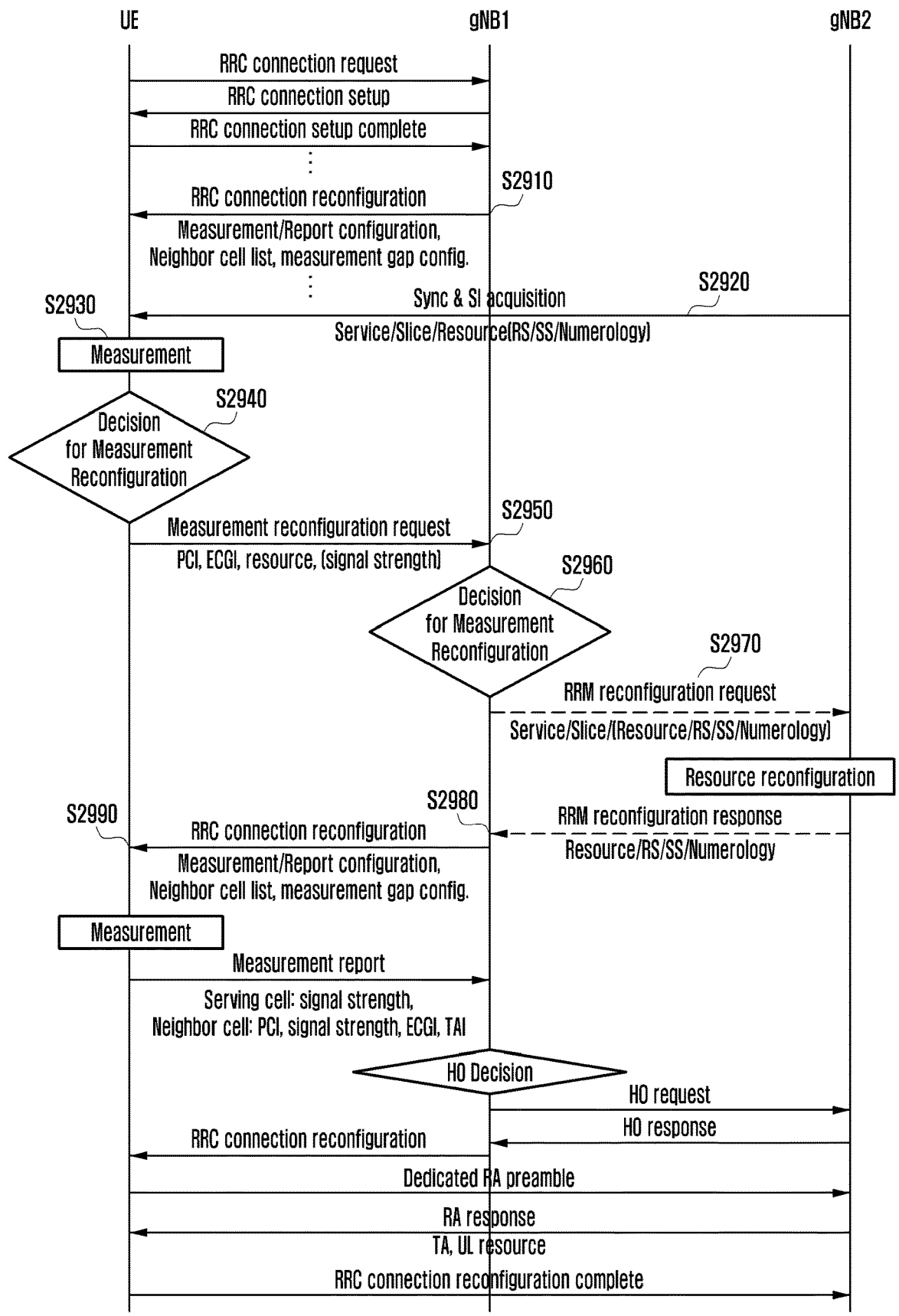
FIG. 29 is a diagram illustrating an example of terminal control RRM measurement reconfiguration according to an embodiment of the present disclosure.

FIG. 29 is a diagram illustrating an example of the terminal control RRM measurement reconfiguration in accordance with an embodiment of the disclosure.

Referring to FIG. 29 illustrates a manner in which the terminal directly acquires the RRM measurement information from the target base station gNB2 and accordingly determines the measurement reconfiguration. To support this, in operation S2910, the serving base station gNB1 configures the measurement gap (including at least one of the resource to be observed, the type of RS, and the numerology) to the terminal through the RRC connection reconfiguration message, and the terminal searches for the signal (in this example, SS or/and SI) of the neighbor base station according to the configured measurement gap. In operation S2920, the terminal receives the SS or/and the SI, and obtains at least one of the service/slice/numerology and corresponding resource and RRM measurement information that the gNB2 provides.

The terminal performs the measurement according to the RRM measurement information of the gNB2 acquired in operation S2930, and determines whether to reconfigure the RRM measurement in operation S2940.

If the terminal determines that the measurement reconfiguration is required, it sends the RRM measurement reconfiguration request message to the serving base station gNB1 in operation S2950. This message may include at least one of PCI/ECGI, numerology-specific resource information, and base station quality to indicate the gNB2 that is the object of the determination.

In operation S2960, the base station may determine whether to perform the RRM measurement reconfiguration with the reported gNB2 according to the request of the terminal to exchange the related information at operation S2970, S2980 similarly, and in operation S2990, may directly transmit the RRM connection reconfiguration response message according to the already known information in operation S2990.

Meanwhile, among the processes included in FIG. 29, a detailed description of the same process as that described with reference to FIG. 27 is omitted.

Figure 30:
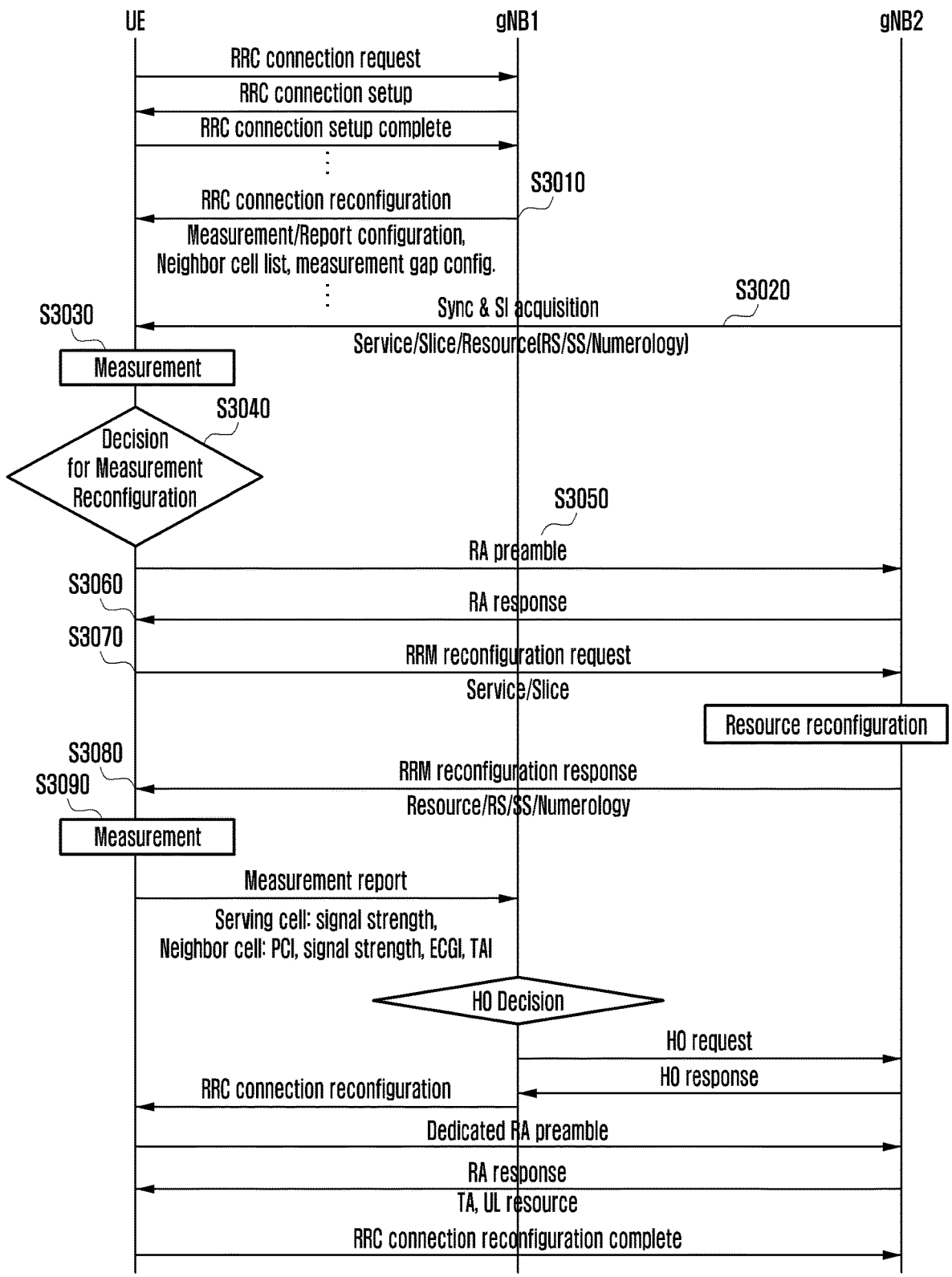
FIG. 30 is a diagram illustrating another example of terminal control RRM measurement reconfiguration according to an embodiment of the present disclosure.

FIG. 30 is a diagram illustrating another example of the terminal control RRM measurement reconfiguration in accordance with an embodiment of the disclosure.

Referring to FIG. 30 is a procedure in which the terminal directly accesses the target base station gNB2 to update the RRM resource through the exchange of the RRM reconfiguration request/response message (S3070, S3080), thereby performing the accurate measurement (S3090). For this purpose, if it is determined in operation S3040 that the measurement reconfiguration is required, the terminal transmits a random-access preamble to the target base station in operation S3050 and receives a random-access response to acquire an uplink resource in operation S3060. Accordingly, the terminal directly exchanges a message with the target BS using the resource to update the RRM resource. In addition, among the processes included in FIG. 30, a detailed description of the same process as that described with reference to FIGS. 29 and 30 is omitted (e.g. S3010, 53020 and S3030).

On the other hand, when accessing a specific base station based on the common RS, the terminal requests service/slice availability information and can identify whether the target base station provides the required service/slice. The common RS may correspond to a cell-specific RS.

The terminal may acquire 1) service (slice)-numerology mapping information or 2) information by base station of slice availability, from the network. The service (slice)-numerology mapping information is obtained by the terminal when the information by base station of the slice availability receives the base station list (white/black list) through the serving cell if the target cell provides only numerology information. If one cell does not support a service that the terminal wants, the filtering can be performed through the white/black list. If one cell uses only some resources to provide the service that the terminal wants, the terminal measures the resources of the target cell measurable within the operating condition of the RF/PHY/MAC according to the control in the serving cell. If the measurement is possible, the measurement report is transmitted, and if the measurement is impossible or the best performance of the cell falls below the predetermined value, the RRM resource reconfiguration request is transmitted.

The following examples illustrate the advantages of the above procedure.

Example 1) When the terminal measures a channel state for a base station (cell 1) supporting both the eMBB and the URLLC and a cell (cell 2) supporting only the URLLC, the terminal should select the measurement result for the numerology-specific RS configured for what service to determine whether to review the triggering condition.

For example, if the URLLC priority is high, the terminal may first review the triggering condition for the cell2, and if satisfied, report the measurement result. In this case, the measurement result on the eMBB of the cell 1 is not reported to the serving base station, and therefore in terms of the service aspect, access barred or RLF processing to the cell 1 may be made. Even if the URLLC priority is high, if the terminal does not satisfy the triggering condition for the RS corresponding to the URLLC configured for the cell2, the triggering condition associated with the numerology-specific RS corresponding to the next priority eMBB is examined.

Example 2) If the numerology is not divided as the measurement result of the URLLC terminal for the base station (cell1) supporting both the eMBB and the URLLC and the base station (cell2) supporting only URLLC, the measurement result for the cell 1 may be more excellent but if the numerology is divided, the measurement result for the cell 2 is even more excellent.

Example 3) In one base station, the frequency resource is divided into TRP1 and TRP2, but a common resource is shared by TRPs. In this case, a specific service may be serviced only by a specific frequency resource. Even in the case of the measurement performance for one base station, the performance for the TRP may also be divided only when the report should be made by being divided by RS/numerology.

The base station may provide a performance index for a serviceable carrier/numerology-specific cell quality. The terminal may report the measurement result without performing additional measurement if there is the measurement result in accordance with the performance proposed by the base station. This method has the effect of preventing a long delay due to UE beam sweeping, especially in the beamforming system.

Figure 31:
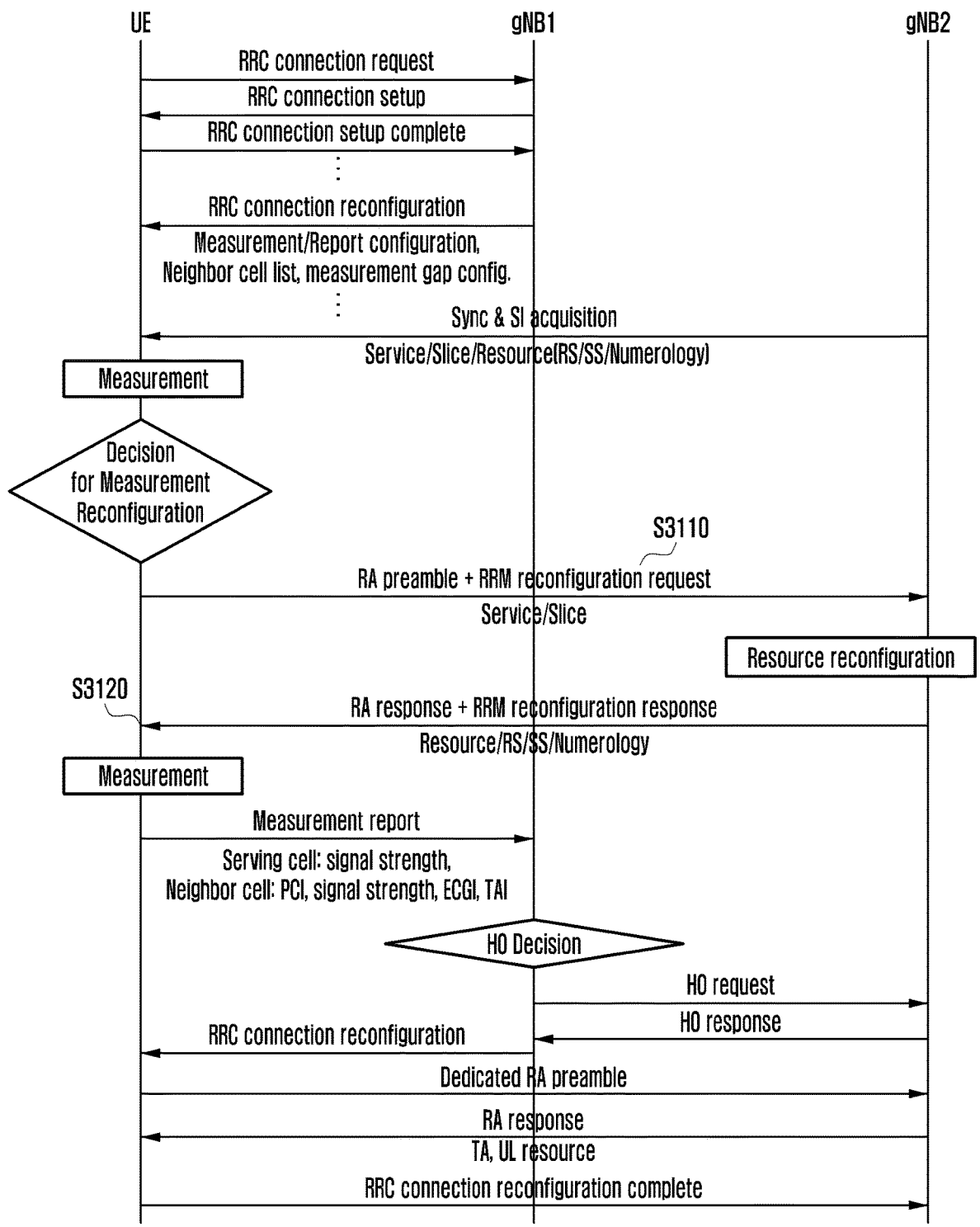
FIG. 31 is a diagram illustrating still another example of terminal control RRM measurement reconfiguration according to an embodiment of the present disclosure.

FIG. 31 is a diagram illustrating another example of the terminal control RRM measurement reconfiguration in accordance with an embodiment of the disclosure.

Referring to FIG. 31 illustrates a procedure using a 2-way RA procedure in place of a 4-way RA procedure in comparison with FIG. 30.

That is, referring to FIG. 31, the terminal may simultaneously transmit the random access preamble and the RRM reconfiguration request message to the target base station in operation S3110, and simultaneously receive the random access response and the RRM reconfiguration response message in operation S3120. Other procedures are the same as those in FIG. 30, and therefore a description thereof will not be described below.

Figure 32:
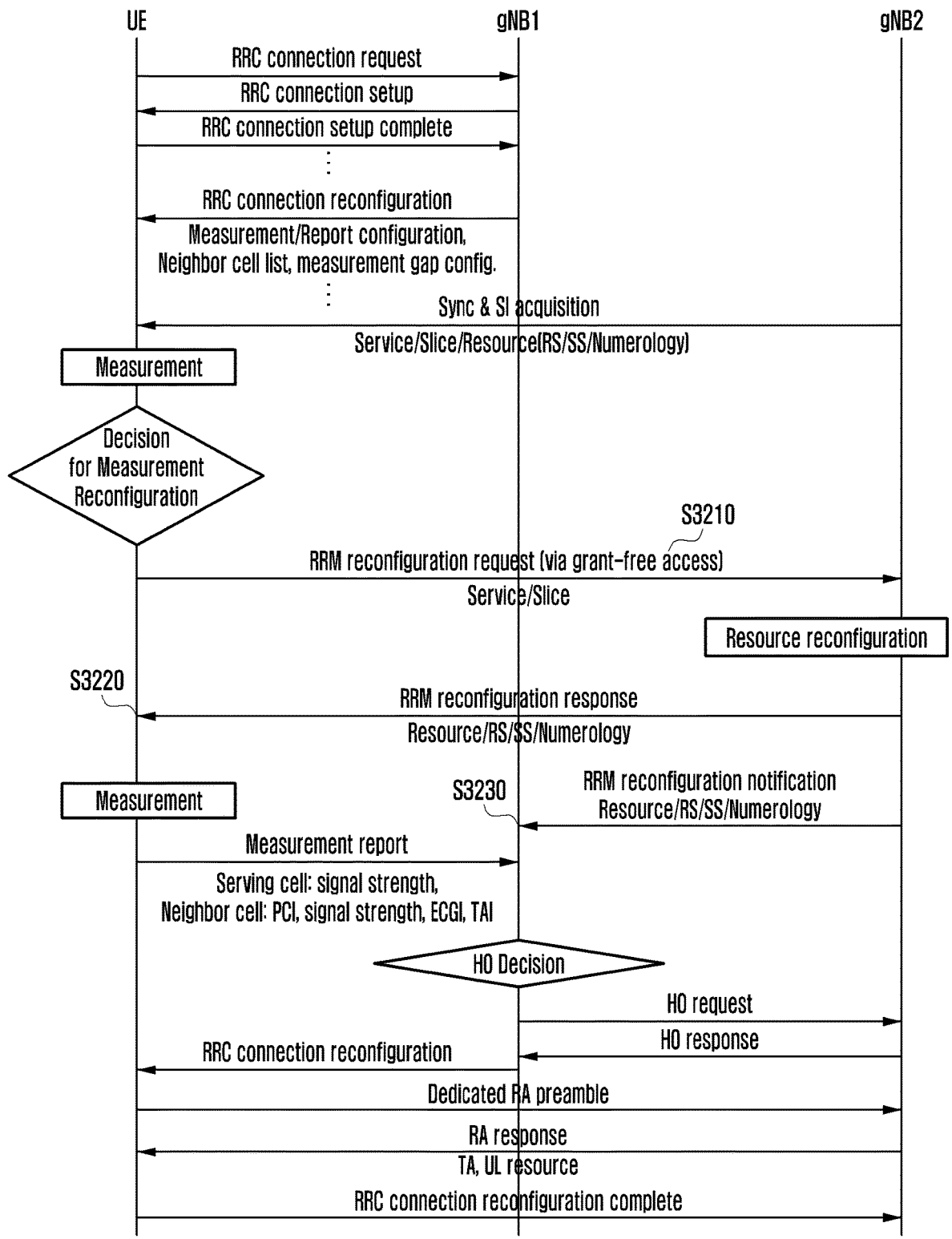
FIG. 32 is a diagram illustrating still yet another example of terminal control RRM measurement reconfiguration according to an embodiment of the present disclosure.

FIG. 32 is a diagram illustrating another example of the terminal control RRM measurement reconfiguration in accordance with an embodiment of the disclosure.

Referring to FIG. 32 illustrates a procedure using grant-free access, unlike FIGS. 30 and 31 using the RA procedure.

That is, if the terminal determines that the measurement reconfiguration is required, the RRM reconfiguration request message may be transmitted to the target base station using the grant free access in operation S3210, and the response message thereto may be received in operation S3220.

Further, in operation S3230, the target base station may transmit the RRM reconfiguration message to the serving base station. Other procedures are the same as those in FIG. 30, and therefore a description thereof will not be described below.

According to an embodiment, the terminal may simultaneously measure a signal received through common RRM resources (common RS, SS, or default numerology-specific RS) of at least two base stations. If the terminal satisfies at least one TC of the triggering conditions for the at least two base stations, the terminal reports a measurement report for the measured common RRM resource. Based on the measurement report of the terminal, the base station may configure additional RRM resources (dedicated RS, CSI-RS or dedicated numerology-specific RS) in the terminal according to one of several HO procedures.

According to an embodiment, the terminal may simultaneously measure a signal received through common RRM resources (common RS, SS, or default numerology-specific RS) of at least two base stations. If the terminal satisfies at least one TC of the triggering conditions for the at least two base stations, the terminal may request the additional RRM resources (dedicated RS, CSI-RS or dedicated numerology-specific RS) for the target base station satisfying the TC to the serving base station or the target base station.

Measurement Restriction Procedure

In the LTE, a time-domain measurement resource restriction was introduced to eliminate measurement errors that may generate when measuring an almost blank subframe for PCell. The ABS is a subframe in which the base station may lower transmit power or transmit only a control channel. The base station using the ABS notifies the connected terminal of the ABS as a bitmap in units of subframes and controls the terminal not to perform the RRM or the RLM measurement in the subframe corresponding to the ABS.

Figure 33:
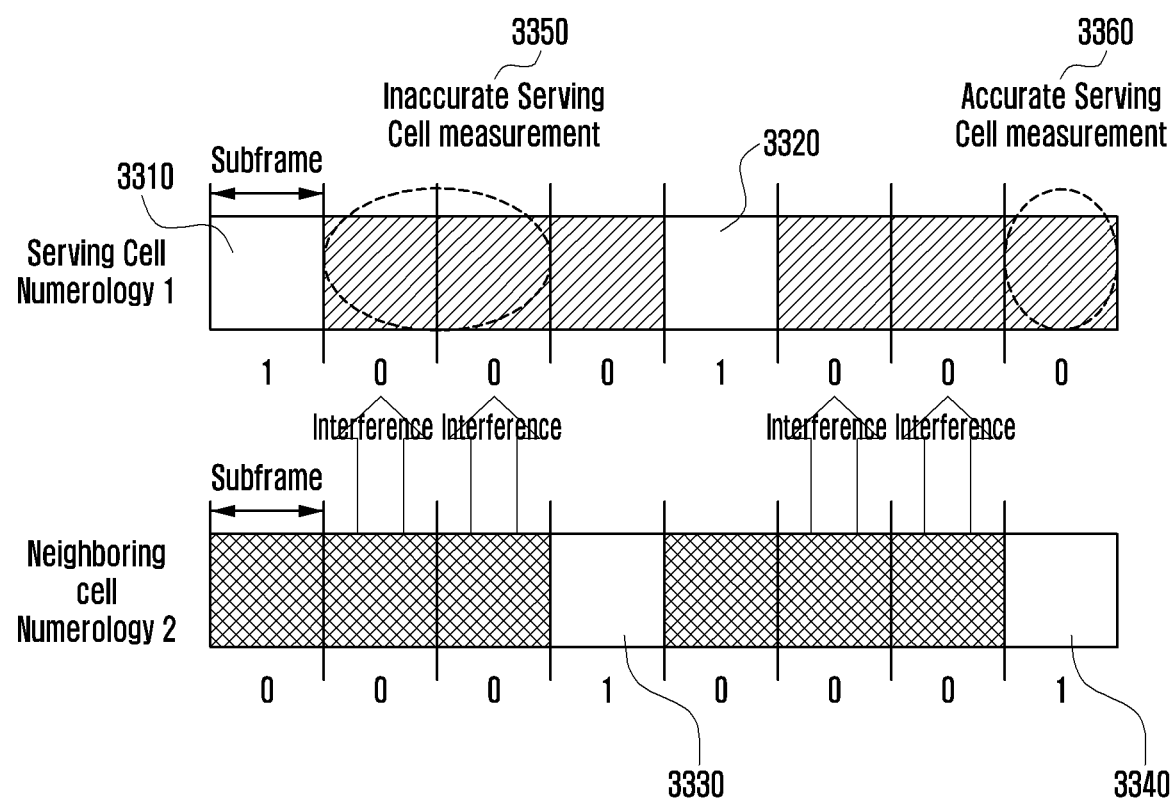
FIG. 33 is a diagram illustrating a measurement method in which almost blank subframes (ABS) indication of a serving base station is applied according to an embodiment of the present disclosure.

FIG. 33 is a diagram illustrating a measurement method in which almost blank subframes (ABS) indication of a serving base station is applied according to an embodiment of the present disclosure.

On the other hand, assuming the case in which the measurement resource restriction based on an ABS indication is applied to 5G communication in which numerology may be dynamically configured, as illustrated in FIG. 33, even if the serving base station sets ABS 3310 and 3320 in the terminal, the terminal may not clearly identify the interference from the neighbor base station because the numerology is different. Accordingly, the terminal measures the interference of the serving base station signal in an on/off type. This variation of the interference signal which may not be identified makes it difficult to accurately measure the serving base station channel quality. Therefore, if the neighbor indication information 3330 or 3340 of the neighbor base station is indicated to the terminal, the terminal may identify the case (3350) in which there is interference with the neighbor base station 3350 and the case (3360) in which there is no interference with the neighbor base station and apply it to the triggering condition, such that it may separate and report the measurement result.

Meanwhile, in a mixed scenario in which a plurality of numerologies are used in the neighbor base station in 5G communication, the terminal may acquire not only RSRP but also RSRQ in a subframe in which the serving base station and the neighbor base station use the same numerology, but can only the RSRP in a subframe in which different numerologies are used.

Figure 34:
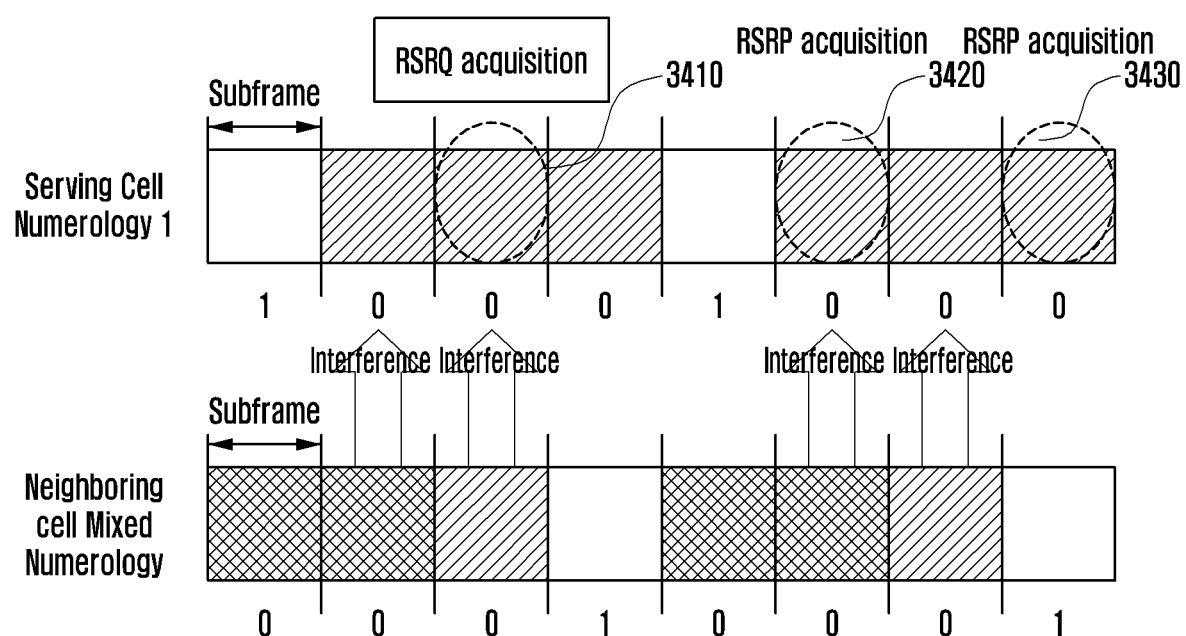
FIG. 34 is a diagram illustrating a measurement method in which ABS indication of a serving base station and a neighbor base station is applied according to an embodiment of the present disclosure.

FIG. 34 is a diagram illustrating a measurement method in which ABS indication of a serving base station and a neighbor base station is applied according to an embodiment of the present disclosure.

Referring to FIG. 34, only the RSRP can be acquired in the subframes 3420 and 3430 using different numerologies, and the RSRQ can be acquired in the subframe 3410 using the same numerology. There is an MBSFN subframe having another RS/channel structure for broadcasting in the LTE, and the serving base station may inform the terminal of MBSFN subframe information of the neighbor base station. The terminal does not measure the measurement resources in the MBSFN subframe of the neighbor base station. However, it is difficult to support the terminal to appropriately measure the RSRP and the RSRQ with only the information informing only on/off of the measurement on the resource in units of subframe.

Figure 35:
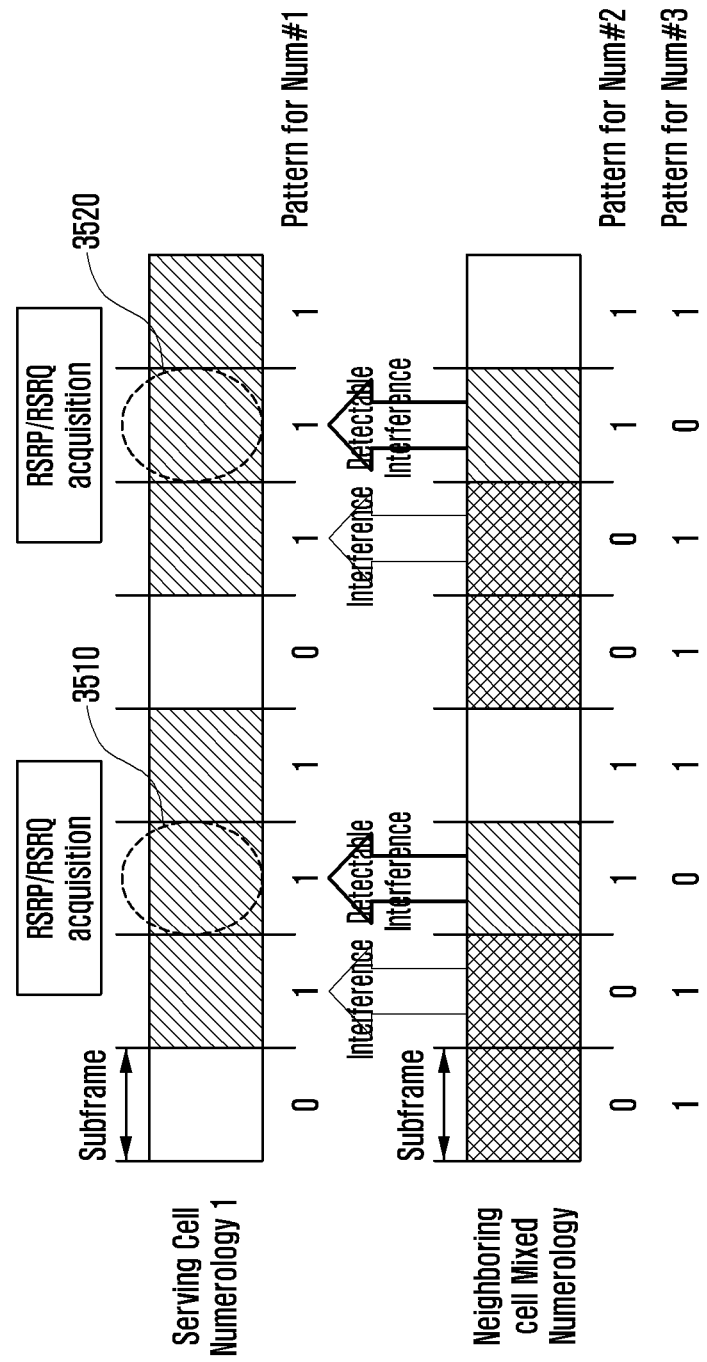
FIG. 35 is a diagram illustrating a measurement method in which a numerology pattern of a serving base station and a neighbor base station is applied according to an embodiment of the present disclosure.

FIG. 35 is a diagram illustrating a measurement method in which a numerology pattern of a serving base station and a neighbor base station is applied according to an embodiment of the present disclosure.

Referring to FIG. 35, if the subframe configuration by numerology of the serving base station and the neighbor base station is informed to the terminal by the bitmap, the terminal is configured to measure the RSRQ of the serving base station, the report may be made based on the RSRQ measured when the subframe using the numerology 1 of the serving base station and the subframe using the numerology 1 of the neighbor base station are the same (3510, 3520).

The operations illustrated in FIGS. 33 to 35 may be similarly applied to the case of measuring and reporting the channel quality of the neighbor base station as well as the serving base station. According to an embodiment, the ABS or the subframe pattern by the numerology may be configured in the separately set time/frequency measurement resource unit, not the subframe unit.

The resource pattern for the measurement restriction may be configured by time/frequency resource and/or by numerology. The serving base station may configure a resource pattern for at least one measurement restriction in the terminal. The base station may configure the resource pattern for the measurement restriction in the terminal by associating the resource pattern with the measurement object or the sub-object of the measurement framework or may configure the resource pattern by associating the resource pattern with a separate RRM resource configuration or RS configuration not with the measurement framework.

The terminal identifies numerology or RS type information or RS resource or BW part information of at least one resource pattern for the measurement restriction and identifies resources not used for the measurement based on the resource pattern meeting the numerology or the RS type or the RS resource or the BW part information which is currently used for the RRM measurement to perform the RRM measurement operation. According to an embodiment, an index of the measurement restriction resource pattern or an index for the configuration including the resource pattern is given to the terminal, and when the terminal performs the measurement report, the terminal may report the index for the resource pattern or the index for the configuration including the resource pattern together.

According to an embodiment, the base station may dynamically configure the index of the measurement restriction resource pattern in the terminal by the MAC CE or the DCI.

According to an embodiment, one measurement restriction configuration includes the resource pattern (meaSubframePatternNeigh), a base station list (meaSubframeCellList) to which this pattern is applied, and a BW part index to which this pattern is applied. In this case, the BWP ID may be replaced with an RS format or a CSI-RS configuration index, or a numerology index.

Figure 36:
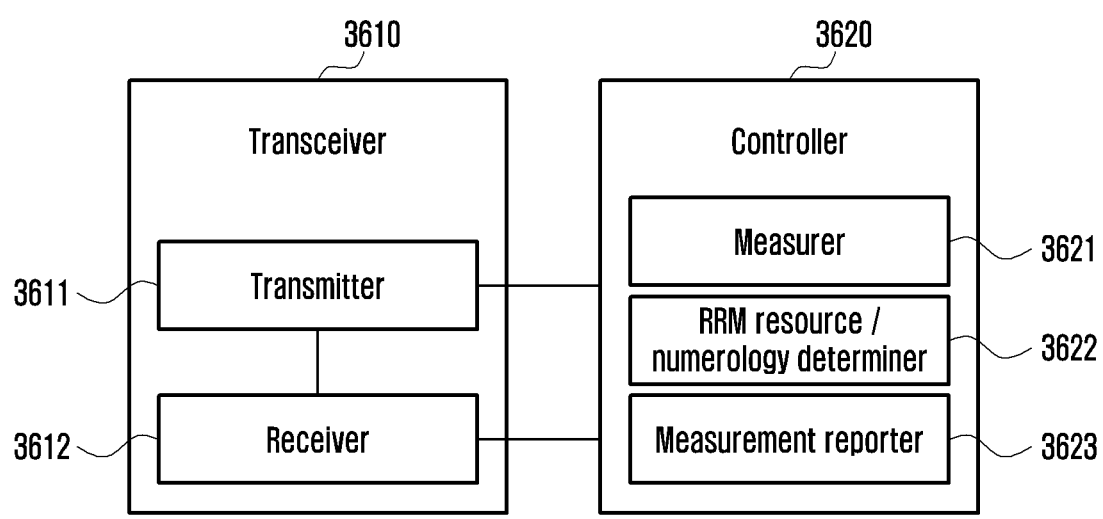
FIG. 36 is a diagram illustrating a configuration of the terminal according to an embodiment of the present disclosure.

FIG. 36 is a diagram illustrating a configuration of a terminal device according to an embodiment of the present disclosure.

Referring to FIG. 36, the terminal may include a transceiver 3610 and a controller 3620 (e.g., at least one processor). In the present disclosure, the controller may be defined as a circuit, an application specific integrated circuit, or at least one processor.

The transceiver 3610 may transmit/receive a signal to/from another network entity using a transmitter 3611 and a receiver 3612.

The controller 3620 may control the overall operation of the terminal according to the embodiment of the present disclosure. For example, the controller 3620 may control a signal flow between each block to perform the operation according to the above-described drawings. At this time, the controller 3620 may control the operation of the terminal proposed by the present disclosure by controlling a measurer 3621, an RRM resource/numerology determiner 3622, and a measurement reporter 3623.

Fourth Embodiment

Hereinafter, a method for determining whether to measure signal strength for a neighboring cell according to signal strength for a serving cell is proposed.

In the LTE, if an idle mode terminal measures the cell-specific reference signal (CRS) and then the following condition is satisfied, then it does not perform the signal strength measurement for neighboring cells operating at the same frequency as the serving cell.

Following rules are used by the UE to limit needed measurements:
  If the serving cell fulfils Srxlev > SIntraSearchP and Squal > SIntraSearchQ, the UE may choose not to perform intra-frequency measurements.
  Otherwise, the UE shall perform intra-frequency measurements.

Here, Srxlev and Squal are defined as follows, and SIntraSearchP and SIntraSearchQ are parameters that the base station notifies to the terminal.

Srxlev=Qrxlevmeas−(Qrxlevmin+Qrxlevminoffset)−Pcompensation−Qoffsettemp

Squal=Qqualmeas−(Qqualmin+Qqualminoffset)−Qoffsettemp

This is based on the following parameters.

| | |
|---|---|
| Srxlev | Cell selection RX level value (dB) |
| Squal | Cell selection quality value (dB) |
| Qoffset$_{temp}$ | Offset temporarily applied to a cell as specified in [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm) |
| Q$_{qualmin}$ | Minimum required quality level in the cell (dB) |
| Q$_{rxlevminoffset}$ | Offset to the signalled Q$_{rxlevmin}$ taken into account in the Srxlev evaluation as a result of a periodic search for a higher priority PLMN while camped normally in a VPLMN [5] |
| Q$_{qualminoffset}$ | Offset to the signalled Q$_{qualmin}$ taken into account in the Squal evaluation as a result of a periodic search for a higher priority PLMN while camped normally in a VPLMN [5] |
| Pcompensation | If the UE supports the additionalPmax in the NS-PmaxList, if present, in SIB1, SIB3 and SIB5:<br>max($P_{EMAX1}$ − $P_{PowerClass}$, 0) − (min($P_{EMAX2}$, $P_{PowerClass}$) − min($P_{EMAX1}$, $P_{PowerClass}$)) (dB):<br>else:<br>max($P_{EMAX1}$ − $P_{PowerClass}$, 0) (dB): |
| $P_{EMAX1}$, $P_{EMAX2}$ | Maximum TX power level an UE may use when transmitting on the uplink in the cell (dBm) defined as $P_{EMAX}$ in [TS 36.101]. $P_{EMAX1}$ and $P_{EMAX2}$ are obtained from the p-Max and the NS-PmaxList respectively in SIB1, SIB3 and SIB5 as specified in TS 36.331 [3]. |
| $P_{PowerClass}$ | Maximum RF output power of the UE (dBm) according to the UE power class as defined in [TS 36.101] |

In addition, in the LTE, when the connected mode terminal measures the signal strength for the CRS received through the primary cell (PCell) and then does not perform signal strength measurement for intra-frequency, inter-frequency, inter-RAT neighboring cell if the measurement result is larger than s-Measure that is a parameter that the base station notifies. For this purpose, the base station notifies the terminal of the s-Measure value through the measurement configuration message.

As described above, in the LTE, if the idle mode and connected mode terminals measures the CRS transmitted from the base station or the serving base station which is camping and then it is determined that the signal strength satisfies a specific condition, that is, the signal strength for the base station or the serving base station which is camping is sufficiently high, the signal strength measurement for the neighbor base station is not performed. The purpose of the operation is power saving of the terminal. If the terminal is close to the serving base station, the possibility of moving to the neighbor base station within a short time is low. In this case, it may be unnecessary to measure signal strength for base stations around the terminal. Accordingly, the serving base station provides a specific condition such as a threshold value of the signal strength to the terminal and thus is operated not to perform the signal strength measurement for the neighbor base station if the possibility that the mobility of the terminal occurs is low. Of course, even if these conditions are satisfied, the terminal is allowed to measure the signal strength for the neighbor base station in a practical manner.

In the LTE, both the idle mode terminal and the connected mode terminal may determine whether the signal strength measurement for the neighboring cell is performed based on the CRS measurement result. However, in new radio (NR) that is currently being discussed, an NR synchronization signal (NR-SS) and the CSI-RS were introduced instead of CRS in new radio (NR).

Figure 39:
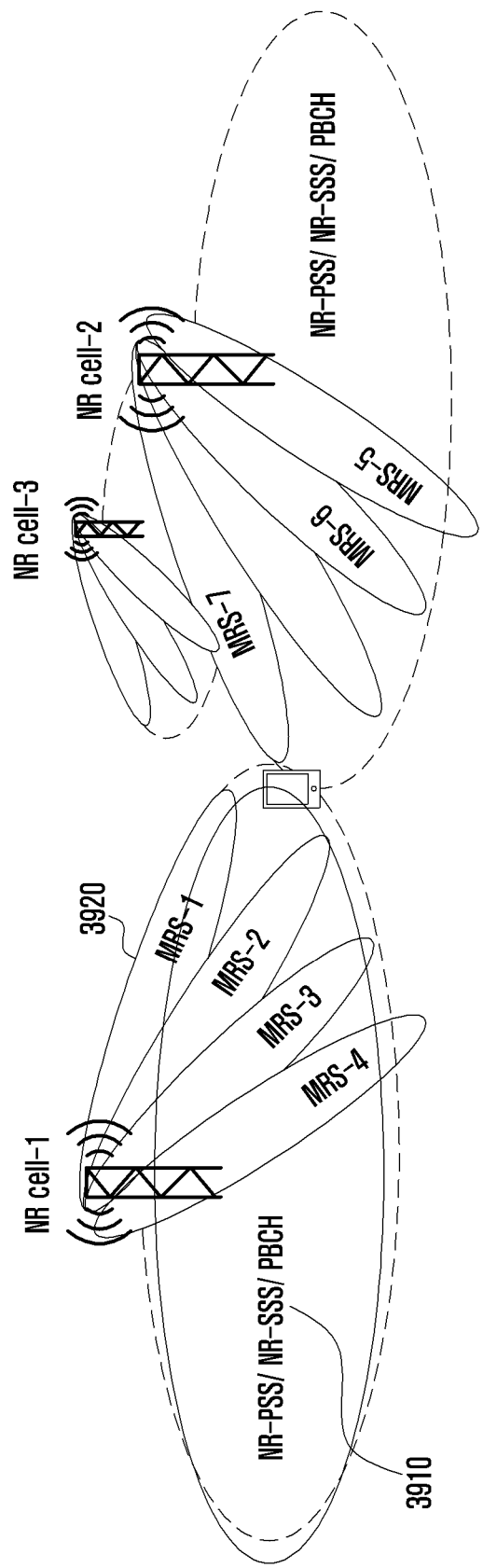
FIG. 39 is a diagram illustrating an example in which the base station transmits an NR synchronization signal (NR-SS) and a channel state information reference signal (CSI-RS) according to an embodiment of the present disclosure.

FIG. 39 is a diagram illustrating an example in which the base station transmits the NR-SS and the CSI-RS.

Here, an NR-PSS/NR-SSS 3910 correspond to the NR-SS and a mobility RS (MRS) 3920 corresponds to the CSI-RS.

The NR-SS may be transmitted through a wide beam compared to the CSI-RS. Therefore, it is advantageous to perform beam sweeping for a short time in transmitting a signal to the entire cell region. However, the transmission through the wide beam means that the beamforming gain is reduced as much. Therefore, the terminal is highly likely to receive the NR-SS with signal strength lower than that of the CSI-RS.

On the other hand, the CSI-RS may be transmitted through a narrow beam compared to the NR-SS. Therefore, it is disadvantageous to perform the beam sweeping for a long time in transmitting a signal to the entire cell region. However, the transmission through the narrow beam means that the beamforming gain is reduced as much. Therefore, the terminal is highly likely to receive the CSI-RS with signal strength higher than that of the NR-SS.

According to the current NR design, the idle mode terminal may receive the NR-SS, whereas the idle mode terminal may not receive the CSI-RS. In order to receive the CSI-RS, the terminal should establish a connection with a specific base station and then receive the CSI-RS related configuration from the base station, However, the idle mode terminal may not perform this operation.

Unlike this, the connection mode terminal may receive both the NR-SS and the CSI-RS. In such a situation, it is problematic how the terminal may determine whether or not to perform the signal strength measurement for the neighbor base station.

Since the idle mode terminal may receive only the NR-SS, the signal strength for the NR-SS transmitted by the base station that is currently camping may be measured, and thus if the idle mode terminal satisfies the condition similar to the LTE, the signal strength measurement for the neighboring cell is not performed. That is, Qrxlevmeas and Qqualmeas in the following Equations may be a result value obtained by allowing the terminal to measure the NR-SS. Therefore, in the case of the idle mode terminal, the type of the RS measured by the terminal in NR compared to the LTE is changed from the CRS to the NR-SS.

$$Srxlev = Qrxlevmeas - (Qrxlevmin + Qrxlevminoffset) - Pcompensation - Qoffsettemp$$

$$Squat = Qqualmeas - (Qqualmin + Qqualminoffset) - Qoffsettemp$$

Next, the connection mode terminal may receive both the NR-SS and the CSI-RS. Therefore, when the signal strength for the NR-SS transmitted from the PCell of the serving cell is equal to or higher than the s-Measure, the signal strength measurement for the neighbor base station is not performed, and when the signal strength for the CSI-RS transmitted from the PCell of the serving base station is equal to or higher than the s-Measure, the signal strength measurement for the neighbor base station is not performed.

However, the NR-SS and the CSI-RS may also be transmitted through a beam having different beamforming gains. Therefore, even when the locations of the base station and the terminal are fixed, that is, even when the distance between the base station and the terminal is defined as one value, the signal strength for the NR-SS measured by the terminal and the signal strength for the CSI-RS measured by the terminal may be different.

Therefore, the s-Measure, which is the threshold value of the signal strength for the serving cell for determining whether the terminal measures the signal strength for the neighbor base station, should be applied as different values depending on whether the terminal measures the NR-SS or the CSI. That is, s-MeasureNR-SS and s-MeasureCSI-RS have to be defined separately.

Therefore, the base station should provide the following information to the terminal through a measurement configuration information element. The changed portion is underlined for emphasis.

- MeasConfig

The IE MeasConfig specifies measurements to be performed by the UE, and covers intra-frequency, inter-frequency and inter-RAT mobility as well as configuration of measurement gaps.

MeasConfig information element

```
-- ASN1START
MeasConfig ::=                      SEQUENCE {
    -- Measurement objects
    measObjectToRemoveList              MeasObjectToRemoveList          OPTIONAL, --
Need ON
    measObjectToAddModList              MeasObjectToAddModList          OPTIONAL, --
Need ON
    -- Reporting configurations
    reportConfigToRemoveList            ReportConfigToRemoveList        OPTIONAL, --
Need ON
    reportConfigToAddModList            ReportConfigToAddModList        OPTIONAL, --
Need ON
    -- Measurement identities
    measIdToRemoveList                  MeasIdToRemoveList              OPTIONAL, --
Need ON
    measIdToAddModList                  MeasIdToAddModList              OPTIONAL, --
Need ON
    -- Other parameters
    quantityConfig                      QuantityConfig                  OPTIONAL, --
Need ON
    measGapConfig                       MeasGapConfig                   OPTIONAL, --
Need ON
    s-Measure-NR-SS                     RSRP-Range                      OPTIONAL, -
- Need ON
    s-Measure-CSI-RS                    RSRP-Range                      OPTIONAL, --
Need ON
    preRegistrationInfoHRPD             PreRegistrationInfoHRPD         OPTIONAL, --
Need OP
    speedStatePars              CHOICE {
        release                             NULL,
        setup                               SEQUENCE {
            mobilityStateParameters             MobilityStateParameters,
            timeToTrigger-SF                    SpeedStateScaleFactors
        }
    }                                                                   OPTIONAL, --
```

```
Need ON
    ...,
    [[ measObjectToAddModList-v9e0           MeasObjectToAddModList-v9e0
        OPTIONAL -- Need ON
    ]],
    [[ allowInterruptions-r11                BOOLEAN                          OPTIONAL -
- Need ON
    ]],
    [[ measScaleFactor-r12                   CHOICE {
        release                                  NULL,
        setup                                    MeasScaleFactor-r12
        }                                                                     OPTIONAL, -- Need
ON
        measIdToRemoveListExt-r12            MeasIdToRemoveListExt-r12        OPTIONAL, --
Need ON
        measIdToAddModListExt-r12            MeasIdToAddModListExt-r12        OPTIONAL, --
Need ON
        measRSRQ-OnAllSymbols-r12            BOOLEAN                          OPTIONAL --
Need ON
    ]],
    [[
        measObjectToRemoveListExt-r13        MeasObjectToRemoveListExt-r13    OPTIONAL, --
Need ON
        measObjectToAddModListExt-r13        MeasObjectToAddModListExt-r13    OPTIONAL, --
Need ON
        measIdToAddModList-v1310             MeasIdToAddModList-v1310         OPTIONAL, --
Need ON
        measIdToAddModListExt-v1310          MeasIdToAddModListExt-v1310
        OPTIONAL   -- Need ON
    ]]
}
MeasIdToRemoveList ::=                       SEQUENCE (SIZE (1..maxMeasId)) OF MeasId
MeasIdToRemoveListExt-r12 ::=                SEQUENCE (SIZE (1..maxMeasId)) OF MeasId-v1250
MeasObjectToRemoveList ::=                   SEQUENCE (SIZE (1..maxObjectId)) OF MeasObjectId
MeasObjectToRemoveListExt-r13 ::=            SEQUENCE (SIZE (1..maxObjectId)) OF MeasObjectId-v1310
ReportConfigToRemoveList ::=                 SEQUENCE (SIZE (1..maxReportConfigId)) OF ReportConfigId
-- ASN1STOP
s-Measure-NR-SS
PCell quality threshold, which is used when the UE measures the NR-SS transmitted from the PCell,
controlling whether or not the UE is required to perform measurements of intra-frequency, inter-
frequency and inter-RAT neighbouring cells. Value "0" indicates to disable s-Measure.
s-Measure-CSI-RS
PCell quality threshold, which is used when the UE measures the CSI-RS transmitted from the PCell,c
ontrolling whether or not the UE is required to perform measurements of intra-frequency, inter-fr
equency and inter-RAT neighbouring cells. Value "0" indicates to disable s-Measure.
```

Figure 40:
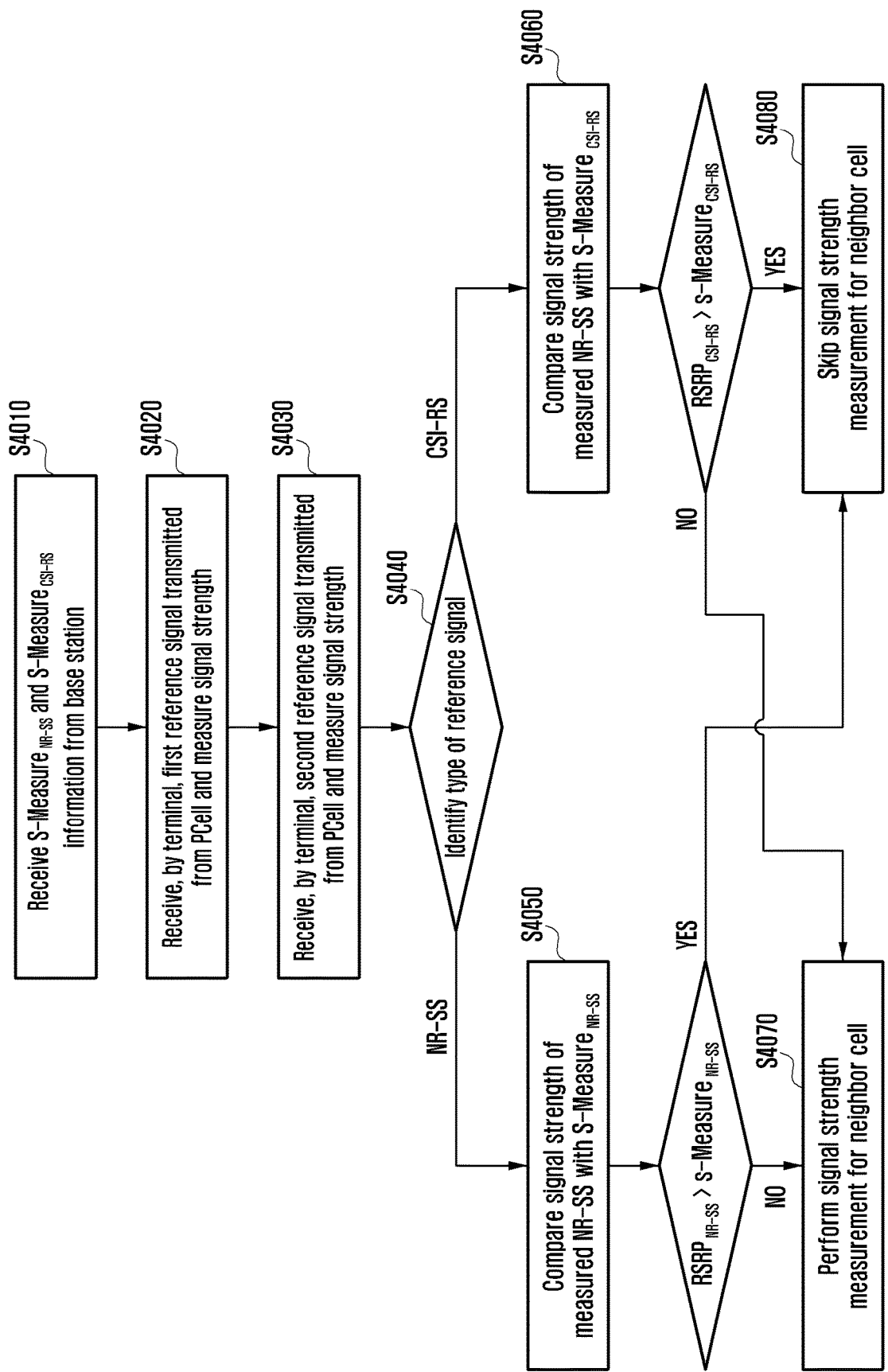
FIG. 40 is a diagram illustrating a method in which the terminal performs measurement of a signal strength of a neighbor cell when the base station operates both of an NR-SS and a CSI-RS according to an embodiment of the present disclosure.

After the terminal receives the above information, i.e., the s-MeasureNR-SS and the s-MeasureCSI-RS from the base station, the terminal is operated as illustrated in FIG. 40.

FIG. 40 is a diagram illustrating a method in which the terminal performs signal strength measurement on the neighboring cell when the base station is operating both the NR-SS and the CSI-RS according to an embodiment of the present disclosure.

The terminal receives the NR-SS related threshold value (s-MeasureNR-SS) and the CSI-RS related threshold value (s-MeasureCSI-RS) from the base station in operation S4010. In operation S4020 and operation S4030, the terminal receives the reference signal and measures the signal strength. In this case, the reference signals received in operations S4020 and S4030 may be the NR-SS and the CSI-RS. Accordingly, the terminal identifies the type of the reference signal in operation S4040.

If the reference signal is NR-SS, the terminal compares the signal strength measured for NR-SS with the threshold value for NR-SS in operation S4050. Also, if the reference signal is the CSI-RS, the terminal compares the measured signal strength for the CSI-RS and the threshold value for the CSI-RS in operation S4060. The terminal may measure both the reference signals or measure only one reference signal.

If the measured signal strength for the NR-SS is less than or equal to the threshold value for the NR-SS, the terminal measures the signal strength for the neighboring cell in operation S4060. Alternatively, if the measured signal strength for the CSI-RS is less than or equal to the threshold value for the CSI-RS, the terminal measures the signal strength for the neighboring cell in operation S4060.

If the measured signal strength for the NR-SS is larger than the threshold value for the NR-SS, the terminal skips the signal strength measurement for the neighboring cell in operation S4070. Alternatively, if the measured signal strength for the CSI-RS is larger than the threshold value for the CSI-RS, the terminal skips the signal strength measurement for the neighboring cell in operation S4080.

As another example, the following cases may occur depending on the NR-SS and CSI-RS measurement results of the terminal. In each case, the terminal is operated as follows.

Case 1) RSRPNR-SS>s-MeasureNR-SS& RSRPCSI-RS>s-MeasureCSI-RS

In this case, since the signal strength for the NR-SS and the CSI-RS are both larger than the s-Measure, the operation of the applicable terminal does not measure both the NR-SS and the CSI-RS transmitted from the neighbor base station.

In this case, the operation of another terminal that can be applied is to continuously measure the NR-SS transmitted from the neighbor base station in spite of the situation of Case 1 in order to continuously maintain synchronization with the serving base station.

Case 2) RSRPNR-SS>s-MeasureNR-SS& RSRPCSI-RS<s-MeasureCSI-RS

In this case, since the signal strength for the CSI-RS is smaller than the s-Measure, the operation of the applicable terminal is to measure both the NR-SS and the CSI-RS transmitted from the neighbor base station.

In this case, since the signal strength for the CSI-RS is smaller than the s-Measure, the operation of another terminal that can be applied is to measure only the CSI-RS transmitted from the neighbor base station.

In this case, since the signal strength for the NR-SS is larger than the s-Measure, the operation of the terminal that can be applied does not measure both the NR-SS and the CSI-RS transmitted from the neighbor base station.

Case 3) RSRPNR-SS<s-MeasureNR-SS& RSRPCSI-RS>s-MeasureCSI-RS

In this case, since the signal strength for the NR-SS is smaller than the s-Measure, the operation of the applicable terminal is to measure both the NR-SS and the CSI-RS transmitted from the neighbor base station.

In this case, since the signal strength for the NR-SS is smaller than the s-Measure, the operation of another terminal that can be applied is to measure only the NR-SS transmitted from the neighbor base station.

In this case, since the signal strength for the CSI-RS is larger than the s-Measure, the operation of the terminal that can be applied does not measure both the NR-SS and the CSI-RS transmitted from the neighboring base station.

Case 4) RSRPNR-SS<s-MeasureNR-SS& RSRPCSI-RS<s-MeasureCSI-RS

In this case, since the signal strength for the NR-SS and the CSI-RS are both smaller than the s-Measure, the operation of the applicable terminal does not measure both the NR-SS and the CSI-RS transmitted from the neighboring base station.

Next, it is assumed that the terminal is handed over from the LTE base station to the NR base station. The most significant difference between the LTE and the NR in deriving the cell quality is that the reference signal for deriving the cell quality, i.e., the CRS, is transmitted as a single beam in the LTE, whereas the reference signal for deriving the cell quality in the NR, i.e., the NR-SS or the CSI-RS may be transmitted in a single beam or in a plurality of beams.

If the NR base station transmits the NR-SS or the CSI-RS using a single beam, the terminal receives the NR-SS or the CSI-RS transmitted in a single beam, and then measures the received signal strength therefor, which is determined to be the cell quality of the NR base station.

If the NR base station transmits the NR-SS or the CSI-RS using a plurality of beams, the terminal first receives the NR-SS or the CSI-RS transmitted in each beam and then measures the received signal strength therefor. Next, one or N beams are selected in the order of highest measured received signal strength. The cell quality of the NR base station is determined by the average value of the received signal strength for the NR-SS or the CSI-RS transmitted in the selected beam.

In deriving the cell quality of the NR base station in which the terminal operates the plurality of beams, the LTE base station or the NR base station needs to inform the terminal how many beams should be selected to derive the cell quality of the NR base station. To this end, the following methods may be used.

(1) The LTE or NR base station instructs the terminal to derive the cell quality of the NR base station considering one beam.

For this purpose, the LTE base station or the NR base station provides the terminal with the fact that the number of beams for deriving the cell quality of the NR base station is 1.

(2) The LTE or NR base station instructs the terminal to derive the cell quality of the NR base station considering N beams. Here, N is greater than 1.

For this purpose, the LTE base station or the NR base station provides the terminal with the fact that the number of beams for deriving the cell quality of the NR base station is N.

(3) The LTE or NR base station instructs the terminal to derive the cell quality of the NR base station considering a maximum of N beams. Here, N is greater than 1.

For this purpose, the LTE base station or the NR base station provides the terminal with the fact that the number of beams for deriving the cell quality of the NR base station is a maximum of N.

(4) The LTE or NR base station instructs the terminal to derive the cell quality of the NR base station considering the beam whose received signal strength for NR-SS or CSI-RS is equal to or more than the threshold value.

For this purpose, the LTE base station or the NR base station provides the terminal with the threshold value of the received signal strength of the beam for deriving the cell quality of the NR base station.

(5) The LTE or NR base station instructs the terminal to derive the cell quality of the NR base station considering the number of beams whose received signal strength for NR-SS or CSI-RS is equal to or more than the threshold value up to N beams. Here, N may be equal to or larger than 1.

For this purpose, the LTE base station or the NR base station provides the terminal with the threshold value of the received signal strength of the beam for deriving the cell quality of the NR base station and the fact that the maximum value of the number of beams considered is N.

(6) The LTE or NR base station instructs the terminal to derive the cell quality of the NR base station considering the beam whose received signal strength for NR-SS or CSI-RS is in an offset value compared to the maximum measurement value.

For this purpose, the LTE base station or the NR base station provides the terminal with the offset value used to derive the cell quality of the NR base station.

In addition, the LTE base station or the NR base station provides the terminal with the threshold value of the received signal strength and the maximum value of the number of beams to be considered is N.

(7) The LTE or NR base station instructs the terminal to derive the cell quality of the NR base station considering the beam whose received signal strength for NR-SS or CSI-RS is in a certain value compared to the maximum measurement value up to N. Here, N may be equal to or larger than 1.

For this purpose, the LTE base station or the NR base station provides the terminal with the offset value used to derive the cell quality of the NR base station and the fact that the maximum value of the number of beams considered is N.

(8) The terminal determines the number of beams to derive the cell quality of the NR base station by itself.

For this purpose, the LTE base station or the NR base station provides the terminal with an indication to instruct the terminal to derive the cell quality of the NR base station.

The information described above, that is, the number of beams, the maximum number of beams, the threshold value, and the offset value or the like may be applied to each frequency to be measured, or may be applied to each cell. In addition, some information may be applied to each frequency to be measured, and some information may be applied to each cell.

The following information element example transmitted from the LTE base station or the NR base station illustrates an example in which the information described above is applied to each frequency.

```
- MeasObjectEUTRA
The IE MeasObjectEUTRA specifies information applicable for intra-frequency or inter-frequency
E-UTRA cells.
                                MeasObjectEUTRA information element
-- ASN1START
MeasObjectEUTRA ::=                 SEQUENCE {
    carrierFreq                         ARFCN-ValueEUTRA,
    allowedMeasBandwidth                AllowedMeasBandwidth,
    presenceAntennaPort1                PresenceAntennaPort1,
    neighCellConfig                     NeighCellConfig,
    offsetFreq                          Q-OffsetRange           DEFAULT dB0,
    numberBeam                          INTEGER (1..256),
    maxNumberBeam                       INTEGER (1..256),
    beamThreshold                       ThresholdEUTRA,
    beamOffset                          INTEGER (-30..30),
    cellQualityUe                       BOOLEAN,
    -- Cell list
    cellsToRemoveList                   CellIndexList           OPTIONAL,    -- Need ON
    cellsToAddModList                   CellsToAddModList       OPTIONAL,    -- Need ON
    -- Black list
    blackCellsToRemoveList              CellIndexList           OPTIONAL,    -- Need ON
    blackCellsToAddModList              BlackCellsToAddModList  OPTIONAL,    -- Need ON
    cellForWhichToReportCGI             PhysCellId              OPTIONAL,    -- Need ON
    ...,
```

In addition, the following information element example transmitted from the LTE base station or the NR base station illustrates an example in which the information described above is applied to each cell.

```
-           MeasObjectEUTRA
The IE MeasObjectEUTRA specifies information applicable for intra-frequency or inter-frequency
E-UTRA cells.
                                MeasObjectEUTRA information element
-- ASN1START
MeasObjectEUTRA ::=                 SEQUENCE {
    carrierFreq                         ARFCN-ValueEUTRA,
    allowedMeasBandwidth                AllowedMeasBandwidth,
    presenceAntennaPort1                PresenceAntennaPort1,
    neighCellConfig                     NeighCellConfig,
    offsetFreq                          Q-OffsetRange           DEFAULT dB0,
    cellQualityUe                       BOOLEAN,
    -- Cell list
    cellsToRemoveList                   CellIndexList           OPTIONAL,    -- Need ON
    cellsToAddModList                   CellsToAddModList       OPTIONAL,    -- Need ON
    -- Black list
    blackCellsToRemoveList              CellIndexList           OPTIONAL,    -- Need ON
    blackCellsToAddModList              BlackCellsToAddModList  OPTIONAL,    -- Need ON
    cellForWhichToReportCGI             PhysCellId              OPTIONAL,    -- Need ON
    ...,
    [[measCycleSCell-r10                MeasCycleSCell-r10      OPTIONAL,    -- Need ON
        measSubframePatternConfigNeigh-r10  MeasSubframePatternConfigNeigh-r10  OPTIONAL
    ]],
    [[widebandRSRQ-Meas-r11             BOOLEAN                 OPTIONAL     -- Cond WB-RSRQ
    ]],
    [[      altTTT-CellsToRemoveList-r12    CellIndexList       OPTIONAL,    -- Need ON
            altTTT-CellsToAddModList-r12    AltTTT-CellsToAddModList-r12    OPTIONAL,    --
```

-continued

```
Need ON
        t312-r12                            CHOICE {
            release                             NULL,
            setup                               ENUMERATED {ms0, ms50, ms100, ms200,
                                                    ms300, ms400, ms500, ms1000}
        }                                                   OPTIONAL,      -- Need ON
        reducedMeasPerformance-r12          BOOLEAN         OPTIONAL,      -- Need
ON
        measDS-Config-r12                   MeasDS-Config-r12   OPTIONAL   -- Need
ON
    ]],
    [[
        whiteCellsToRemoveList-r13          CellIndexList       OPTIONAL,  -- Need ON
        whiteCellsToAddModList-r13          WhiteCellsToAddModList-r13 OPTIONAL,  -- Need
ON
        rmtc-Config-r13                     RMTC-Config-r13     OPTIONAL,  -- Need ON
        carrierFreq-r13                     ARFCN-ValueEUTRA-v9e0           OPTIONAL    -
- Need ON
    ]]
}
    MeasObjsctEUTRA-v9e0 ::=            SEQUENCE {
        carrierFreq-v9e0                    ARFCN-ValueEUTRA-v9e0
    }
    CellsToAddModList ::=               SEQUENCE (SIZE (1..maxCellMeas)) OF CellsToAddMod
    CellsToAddMod ::=   SEQUENCE {
        cellIndex                           INTEGER (1..maxCellMeas),
        physCellId                          PhysCellId,
        cellIndividualOffset                Q-OffsetRange,
        numberBeam                          INTEGER (1..256),
        maxNumberBeam                       INTEGER (1..256),
        beamThreshold                       ThresholdEUTRA,
        beamOffset                          INTEGER (-30..30),
    }
    BlackCellsToAddModlist ::=          SEQUENCE (SIZE (1..maxCellMeas)) OF BlackCellsToAddMod
    BlackCellsToAddMod ::=  SEQUENCE {
        cellIndex                           INTEGER (1..maxCellMeas).
        physCellIdRange                     PhysCellIdRange
    }
    MeasCycleSCell-r10 ::=              ENUMERATED {sf160, sf256, sf320, sf512,
                                                    sf640, sf1024, sf1280, spare1}
    MeasSubframePatternConfigNeigh-r10 ::= CHOICE {
        release                             NULL,
        setup                               SEQUENCE {
            measSubframePatternNeigh-r10        MeasSubframePattern-r10,
            measSubframeCellList-r10            MeasSubframeCellList-r10    OPTIONAL    --
Cond always
        }
    }
    MeasSubframeCellList-r10 ::= SEQUENCE (SIZE (1..maxCellMeas)) OF PhysCellIdRange
    AltTTT-CellsToAddModList-r12 ::=        SEQUENCE (SIZE (1..maxCellMeas)) OF AltTTT-
CellsToAddMod-r12
    AirTTT-CellsToAddMod-r12 ::=    SEQUENCE {
        cellIndex-r12                       INTEGER (1..maxCellMeas),
        physCellIdRange-r12                 PhysCellIdRange
    }
    WhiteCellsToAddModList-r13 ::=      SEQUENCE (SIZE (1..maxCellMeas)) OF
WhiteCellsToAddMod-r13
    WhiteCellsToAddMod-r13  ::=     SEQUENCE {
        cellIndex-r13                       INTEGER (1..maxCellMeas).
        physCellIdRange-r13                 PhysCellIdRange
    }
    RMTC-Config-r13     ::=CHOICE {
        release                             NULL,
        setup                               SEQUENCE {
            rmtc-Period-r13                     ENUMERATED {ms40, ms80, ms160, ms320, ms640}.
            rmtc-SubframeOffset-r13             INTEGER(0..639)     OPTIONAL,      --
Need ON
            measDuration-r13                    ENUMERATED {sym1, sym14, sym28, sym42, sym70},
            ...
        }
    }
}
-- ASN1STOP
``` numberBeam
The number of beams that the UE uses to derive a cell quality.
maxNumberBeam
The maximum number of beams that the UE uses to derive a cell quality.
beamThreshold
The absolute threshold that is used to derive a cell quality in terms of RSRP (or RSRQ). If the RSRP of
NR-SS or CSI-RS transmitted by a certain beam is greater than the threshold, that beam is used to derive a cell quality.
beamOffset
The relative threshold that is used to derive a cell quality in terms of RSRP (or RSRQ). If the RSRP of
NR-SS or CSI-RS transmitted by a certain beam is not beamOffset dB worse than the RSRP of the best
beam, that beam is used to derive a cell quality.
cellQualityUe
The indication that means, if it is set to TRUE, the gNB allows the UE to derive a cell quality
autonomously without the configuration by the gNB. If it is set to FALSE, the gNB does not allow the
UE to derive a cell quality autonomously without the configuration by the gNB.

Figure 41:
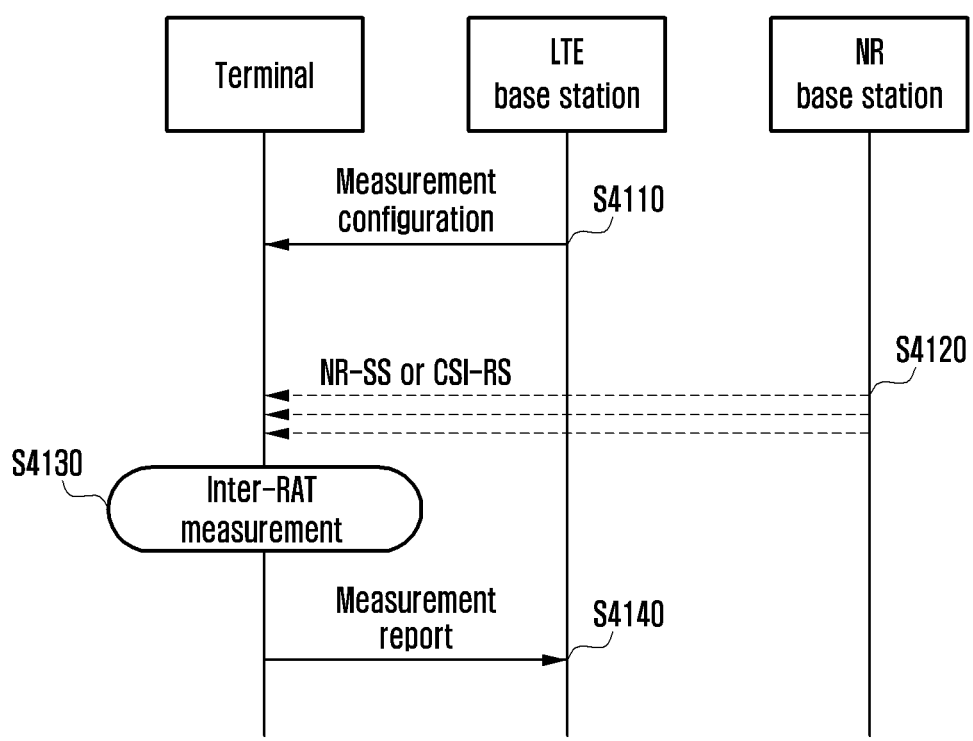
FIG. 41 is a diagram illustrating an order in which an LTE base station provides information to the terminal for NR cell measurement of the terminal according to an embodiment of the present disclosure.

FIG. 41 is a diagram illustrating a process in which an LTE base station provides information to the terminal for NR cell measurement of the terminal according to an embodiment of the present disclosure.

The terminal receives the measurement configuration in operation S4110 and may receive at least one of the NR-SS and the CSI-RS in operation S4120.

Then, the terminal performs inter RAT measurement in operation S4130.

If the NR base station satisfies the specific condition specified in the measurement configuration, the terminal transmits the measurement report to the LTE base station in operation S4140.

As a further embodiment of the present disclosure, the terminal proposes a detailed operation of deriving one cell signal quality measurement result from a plurality of beam signal quality measurement results.

Figure 42:
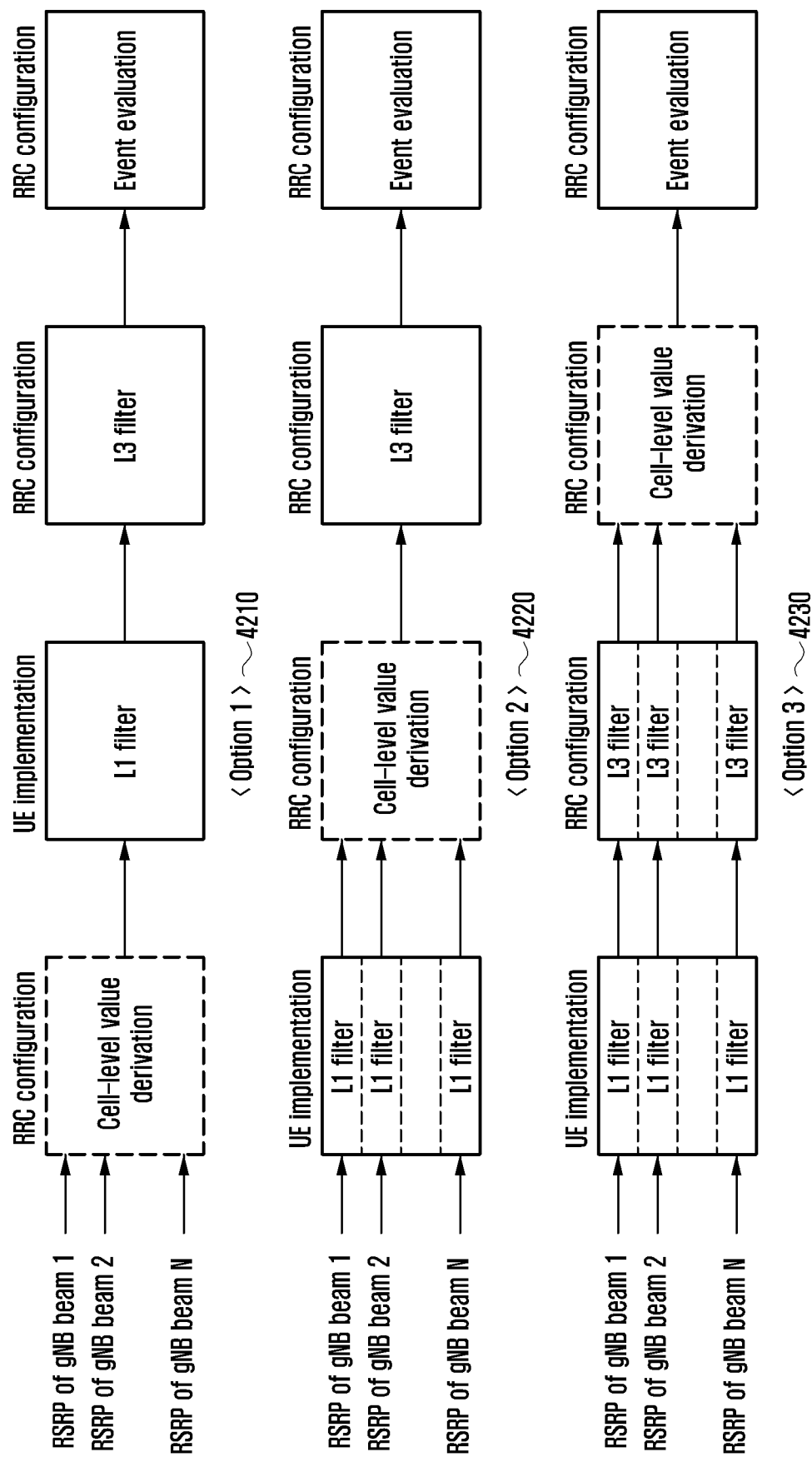
FIG. 42 is a diagram illustrating a method in which the terminal obtains cell quality of a base station using a plurality of beams according to an embodiment of the present disclosure.

FIG. 42 is a diagram illustrating a method in which the terminal obtains cell quality of a base station using a plurality of beams according to an embodiment of the present disclosure.

The operation of deriving one cell signal quality measurement result from the plurality of beam signal quality measurement results corresponds to the operations of a "cell-level value derivation" block in option 1, option 2, and option 3 in FIG. 42.

That is, all of option 1 4210, option 2 4220 and option 3 4230 may be applied to derive one cell signal quality measurement result. In the option 1 of the present disclosure, an input value of the cell-level value derivation becomes the L1 measurement sample without undergoing the L1/L3 filtering, and in the option 2, an input value of the cell-level value derivation becomes the output of the L1 filter. In addition, in the option 3, the input value of the cell-level value derivation becomes the output of the L3 filter.

Hereinafter, it is assumed that the option 2 is applied. However, the present disclosure can be applied even to the option 1 and option 3 as the same principle. Here, the "cell-level value derivation" may be used as the same meaning as "beam consolidation".

Figure 43:
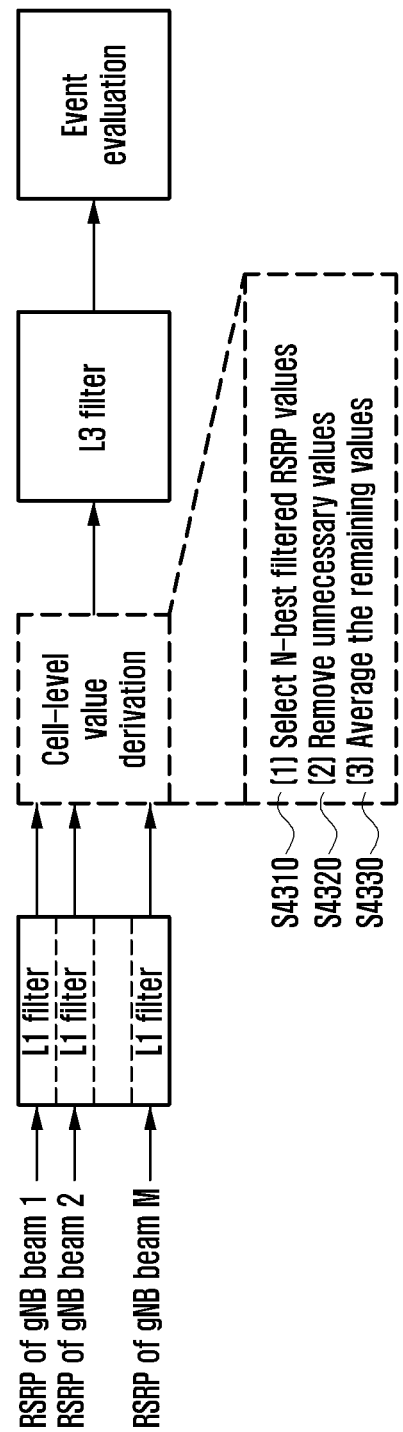
FIG. 43 is a diagram illustrating a method in which the terminal obtains cell quality from a measurement result of a signal strength of a plurality of beams according to an embodiment of the present disclosure.

The operation proposed in the embodiment of the present disclosure is illustrated in FIG. 43.

FIG. 43 is a diagram illustrating a method in which the terminal obtains cell quality from a measurement result of signal strength of a plurality of beams according to an embodiment of the present disclosure.

The terminal selects (1) N beams having the highest filtered signal strength among layer 1 filtering results by M base station beams and the signal strength corresponding thereto are selected in operation S4310, (2) they are removed not to consider the unnecessary beam in deriving the cell quality and the signal strength corresponding thereto based on the signal strength among the N beams selected in operation S4320, (3) an average value, a sum, or a weighted average value, or the like of the signal strength of the remaining beams excluding the beam selected in the second operation among the beams selected in the operation S4330 may be determined as the cell quality.

The detailed content thereof will be described with reference to FIG. 44.

Figure 44:
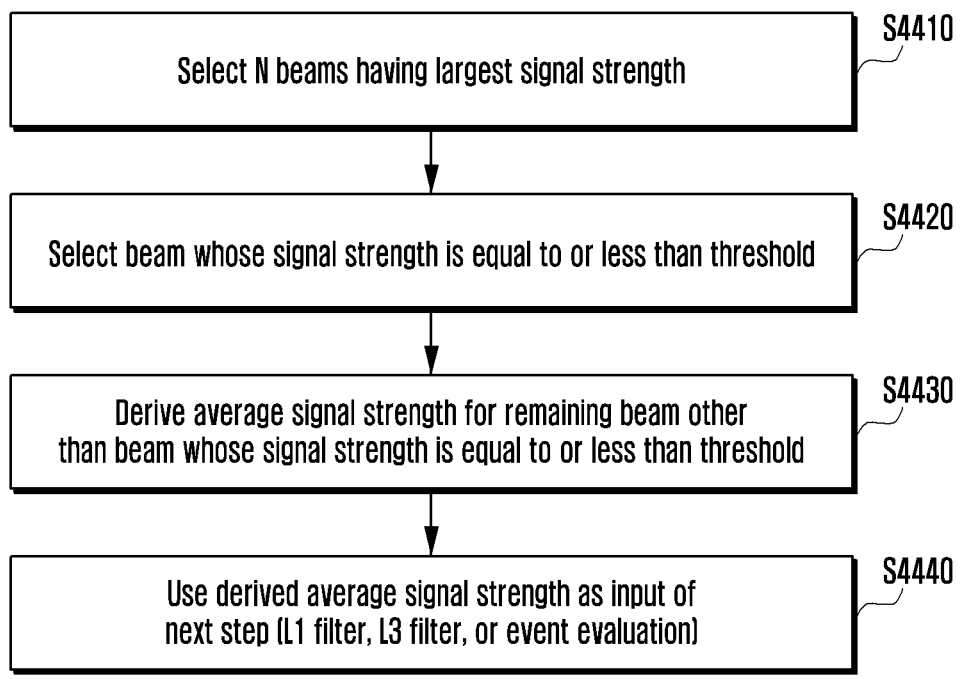
FIG. 44 is a diagram illustrating a method in which the terminal obtains cell quality from a measurement result of a signal strength of a plurality of beams using a threshold value according to an embodiment of the present disclosure.

FIG. 44 is a diagram illustrating a method in which the terminal obtains cell quality from a measurement result of signal strength of a plurality of beams using a threshold value according to an embodiment of the present disclosure.

In operation S4410, the terminal may select N beams having the highest filtered signal strength among the layer 1 filtering results by M base station beams, and the terminal may figure out the signal strength for the N beams.

Herein, the base station may inform the terminal of the information on N through the RRC message, the system information, the PBCH or the like. In addition, the information on M may also be specified in a specification based on the base station and the terminal.

In addition, N is not informed to the terminal by the base station but may be directly selected in an implementation manner.

Meanwhile, among the N beams selected in operation S4410, there is a possibility that an unsuitable beam is included in deriving the cell quality.

Accordingly, the terminal selects a beam unnecessary in deriving the cell quality based on the signal strengths among the N beams selected in operation S4420.

Here, the terminal can determine a beam that is not suitable for deriving the cell quality based on the threshold. That is, if the signal strength of the N beams selected in operation S4410 is a beam smaller than the threshold, the terminal may determine that the beam is not suitable to derive the cell quality.

That is, when the signal strength of a specific beam is represented by $RSRP_a$, if beam a satisfies $RSRP_a < threshold$, it is determined that beam a is not suitable to derive the cell quality. Here, the base station may inform the terminal of the information on the threshold through the RRC message, the system information, the PBCH or the like. In addition, the information on the threshold may also be specified in a specification based on the base station and the terminal.

As another method, the terminal may determine a beam, which is not suitable to derive the cell quality, based on the offset. That is, the terminal compares the RSRP of the beam having the largest signal strength among the N beams selected in operation S4410 and the RSRP of the remaining beams. As the comparison result, it can be judged that the difference from the RSRP of the beam having the largest signal strength is a beam not suitable to derive the cell quality in the case of the beams having the RSRP in which the offset dB is large.

That is, when the signal strength of the beam x having the largest signal strength is represented by $RSRP_x$ and the signal strength of a beam y selected in operation (1) is represented by $RSRP_y$, the beam y satisfying $RSRP_x-$ RSRPy>offset dB is determined to be a beam that is not suitable to derive the cell quality. Here, the base station may inform the terminal of the information on the offset through the RRC message, the system information, the PBCH or the like. In addition, the information on the offset may also be specified in a specification based on the base station and the terminal.

In operation S4430, the terminal determines the cell quality by performing an average, a sum, a weighted average, or the like on the remaining beams excluding the beam selected in operation S4420 among the beams selected in operation S4410. In other words, if the number of remaining beams excluding the beam selected in operation S4420 among the beams selected in operation S4410 is r in total, the derived cell quality is as follows.

A. When the cell quality is derived from the averaging,

RSRPcell=(RSRP1+RSRP2+RSRP3+ . . . +RSRPr)/r

B. When the cell quality is derived from the sum,

RSRPcell=RSRP1+RSRP2+RSRP3+ . . . +RSRPr

C. When the cell quality is derived from the weight sum,

RSRPcell=w1*RSRP1+w2*RSRP2+w3*RSRP3+ . . . +wr*RSRPr

In operation S4440, the terminal may use the cell quality derived in operation S4430 as an input of the next operation.

Figure 45:
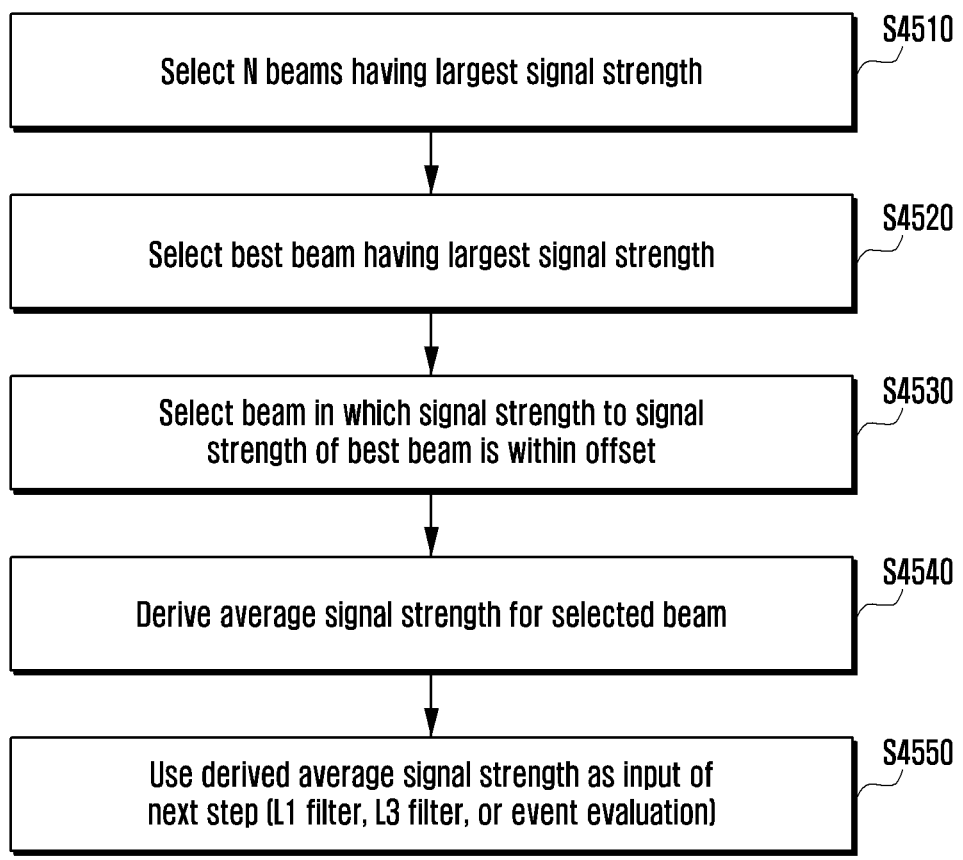
FIG. 45 is a diagram illustrating a method in which the terminal obtains cell quality from a measurement result of a signal strength of a plurality of beams using an offset value according to an embodiment of the present disclosure.

FIG. 45 is a diagram illustrating a method in which the terminal obtains cell quality from a measurement result of signal strength of a plurality of beams using an offset value according to an embodiment of the present disclosure.

Referring to operation S4510 of FIG. 45 is the same as the operation S4410 of FIG. 44, and a detailed description thereof will be omitted.

The terminal selects a beam having the largest signal strength in operation S4520. Then, the RSRP of the beam having the largest signal strength is compared with the RSRP of the remaining beams. As the comparison result, it can be judged that the difference from the RSRP of the beam having the largest signal strength is a beam not suitable to derive the cell quality in the case of the beams having the RSRP in which the offset dB is large.

That is, when the signal strength of the beam x having the largest signal strength is represented by RSRPx and the signal strength of a beam y selected in operation (1) is represented by RSRPy, the beam y satisfying RSRPx−RSRPy>offset dB is determined to be a beam that is not suitable to derive the cell quality. Here, the base station may inform the terminal of the information on the offset through the RRC message, the system information, the PBCH or the like. In addition, the information on the offset may also be specified in a specification based on the base station and the terminal.

Accordingly, in operation S4530, the terminal selects a beam whose signal strength compared to the signal strength for the best beam is within the offset.

The terminal derives the signal strength for the beam selected in operation S4530 in operation S4540, and uses it as an input in the next operation in operation S4550.

At this time, the method of deriving the signal strength of the beam is the same as that described in operation S4430, and a description thereof will be omitted below.

Figure 46:
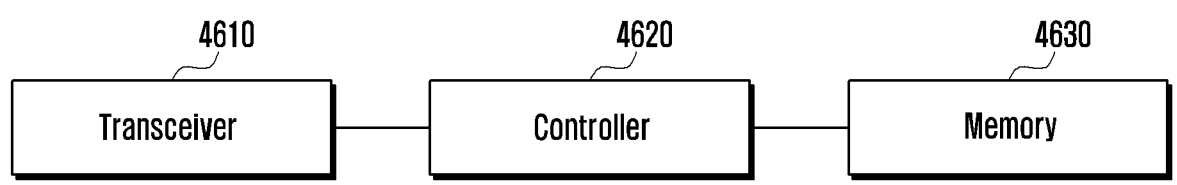
FIG. 46 is a diagram illustrating a structure of the terminal according to an embodiment of the present disclosure.

FIG. 46 is a diagram illustrating a structure of a terminal according to an embodiment of the present embodiment.

Referring to FIG. 46, the terminal may include a transceiver 4610, a controller 4620 (e.g., at least one processor), and a memory 4630. In the present disclosure, the controller may be defined as a circuit, an application specific integrated circuit, or at least one processor.

The transceiver 4610 may transmit and receive a signal. The transceiver 4610 may receive, for example, the system information from the base station and may receive a synchronization signal or a reference signal therefrom.

The controller 4620 may control the overall operation of the terminal according to the first to fourth embodiments of the present disclosure. For example, the controller 4630 may control a signal flow between each block to perform the operations according to the above-described first to fourth embodiments.

The memory 4630 may store at least one of the information transmitted/received through the transceiver 4610 and the information generated through the controller 4620.

Figure 47:
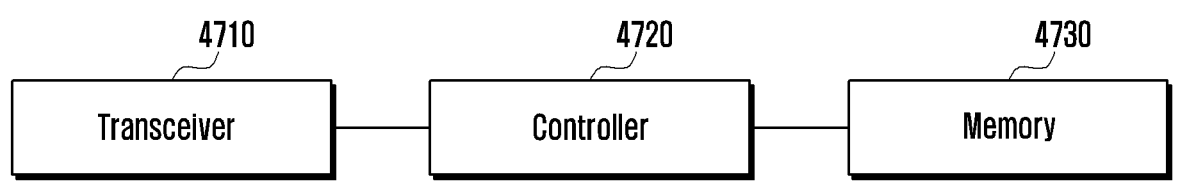
FIG. 47 is a diagram illustrating a structure of the base station according to an embodiment of the present disclosure.

FIG. 47 is a diagram illustrating a structure of a base station according to an embodiment of the present embodiment.

Referring to FIG. 47, the base station may include a transceiver 4710, a controller 4720 (e.g., at least one processor), and a memory 4730. In the present disclosure, the controller may be defined as a circuit, an application specific integrated circuit, or at least one processor.

The transceiver 4710 may transmit and receive a signal. The transceiver 4710 may transmit, for example, the system information from the terminal and may transmit the synchronization signal or the reference signal to the terminal.

The controller 4720 may control the overall operation of the base station according to the first to fourth embodiments of the present disclosure. For example, the controller 4720 may control a signal flow between each block to perform the operations according to the above-described first to fourth embodiments.

The memory 4730 may store at least one of the information transmitted or received through the transceiver 4710 and the information generated through the controller 4720.

Meanwhile, the terminal apparatus may include a transceiver for transmitting and receiving signals to and from another terminal, and a controller for controlling all the operations of the terminal apparatus. It is to be understood that all the operations for supporting synchronization described in the present disclosure are performed by the control section.

However, the controller and the transceiver are not necessarily implemented as a separate apparatus but may be implemented as one component unit in a form like a single chip.

It should be noted that the configuration diagram of the terminal, the exemplified diagram of the control or data signal transmission method, the exemplified diagram of the operation procedure of the terminal, and the configuration diagrams of the terminal apparatus illustrated in the drawings are not intended to limit the scope of the present disclosure. That is, it is to be understood that all components, entities, or operational operations described in the drawings should not be construed as essential components for the implementation of the disclosure, but even when only some components are included, the present disclosure may be implemented within the spirit of the disclosure.

The operations of the base station or the terminal described above may be realized by including the memory device storing the corresponding program code in any component unit of the base station or the terminal apparatus. That is, the controller of the base station or the terminal apparatus may execute the above-described operations by reading and executing the program code stored in the memory device by a processor or a central processing unit (CPU).

Various components, modules, etc. of the entity, the base station, or the terminal apparatus described herein may also be operated using hardware circuits, for example, complementary metal oxide semiconductor (CMOS) based logic circuit, hardware circuits such as firmware, software, and/or a combination of the hardware and the firmware and/or software embedded in a machine-readable medium. For example, various electrical structures and methods may be performed using electrical circuits such as transistors, logic gates, and an application-specific integrated circuit.

Meanwhile, in the drawings illustrating a method in embodiments, the order of description does not necessarily correspond to the order of execution, and the order relationship may be changed or executed in parallel.

Alternatively, the drawings illustrating the method of the present disclosure may omit some of the elements and may include only some of the elements without impairing the essence of the present disclosure.

While the present disclosure has been shown and described with reference to various embodiments thereof, it will be understood by those skilled in the art that various changes in form and details may be made therein without departing from the scope and spirit of the present disclosure as defined by the appended claims and their equivalents.

What is claimed is:

1. A method performed by a terminal in a wireless communication system, the method comprising:
   receiving, from a base station, measurement configuration information including at least two numerology information, at least two bandwidth information, a threshold, and information on a number of reference signals for obtaining channel state information (CSI);
   obtaining a value for a cell based on an average of measurement results above the threshold among a plurality of measurement results for a plurality of reference signals, wherein a number of the averaged measurement results is less or equal to the number of reference signals for obtaining CSI;
   identifying CSI including the value; and
   transmitting, to the base station, a measurement report including the CSI,
   wherein the plurality of measurement results are obtained based on the at least two numerology information and the at least two bandwidth information.

2. The method of claim 1, wherein the value is obtained based on a priority of a numerology.

3. The method of claim 1, wherein each of the at least two bandwidth information includes information on a size of a measurement bandwidth and information on a starting point of the measurement bandwidth.

4. A method performed by a base station in a wireless communication system, the method comprising:
   transmitting, to a terminal, measurement configuration information including at least two numerology information, at least two bandwidth information, a threshold, and information on a number of reference signals for obtaining channel state information (CSI); and
   receiving a measurement report including CSI including a value for a cell,
   wherein the value is obtained based on an average of measurement results above the threshold among a plurality of measurement results for a plurality of the reference signals,
   wherein a number of the averaged measurement results is less or equal to the number of reference signals for obtaining CSI, and
   wherein the plurality of measurement results are obtained based on the at least two numerology information and the at least two bandwidth information.

5. The method of claim 4, wherein the value is obtained based on a priority of a numerology.

6. The method of claim 4, wherein each of the at least two bandwidth information includes information on a size of a measurement bandwidth and information on a starting point of the measurement bandwidth.

7. A terminal in a wireless communication system, comprising:
   a transceiver; and
   at least one processor coupled with the transceiver and configured to:
      receive, from a base station, measurement configuration information including at least two numerology information, at least two bandwidth information, a threshold, and information on a number of reference signals for obtaining channel state information (CSI),
      obtain a value for a cell based on an average of measurement results above the threshold among a plurality of measurement results for a plurality of reference signals, wherein a number of the averaged measurement results is less or equal to the number of reference signals for obtaining CSI,
      identify CSI including the value, and
      transmit, to the base station, a measurement report including the CSI,
   wherein the plurality of measurement results are obtained based on the at least two numerology information and the at least two bandwidth information.

8. The terminal of claim 7, wherein the value is obtained based on a priority of a numerology.

9. The terminal of claim 7, wherein each of the at least two bandwidth information includes information on a size of a measurement bandwidth and information on a starting point of the measurement bandwidth.

10. A base station in a wireless communication system, the base station comprising:
    a transceiver; and
    at least one processor coupled with the transceiver and configured to:
       transmit, to a terminal, measurement configuration information including at least two numerology information, at least two bandwidth information, a threshold, and information on a number of reference signals for obtaining channel state information (CSI), and
       receive a measurement report including CSI including a value for a cell,
       wherein the value is obtained based on an average of measurement results above the threshold among a plurality of measurement results for a plurality of the reference signals,
    wherein a number of the averaged measurement results is less or equal to the number of reference signals for obtaining CSI, and
    wherein the plurality of measurement results are obtained based on the at least two numerology information and the at least two bandwidth information.

11. The base station of claim 10, wherein the value is obtained based on a priority of a numerology.

12. The base station of claim 10, wherein each of the at least two bandwidth information includes information on a size of a measurement bandwidth and information on a starting point of the measurement bandwidth.

* * * * *